(12) United States Patent
Mimlitch, III et al.

(10) Patent No.: US 9,162,153 B1
(45) Date of Patent: Oct. 20, 2015

(54) TOY VEHICLE WITH AN ADJUSTABLE DC-DC SWITCH

(71) Applicant: Innovation First, Inc., Greenville, TX (US)

(72) Inventors: Robert H. Mimlitch, III, Rowlett, TX (US); David Anthony Norman, Greenville, TX (US); Mitch Randall, Boulder, CO (US)

(73) Assignee: Innovation First, Inc., Greenville, TX (US)

( * ) Notice: Subject to any disclaimer, the term of this patent is extended or adjusted under 35 U.S.C. 154(b) by 0 days.

(21) Appl. No.: 14/451,712

(22) Filed: Aug. 5, 2014

Related U.S. Application Data

(63) Continuation of application No. 14/332,599, filed on Jul. 16, 2014.

(60) Provisional application No. 61/983,189, filed on Apr. 23, 2014.

(51) Int. Cl.
*H02P 6/00* (2006.01)
*A63H 17/00* (2006.01)
*A63C 17/12* (2006.01)

(52) U.S. Cl.
CPC ............... *A63H 17/00* (2013.01); *A63C 17/12* (2013.01)

(58) Field of Classification Search
USPC ............ 318/400.26, 400.29, 492, 400.3, 293; 363/98, 234, 17, 56.02, 32, 56.04, 132; 327/333, 282, 271, 222, 225, 285, 299, 327/288, 354, 234; 68/12.16, 12.21; 446/456, 454, 455, 465; 463/2, 6
See application file for complete search history.

(56) References Cited

U.S. PATENT DOCUMENTS

| | | | |
|---|---|---|---|
| 3,192,664 | A | 7/1965 | Travers |
| 4,309,841 | A | 1/1982 | Asano |
| 4,355,482 | A | 10/1982 | Sapkus et al. |
| 4,612,492 | A | 9/1986 | Burk |
| 4,846,752 | A | 7/1989 | Combs |
| 5,254,917 | A | 10/1993 | Oda |
| 6,074,271 | A | 6/2000 | Derrah |
| 6,315,630 | B1 | 11/2001 | Yamasaki |
| 6,431,940 | B1 | 8/2002 | Buford et al. |
| 6,580,188 | B2 | 6/2003 | Katagiri et al. |
| 6,726,523 | B2 | 4/2004 | Baker et al. |

(Continued)

OTHER PUBLICATIONS

US Office Action dated Sep. 29, 2014 on co-pending U.S. Appl. No. 14/450,464.

(Continued)

*Primary Examiner* — Kawing Chan
*Assistant Examiner* — Jorge L Carrasquillo
(74) *Attorney, Agent, or Firm* — Adam K. Sacharoff; Much Shelist

(57) ABSTRACT

In one embodiment there is a toy vehicle having a low inductance motor powered by a high frequency switched voltage at a frequency high enough to create continuous conduction. The vehicle further includes an H-bridge circuit configured to control a direction of the motor and an adjustable high frequency DC-DC switch configured to convert a supply voltage to an output voltage, lower than the supply voltage, for use by the H-bridge circuit to power the low inductance motor in a forward or reverse direction. In addition, a processor is included and has instructions configured to change the output voltage from the DC-DC switch from a first voltage to a second voltage.

9 Claims, 38 Drawing Sheets

(56) References Cited

U.S. PATENT DOCUMENTS

| | | | |
|---|---|---|---|
| 6,870,304 B2 | 3/2005 | Magnussen et al. | |
| 6,906,931 B1 * | 6/2005 | Batarseh et al. | 363/17 |
| 6,971,942 B2 | 12/2005 | Baker et al. | |
| 7,160,171 B1 | 1/2007 | Rehkemper et al. | |
| 7,190,151 B2 * | 3/2007 | Ribarich et al. | 323/259 |
| 7,458,876 B2 | 12/2008 | Laurienzo et al. | |
| 7,762,867 B2 | 7/2010 | Agostini et al. | |
| 7,931,519 B2 | 4/2011 | Fox | |
| 8,353,737 B2 | 1/2013 | Sofman et al. | |
| 2004/0051509 A1 * | 3/2004 | Matsuo et al. | 323/282 |
| 2005/0225270 A1 * | 10/2005 | Schnetzka et al. | 318/66 |
| 2009/0224818 A1 * | 9/2009 | Yoneyama et al. | 327/333 |
| 2013/0009616 A1 * | 1/2013 | Chang et al. | 323/241 |
| 2013/0069606 A1 | 3/2013 | Wachter et al. | |
| 2013/0095726 A1 | 4/2013 | Sofman et al. | |
| 2013/0278232 A1 * | 10/2013 | Herbison, David | 323/234 |
| 2013/0324250 A1 | 12/2013 | Solman et al. | |
| 2014/0017974 A1 | 1/2014 | Sofman et al. | |
| 2014/0027192 A1 | 1/2014 | King | |

OTHER PUBLICATIONS

US Office Action dated Nov. 20, 2014 from co-pending U.S. Appl. No. 14/450,464.

* cited by examiner

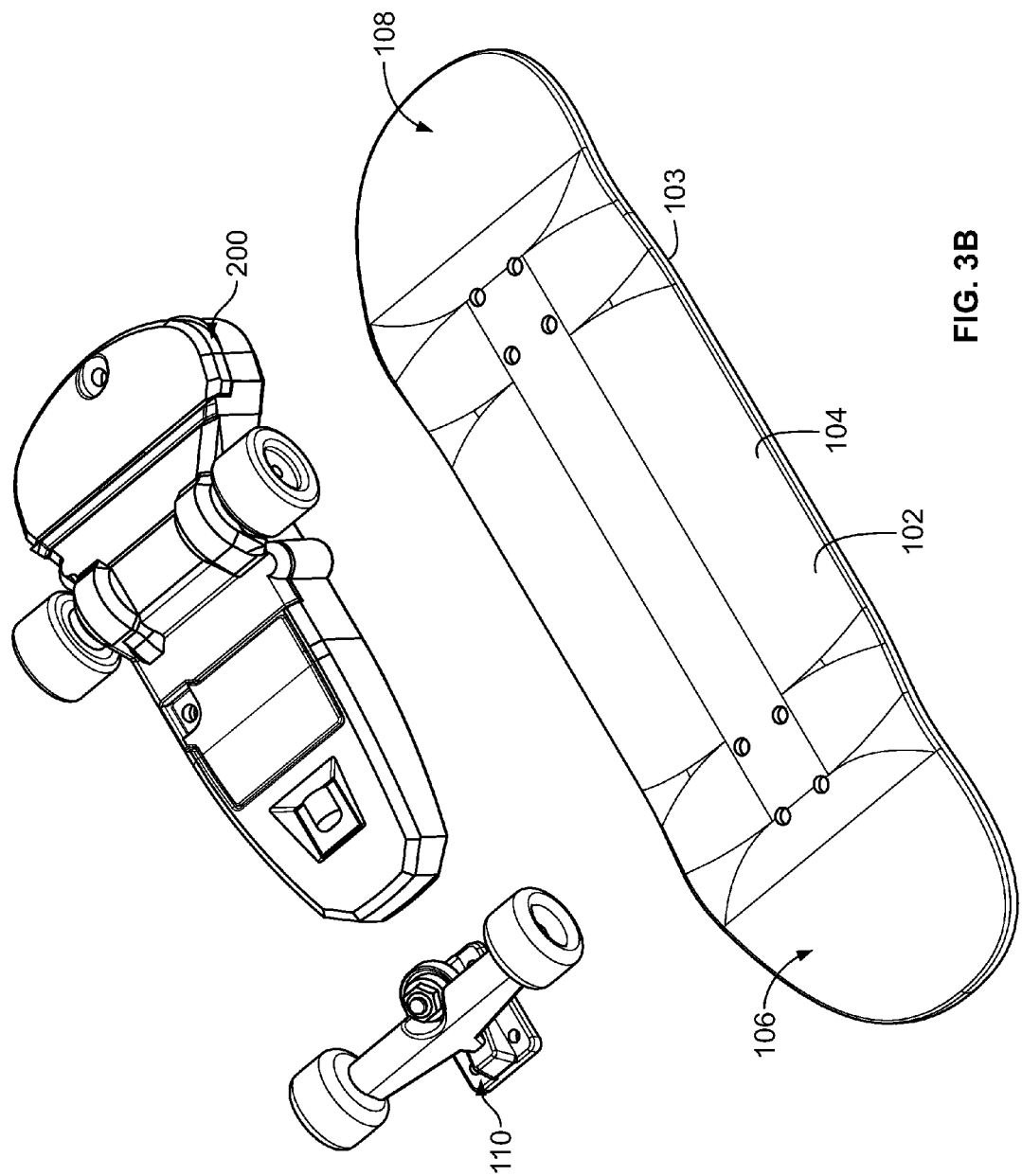

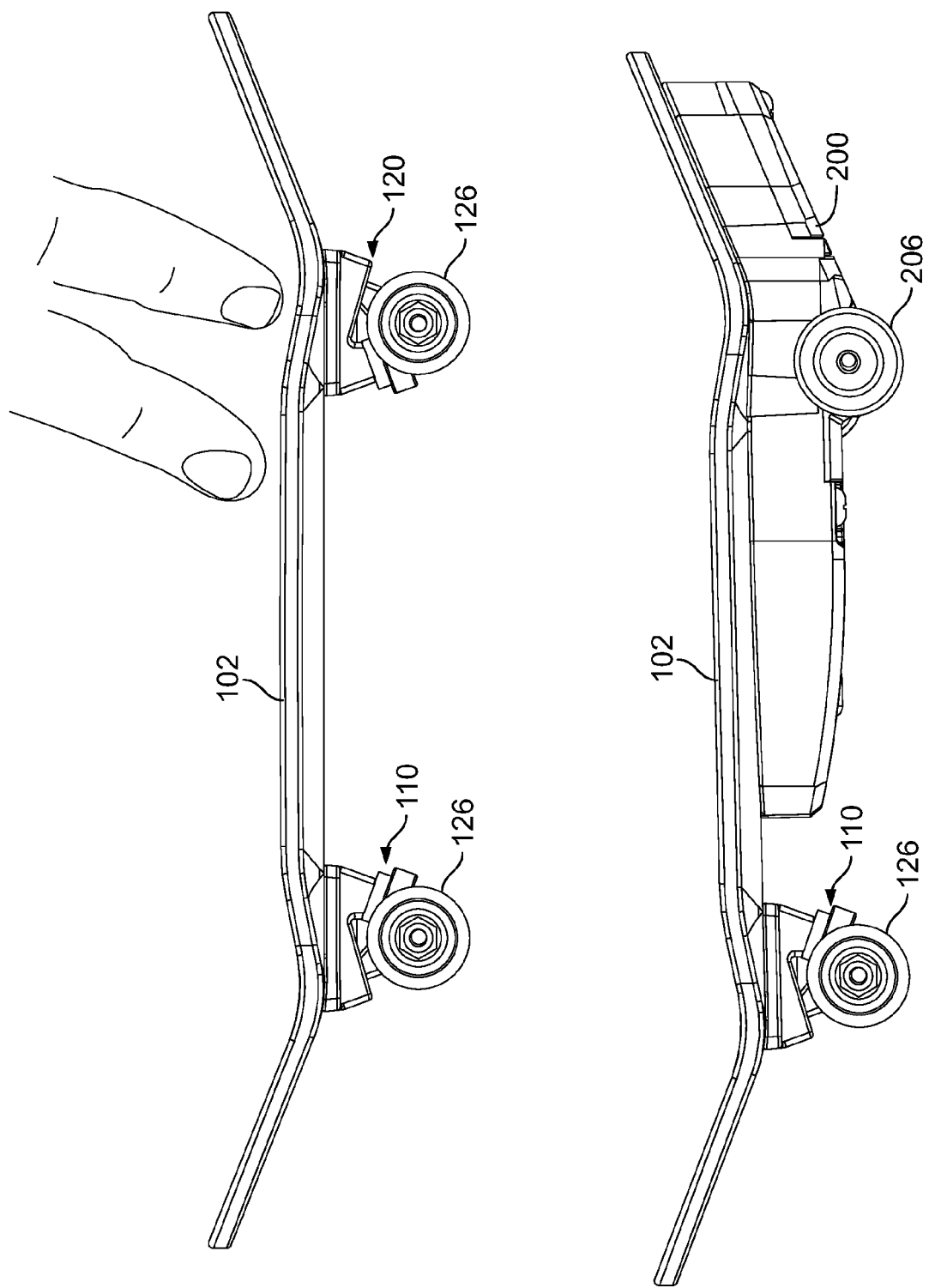

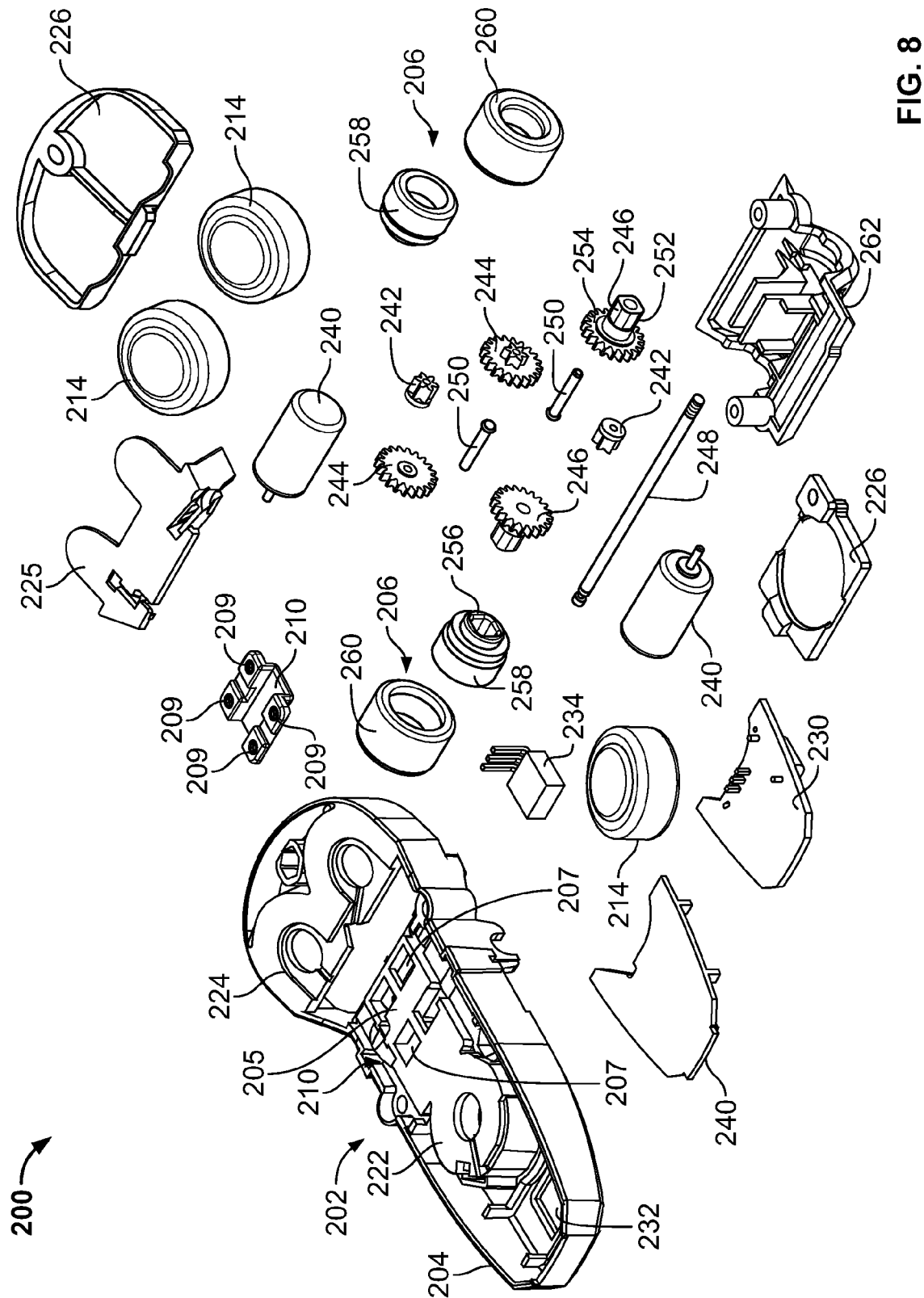

TOY VEHICLE WITH AN ADJUSTABLE DC-DC SWITCH

CROSS REFERENCE TO RELATED APPLICATION

The present application is a continuation of U.S. application Ser. No. 14/332,599 filed Jul. 16, 2014, which claims priority to U.S. Provisional Application Ser. No. 61/983,189 filed Apr. 23, 2014; all of which are incorporated herein by reference.

FIELD OF THE INVENTION

The present invention relates to a toy vehicles and more particularly to a toy vehicle with a low inductance motor powered by a high frequency switched voltage.

BACKGROUND OF THE INVENTION

Toy vehicles have been a mainstay in kids toys for a number of years. Toy vehicles come in different types one of which is a toy skateboard referred to as finger boards because the user of the toy skateboards uses two of their fingers in operating the toy. A skilled operator of the toy skateboard is capable of replicating skateboarding maneuvers with their hand. These skateboards are extremely popular but have become stagnated in their ability to reach a wider audience since their introduction in the 1990s.

As a consequence, various types of toy skateboards have been proposed. Such skateboards range from simple wind-up toy skateboards with mounted figurines, to more advanced radio-controlled toy skateboards with figurines that can be controlled in some degree to portray body movement during skateboarding maneuvers and stunts. These motorized skateboards typically include movable battery packs, changeable motor positions, and interchangeable wheel weights to provide different centers of balance for adjusting the performance of various maneuvers. In addition, some motorized skateboards include a drive mechanism but no steering mechanism. Thus, the skateboard is only maneuverable through body movement of the figurine, as in an actual skateboard, and therefore control of the skateboard may be less than desirable, especially for those of less advanced skill levels. With this need, a toy skateboard should be provided that offers the enjoyment of both a motorized toy skateboard and a non-motorized toy skateboard with an easy control system that allows for the performance of various maneuvers without having to employ a toy figurine.

SUMMARY OF THE INVENTION

The present invention provides for various embodiments and combinations of aspects that will be described herein in greater detail. In a first embodiment, there is provided a convertible toy skateboard assembly. The skateboard assembly includes a deck, a pair of non-motorized truck assemblies and a rear motorized truck assembly. The toy skateboard is also convertible; as one of the non-motorized truck assemblies may be easily swapped with a rear motorized truck assembly. This allows for the toy skateboard to either have a pair of non-motorized truck assemblies, which allows the operator to use their fingers to manipulate and move the toy skateboard; or have one non-motorized truck assembly and one motorized truck assembly, which allows the operator to use a remote control unit to control and move the toy skateboard.

The non-motorized truck assembly as used throughout the various embodiments is typically secured to the lower surface of the deck. The non-motorized truck assembly includes a pair of freely rotatable wheels that are positioned transversely to a longitudinal axis of the deck when attached. The motorized rear truck assembly includes a housing, which is configured to removably attach to the deck. This may include clips, fasteners, or other attachment means well known in the art. The motorized truck assembly is configured to house at least (i) a battery, (ii) a processor, (iii) a receiver in communication with the processor, and (iv) a pair of motors, each motor separately controlling a rear wheel, of a pair of rear wheels, and wherein the pair of rear wheels are positioned transversely to the longitudinal axis of the deck and behind the pair of front wheels. The receiver is configured to receive signals to control the movement of the pair of rear wheels.

As mentioned, the toy skateboard would therefore include two configurations: a first configuration is defined by having the front non-motorized truck assembly attached to the lower surface towards the front region of the deck and having the rear non-motorized truck assembly removably attached to the lower surface towards the rear region of the deck. In the first configuration, the upper surface of the deck defines a finger engaging region for a user's fingers to engage and move the toy skateboard. A second configuration is defined by removing the rear non-motorized truck assembly and attaching the motorized rear truck assembly to the lower surface towards the rear region of the deck, wherein the movement of the toy skateboard is controllable by the processor in response to signals received by the receiver.

In accordance with one or more of the embodiments, the toy skateboard may include a circuit in communication with the processor and battery. The circuit is configured to change the battery voltage to a fixed voltage to create a more consistent performance from the battery—this may include lowering or boosting the voltage. The change helps increase the enjoyment from the toy skateboard as it no longer seems sluggish as the batteries wear down. In addition, the remote control unit may include one or more signals to initiate a set of pre-program instructions on the processor to control the pair of rear wheels to perform one or more skateboard maneuvers. These skateboard maneuvers may include, but is not limited to, a skateboard trick, a hill climb, variable speed control, and playback of user recorded input.

The skateboard in any one of the embodiments, may further be defined to have a first motor (from the pair of motors) coupled to a first rear wheel (from the pair of rear wheels) and the processor configured to detect a back electromotive force ("EMF") voltage generated by the rotation of the first motor caused by a manual manipulation of the first rear wheel. The processor is further configured to include at least a sleep state and a wake state and is configured to transition between the sleep state and the wake state when the detected back EMF voltage reaches a pre-determined value. The processor may further control the pair of motors in accordance with one or more pre-programmed motions resulting in a tactile response when the detected back EMF voltage reaches a pre-determined value. In addition, the processor may further be configured to detect a second back EMF voltage generated by the rotation of the first motor in an opposite direction due to a manual manipulation of the first rear wheel in an opposite direction. When either of the detectable back EMF voltages reaches a pre-determined value, the processor is further configured to control the first motor in accordance with one or more of the following pre-programmed motions resulting in a tactile response: (a) move the first rear wheel momentarily, (b) move the first rear wheel continuously, (c) resist motion of the first rear wheel momentarily, (d) resist motion of the first rear wheel continuously, (e) oscillate the first rear wheel momentarily, and (f) oscillate the first rear wheel continuously.

In one or more of the embodiments, the motorized rear truck assembly includes a housing defined to include a top profile substantially conforming to a portion of the lower surface of the deck towards the rear region. In this instance, the battery, processor, receiver, and pair of motors are completely positioned within the housing below the top profile of the housing and thus below the lower surface of the deck. The housing may also include a front end and a rear end with an intermediate region there-between. This provides space for a battery, defined two have two battery compartments separately positioned in the front end and rear end of the housing, and space for the pair of motors. The pair of rear wheels are positioned between the two battery compartments. The rear end of the housing containing one of the battery compartments may be angled upwardly to match an angle of the rear end of the deck such that the at least one battery contained in the battery compartment is angled.

In one or more of the embodiments disclosed herein, the receiver may be defined as an IR sensor for receiving signals from the remote control unit. The IR sensor can be positioned in a window defined in the motorized rear truck assembly towards a front portion thereof and under the lower surface of the deck such that the IR sensor is positioned to receive signals reflected from a surface under the deck of the skateboard. In another aspect, the toy skateboard may include a weight removably secured to a portion of the deck to adjust a center of gravity and configured to adjust a center of spin.

As defined in one or more aspects, the toy skateboard may be poised to define a motorized toy skateboard that can be controlled without needing an object on the upper surface of the deck. The toy skateboard does not need a figurine, with linkages, and control mechanics in the deck to maneuver properly. Separately, the toy skateboard may include a truck assembly housing that encloses both a front truck and a motorized rear truck. The truck assembly may be removed and replaced with a pair of non-motorized truck assemblies so the user is able to manually maneuver the skateboard.

In addition to a toy skateboard, the present invention may provide for a toy that may include one or more elements, such as the wheels on a skateboard, an appendage on a toy robot or figure, or a propeller on a toy vehicle. These elements are external to the toy and are moved/controlled separately by a motor. The processor is configured to include at least a sleep state and a wake state and is further configured to transition between the two states. Another aspect of the embodiment is that the element is accessible for manipulation by the user, operator, or human which when moved will in turn rotate the motor. When the user manipulates the element, rotating the motor, the rotation of the motor generates a back electromotive force (herein after "EMF") voltage. The processor is configured to detect the back EMF voltage and is further configured to transition between the two states when the detected back EMF voltage reaches a pre-determined value.

In another aspect of the embodiment, when the detected back EMF voltage reaches the pre-determined value, the processor is further configured to control the motor in accordance with one or more pre-programmed motions, which when executed result in a tactile response.

In accordance with an embodiment of the present invention there is provided a toy vehicle having a low inductance motor powered by a high frequency switched voltage at a frequency high enough to create continuous conduction. The vehicle includes an H-bridge circuit configured to control a direction of the motor and an adjustable high frequency DC-DC switch configured to convert a supply voltage to an output voltage, that is lower than the supply voltage, for use by the H-bridge circuit to power the low inductance motor in a forward or reverse direction. A processor is provided with instructions configured to change the output voltage from the DC-DC switch from a first voltage to a second voltage.

In different aspect of this embodiment, the motor may have an inductance of approximately less than 500 uH and more preferably of about 140 uH. The DC-DC switch may be operating at a frequency greater than 250 kHz and more preferably at about 1000 kHz or higher. In addition, the DC-DC switch may be changed digitally.

In addition, the output voltage from the DC-DC switch may be selected by a voltage divider, having a first resistor value and a second resistor value selected by the instructions from the processor such that the output voltage from the DC-DC switch can define a first output voltage and a second output voltage. In other aspect the DC-DC switch can be further configured to define a third output voltage. The second resistor value may be selected from a pair of resistors, defined separately to create the first output voltage and the second output voltage respectively and defined in series to create the third output voltage. In addition, the processor further includes instructions to the H-bridge circuit to only control the direction of the motor.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 3B is a lower view of the toy skateboard from FIG. 3A;

FIG. 6 is a side view of the toy skateboard deck from FIG. 1 being further illustrated with non-motorized truck assemblies in comparison to a non-motorized front truck and assembly and motorized rear truck assembly to further illustrate the two configurations in accordance with one embodiment of the present invention;

FIG. 8 is an exploded view of the motorized rear truck assembly from FIG. 7A in accordance with one embodiment of the present invention;

DETAILED DESCRIPTION OF THE DRAWINGS

Figure 1:
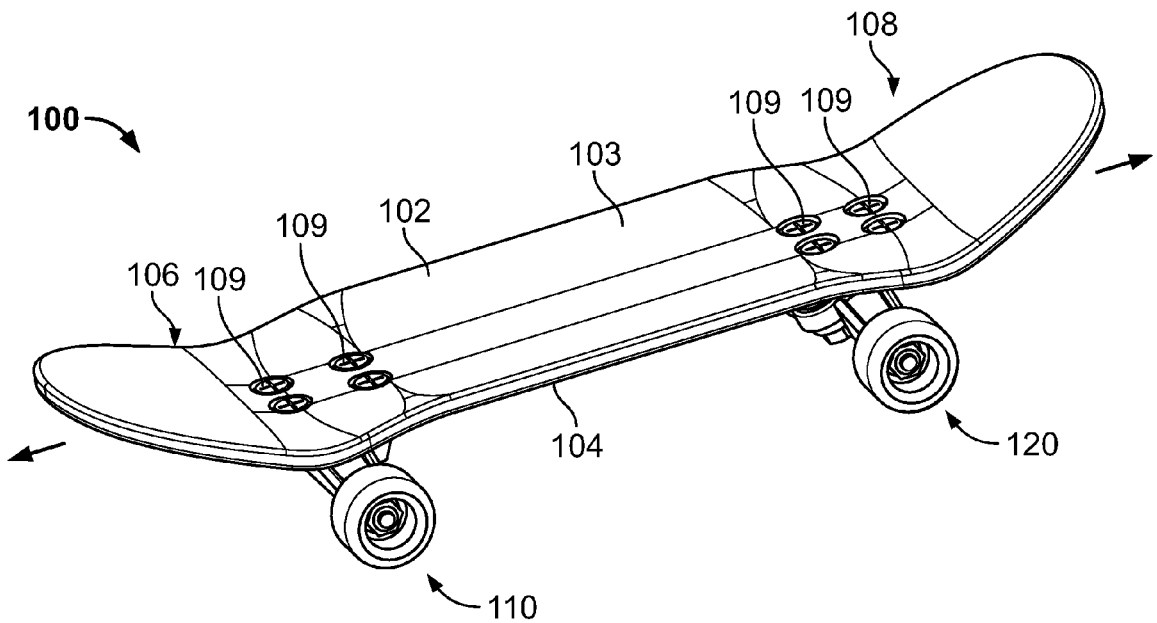
FIG. 1 is a perspective view of a toy skateboard illustrating a pair of front and rear trucks in accordance with one embodiment of the present invention.
Figure 2:
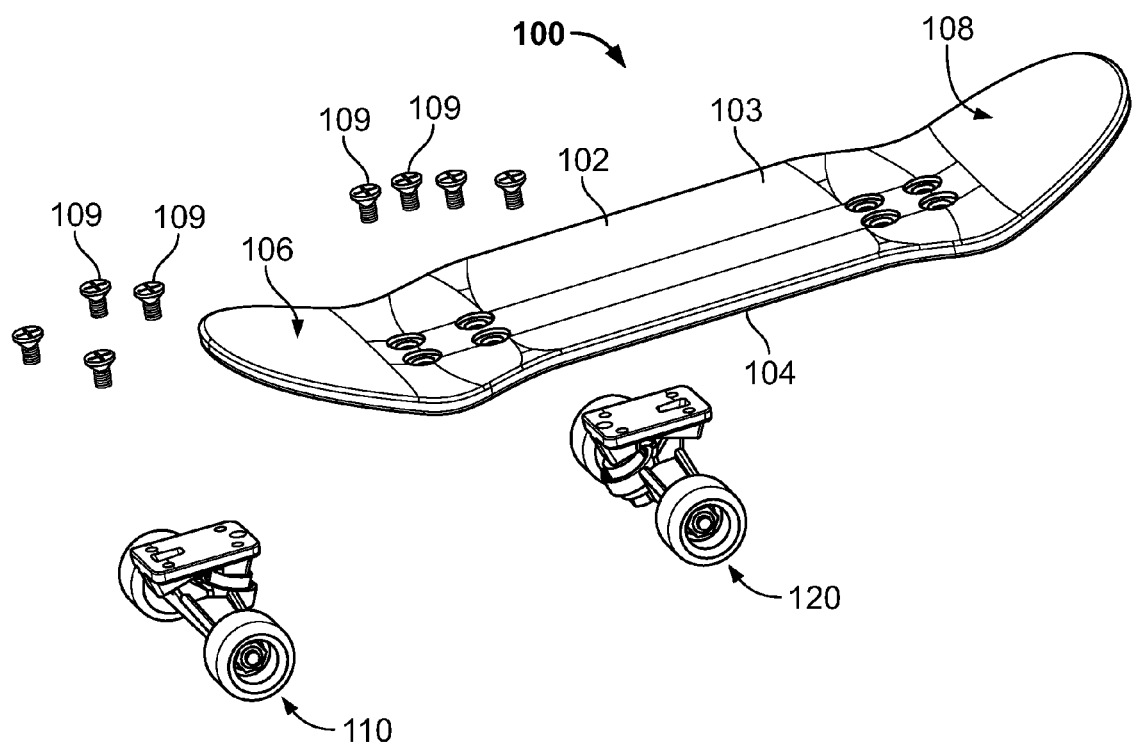
FIG. 2 is an exploded view of the toy skateboard from FIG. 1 in accordance with one embodiment of the present invention.
Figure 3A:
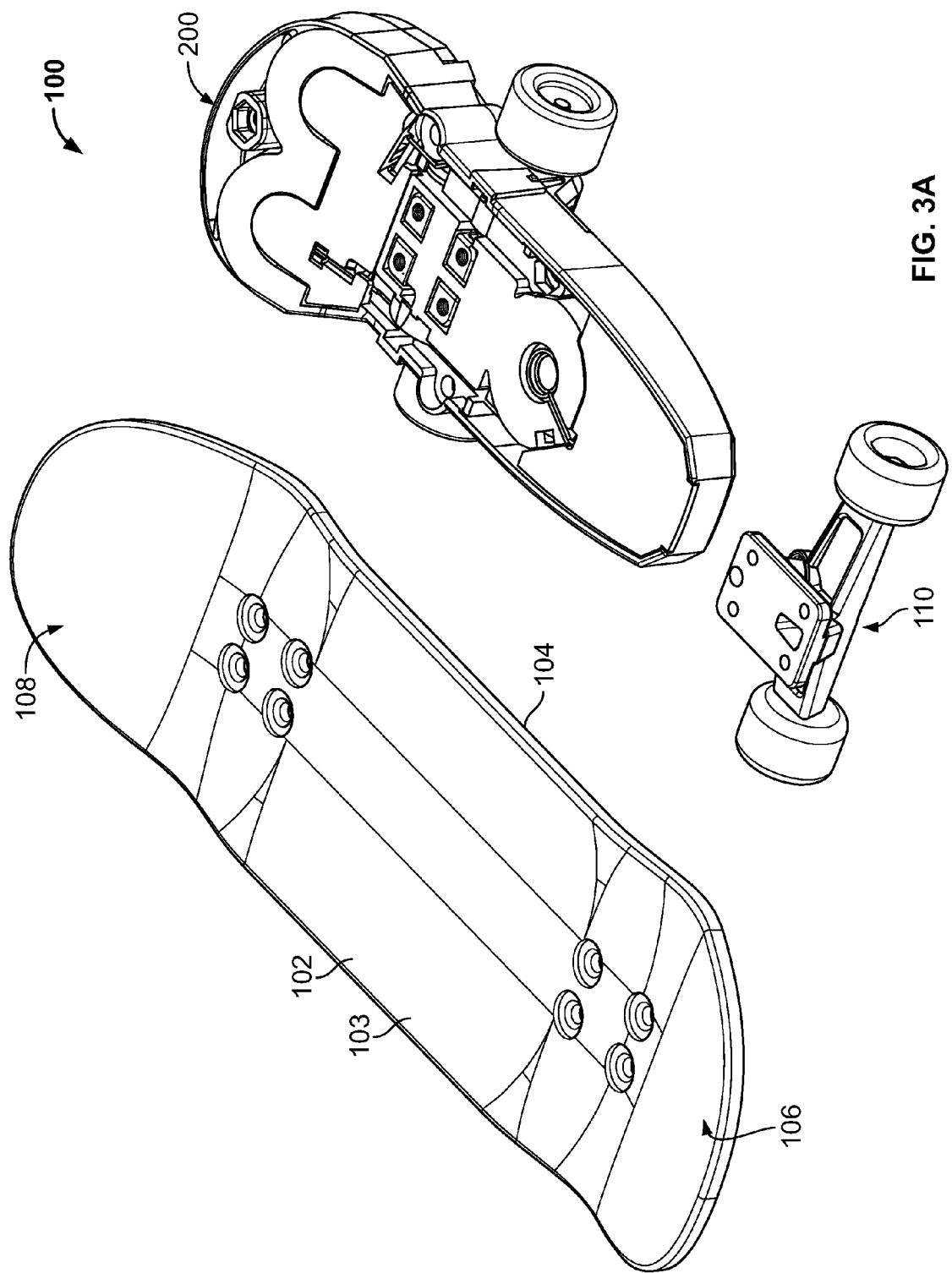
FIG. 3A is a partial exploded view of the toy skateboard deck from FIG. 1 illustrating a front truck assembly and a motorized rear truck assembly in accordance with one embodiment of the present invention.

While the invention is applicable to embodiments in many different forms, there are shown in the drawings and will be described in detail here in the various embodiments of the present invention. It should be understood, however, that the present disclosure is to be considered an exemplification of the principles of the invention and is not intended to limit the spirit or scope of the invention and/or claims of the embodiments illustrated.

Referring now to the drawings, and to FIGS. 1 through 3B in particular, a toy skateboard in accordance to one embodiment of the invention is illustrated and generally referenced as numeral 100. The toy skateboard 100 includes a deck 102 with an upper surface 103 and a lower surface 104. As illustrated in FIGS. 1 and 3A, the skateboard 100 includes a front truck assembly 110 secured towards the front end 106 of the deck 102 and either a rear truck assembly 120 or a motorized rear truck assembly 200 secured towards the rear end 108 of the deck 102. The trucks are secured to the deck 102 with fasteners 109 that the operator can easily remove. The front and rear non-motorized truck assemblies 110 and 120 may be configured the same as each other, however, the truck assemblies orientation may be reversed.

Figure 4A:
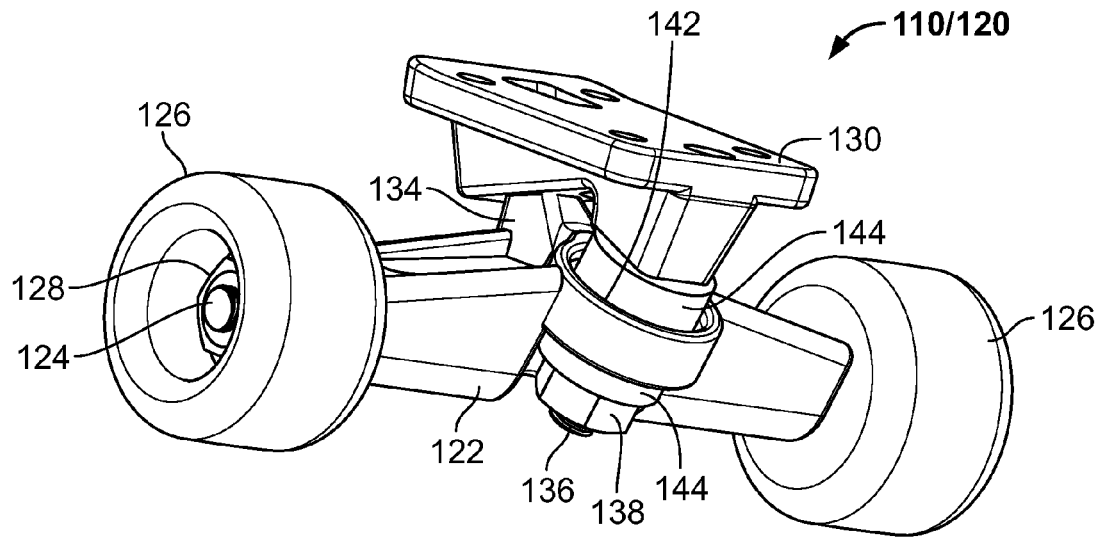
FIG. 4A is a perspective view of one of the non-motorized truck assemblies in accordance with one embodiment of the present invention.
Figure 4B:
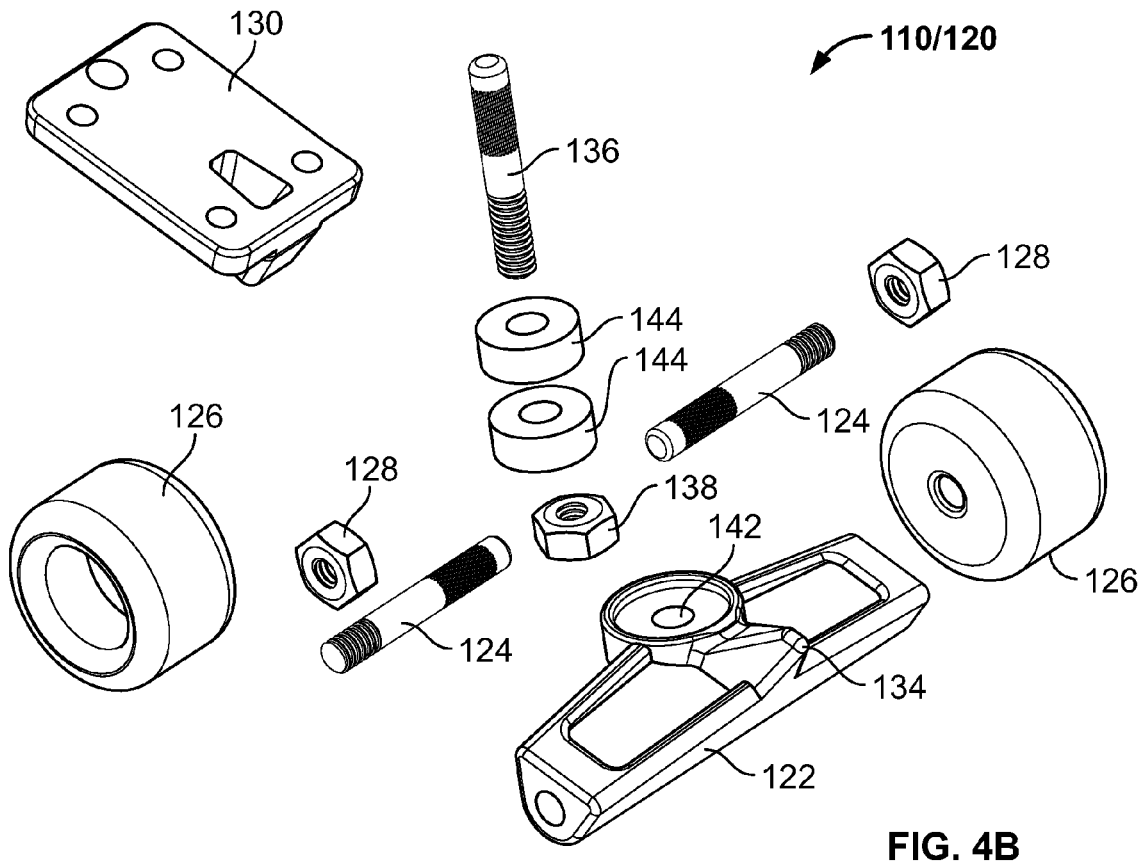
FIG. 4B is an exploded view of FIG. 4A in accordance with one embodiment of the present invention.
Figure 4C:
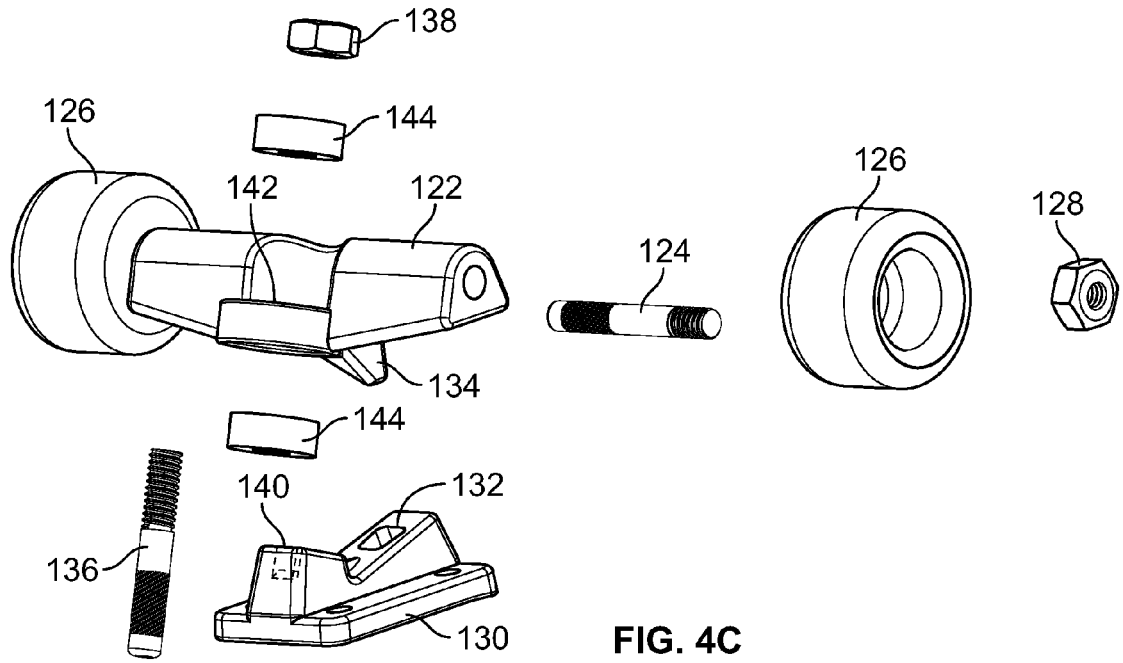
FIG. 4C is view from beneath the assembly of FIG. 4B in accordance with one embodiment of the present invention.

Referring now to FIGS. 4A through 4C there is illustrated one of the non-motorized truck assemblies (110/120) which includes an axle housing hanger 122 with a pair of axles 124 that extends transversely to the deck 102 and through the hanger 122. Wheels 126 are separately mounted at opposing ends of the pair of axles 124 and a secured onto the axles by a nut 128. Preferably, the wheels 126 rotate independently of each other so that the skateboard can negotiate turns without binding. The nut 128 may be replaced with a more general retainer that allows the user to replace or swap wheels to customize the skateboard. The hanger 122 is attached to a base plate 130, which is secured to the lower surface 104 of the deck 102. The base plate 130 includes a pivot cup 132 (FIG. 4C) which receives a pivot member 134 extending from the hanger 122. A king pin 136 is placed in a bore 140 on the base plate and aligned through an opening 142 in the hanger 122 with a king pin nut 138 being secured on the end; and a pair of bushings 144 are positioned on either side of the opening 142 in the hanger 122.

An important aspect to one or more embodiments of the present invention is that the deck 102 is relatively small in thickness throughout the length of the board. This permits the deck 102 to be used by an operator as illustrated in FIG. 1 without a motor assembly or controlled with a remote control unit when the rear truck assembly 120 is removed and replaced with a motorized rear truck assembly 200. As such, the motorized rear truck assembly 200 is completely self-contained. As found in the prior art, motorized toy skateboards include one or more components in a large constructed deck. These components may be batteries, circuit boards, mechanical links, motors, and/or gears. As illustrated herein, the motorized rear truck assembly 200 is completely self-contained and therefore may be easily removed and exchanged with a non-motorized rear truck assembly 120.

Figure 5A:
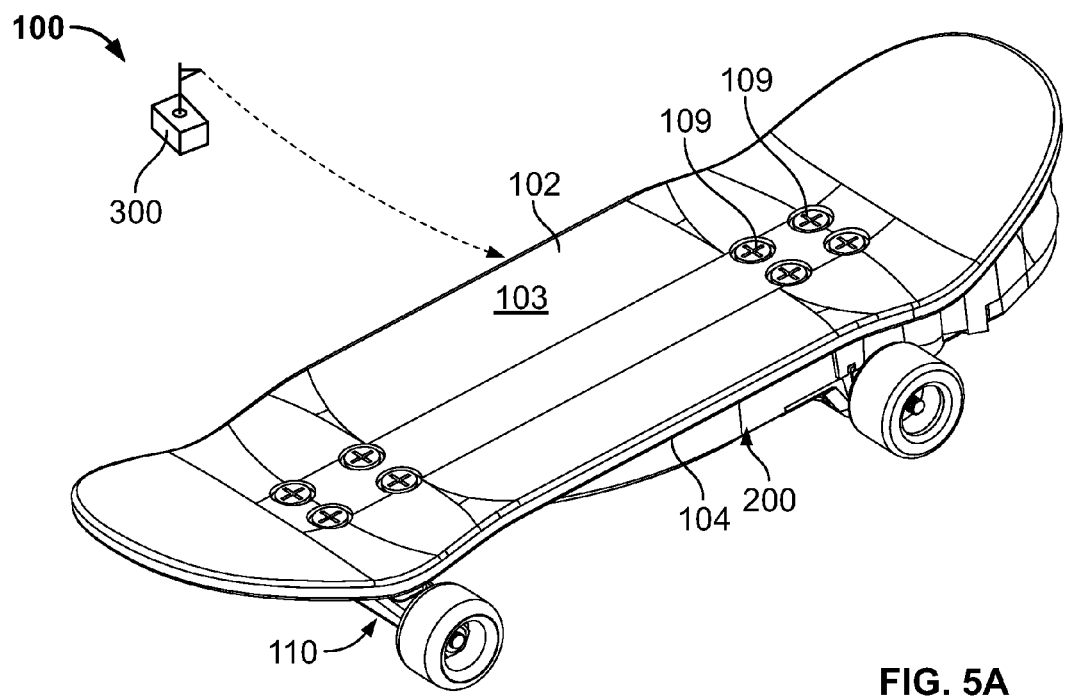
FIG. 5A is a perspective view of a motorized toy skateboard in accordance with one embodiment of the present invention.
Figure 5B:
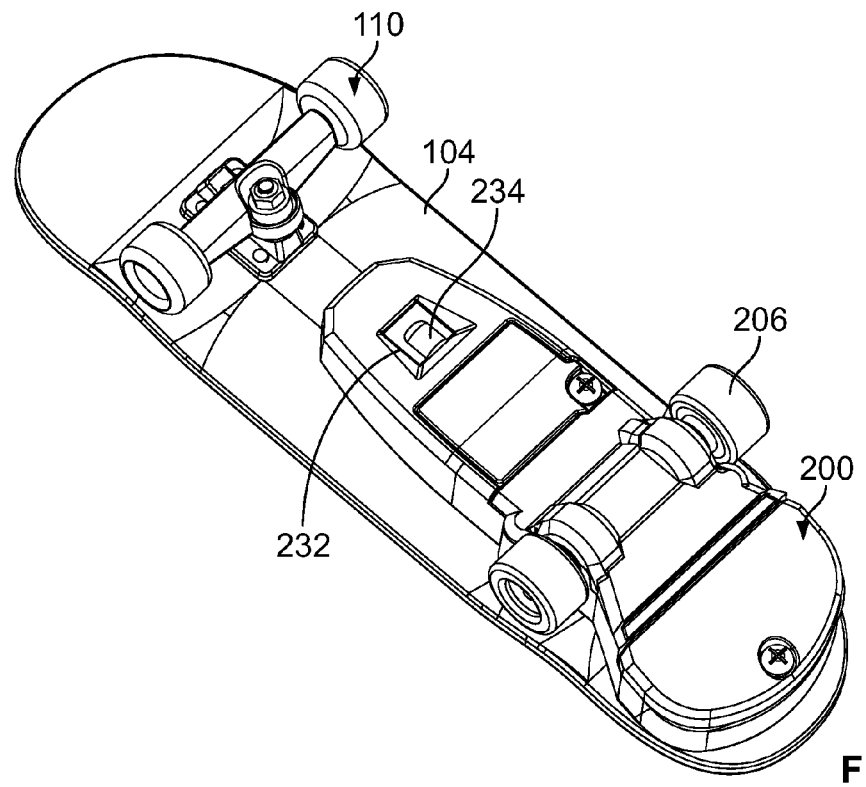
FIG. 5B is a lower view of the motorized toy skateboard from FIG. 5A in accordance with one embodiment of the present invention.
Figure 5C:
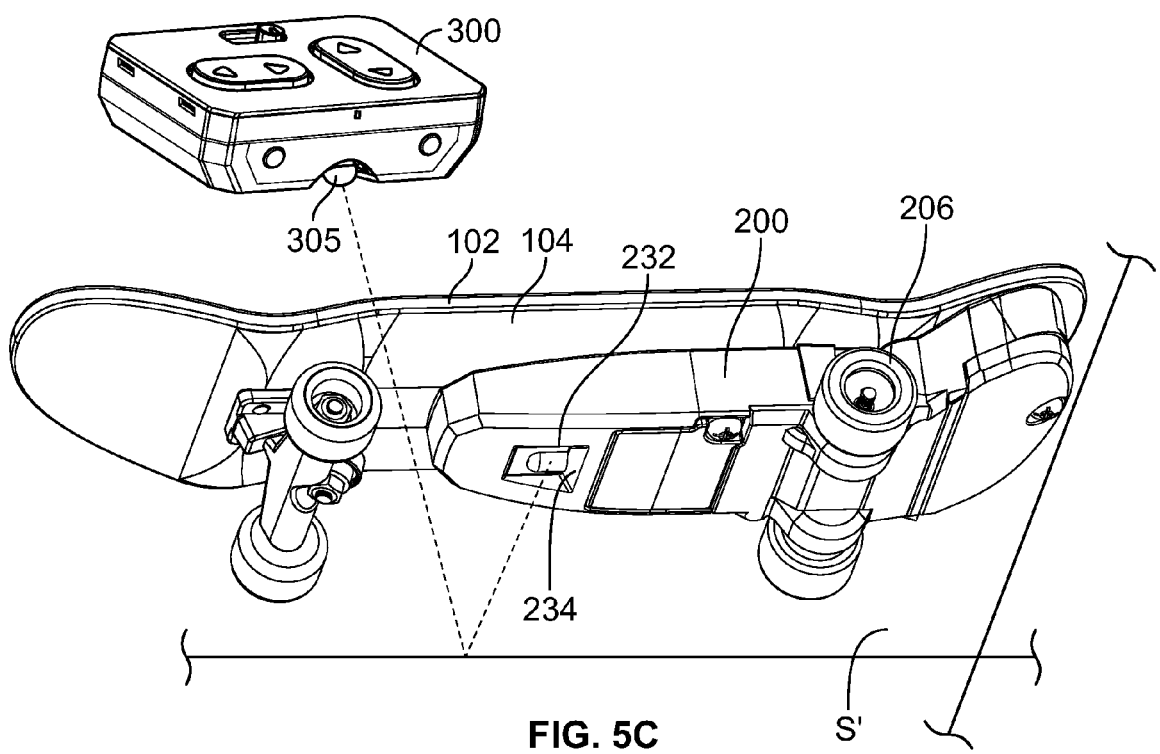
FIG. 5C is a lower view of the motorized toy skateboard from FIG. 5A in accordance with one embodiment of the present invention.
Figure 7A:
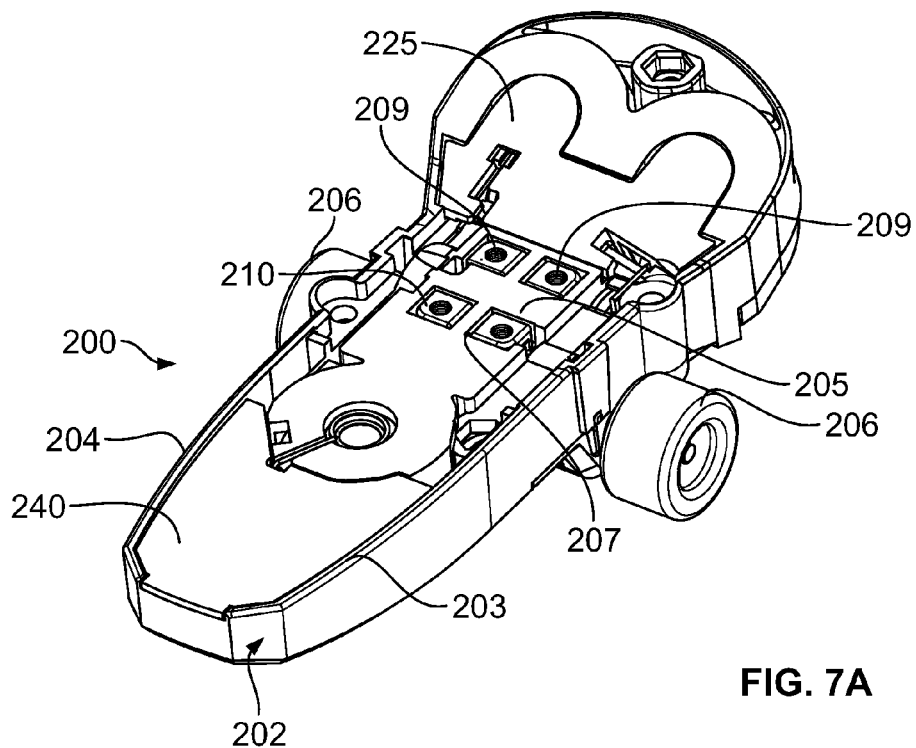
FIG. 7A is a perspective view of the assembled motorized rear truck assembly in accordance with one embodiment of the present invention.
Figure 7B:
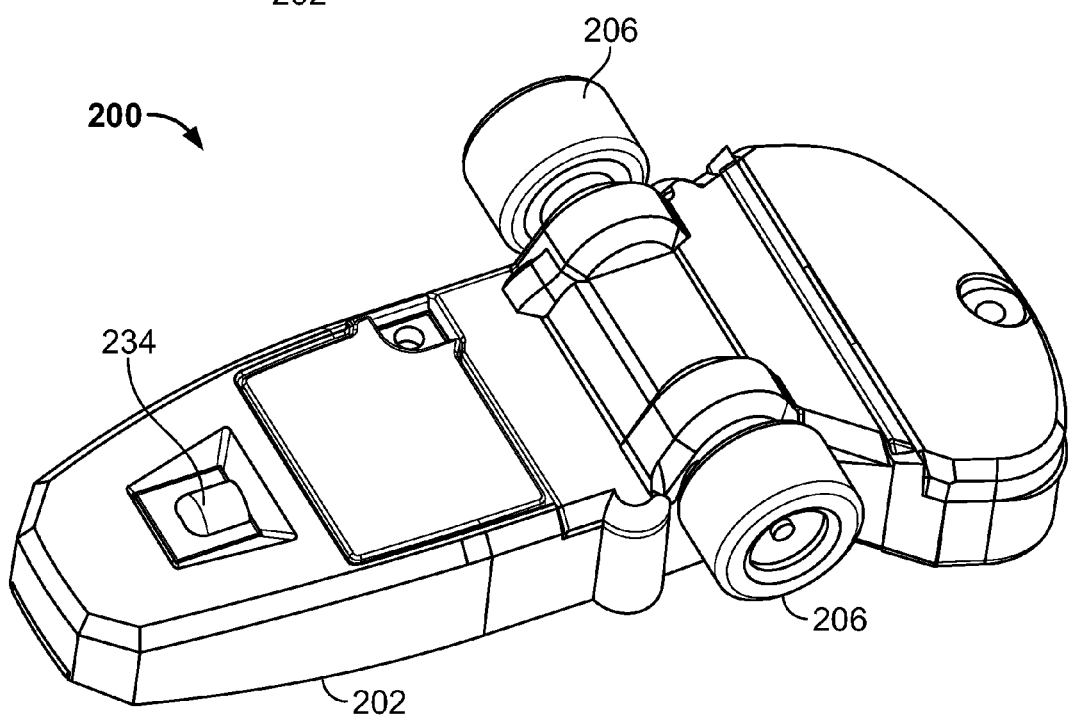
FIG. 7B is a lower view of the assembled motorized rear truck assembly from FIG. 7A in accordance with one embodiment of the present invention.
Figure 9:
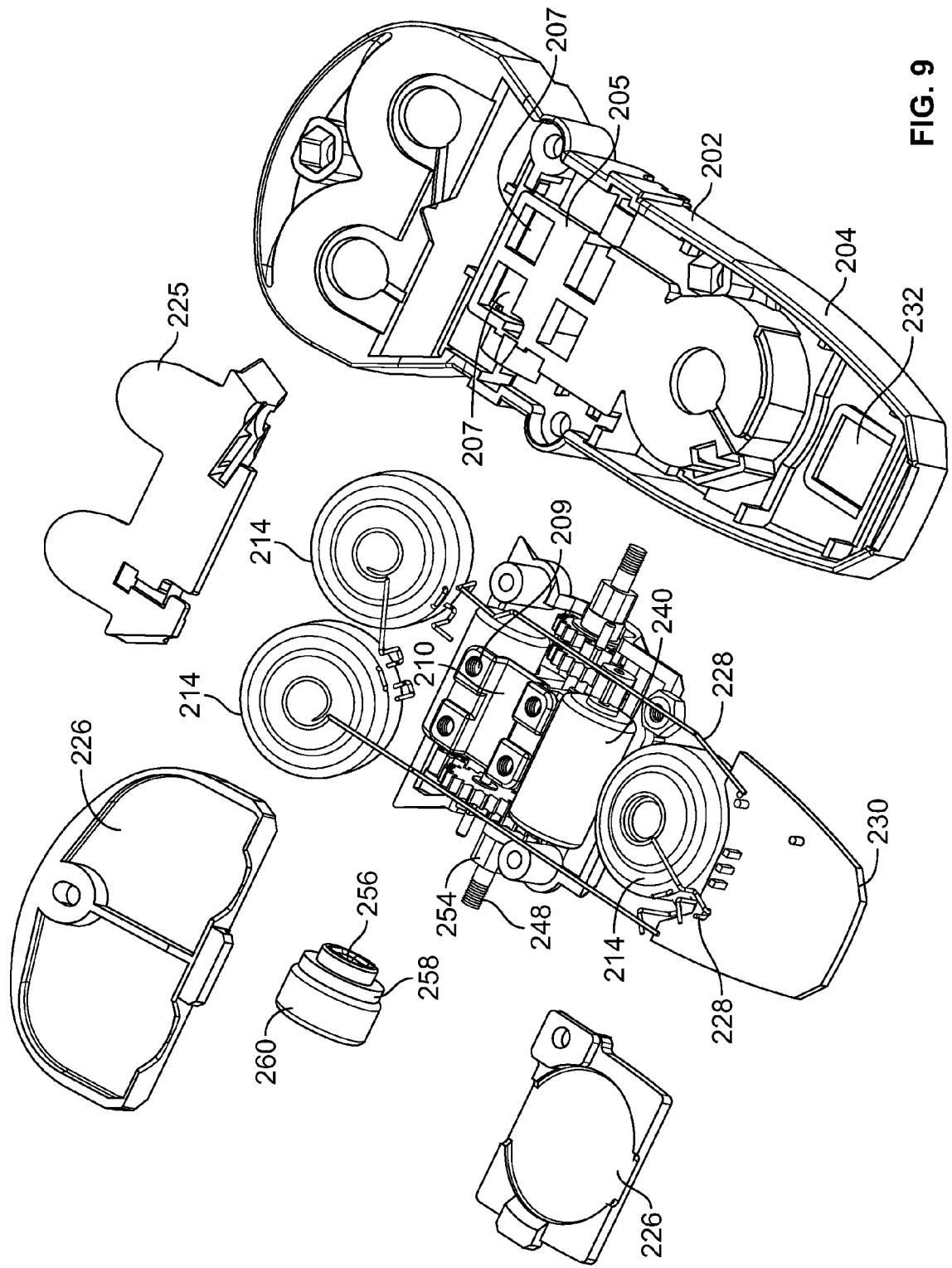
FIG. 9 is a partial exploded view of the motorized rear truck assembly from FIG. 7A in accordance with one embodiment of the present invention.
Figure 10:
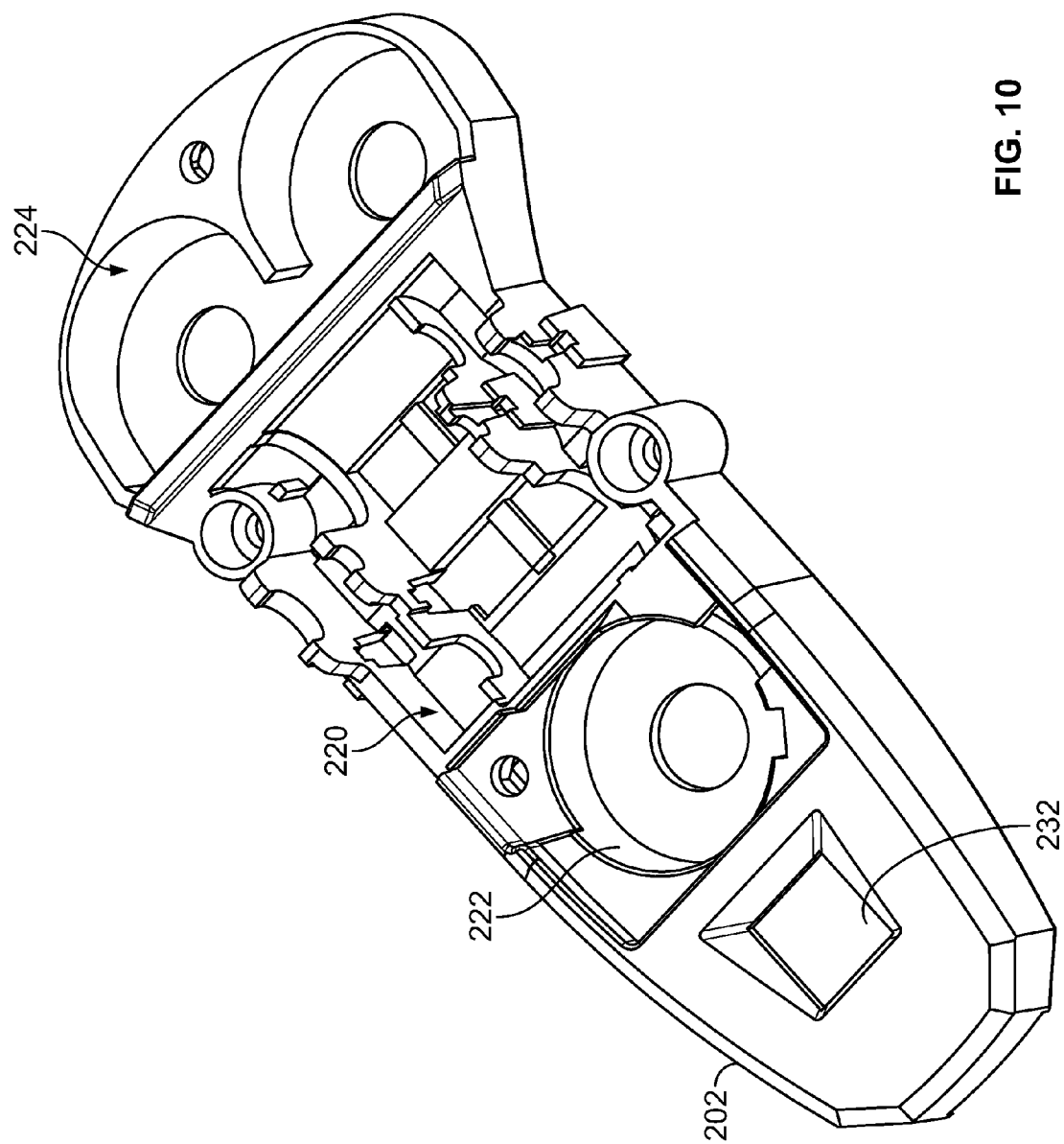
FIG. 10 is a perspective view of the housing from the motorized rear truck assembly from FIG. 7A in accordance with one embodiment of the present invention.
Figure 11:
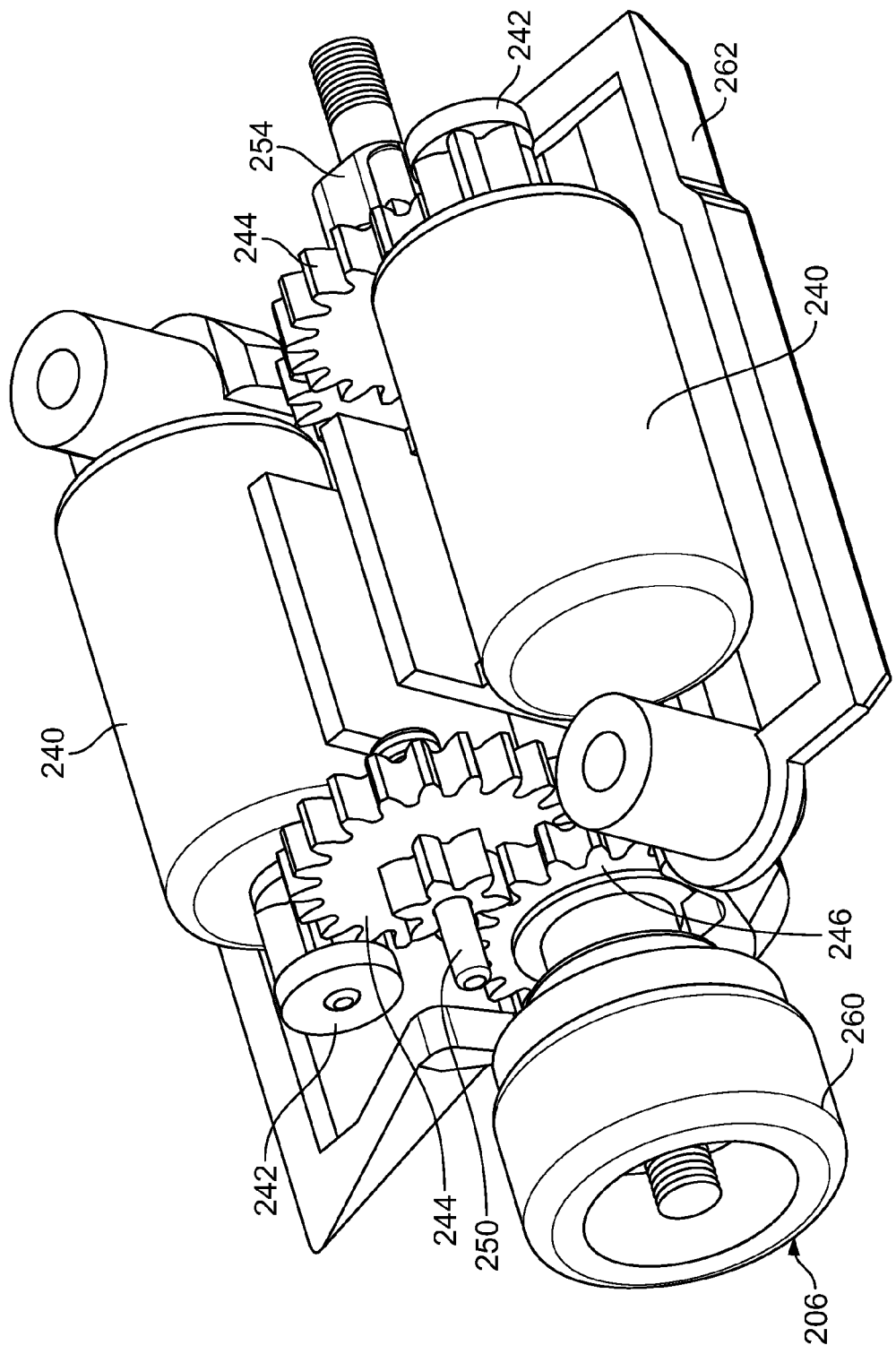
FIG. 11 is a partial perspective view of the gear housing compartment from the motorized rear truck assembly from FIG. 7A in accordance with one embodiment of the present invention.
Figure 12:
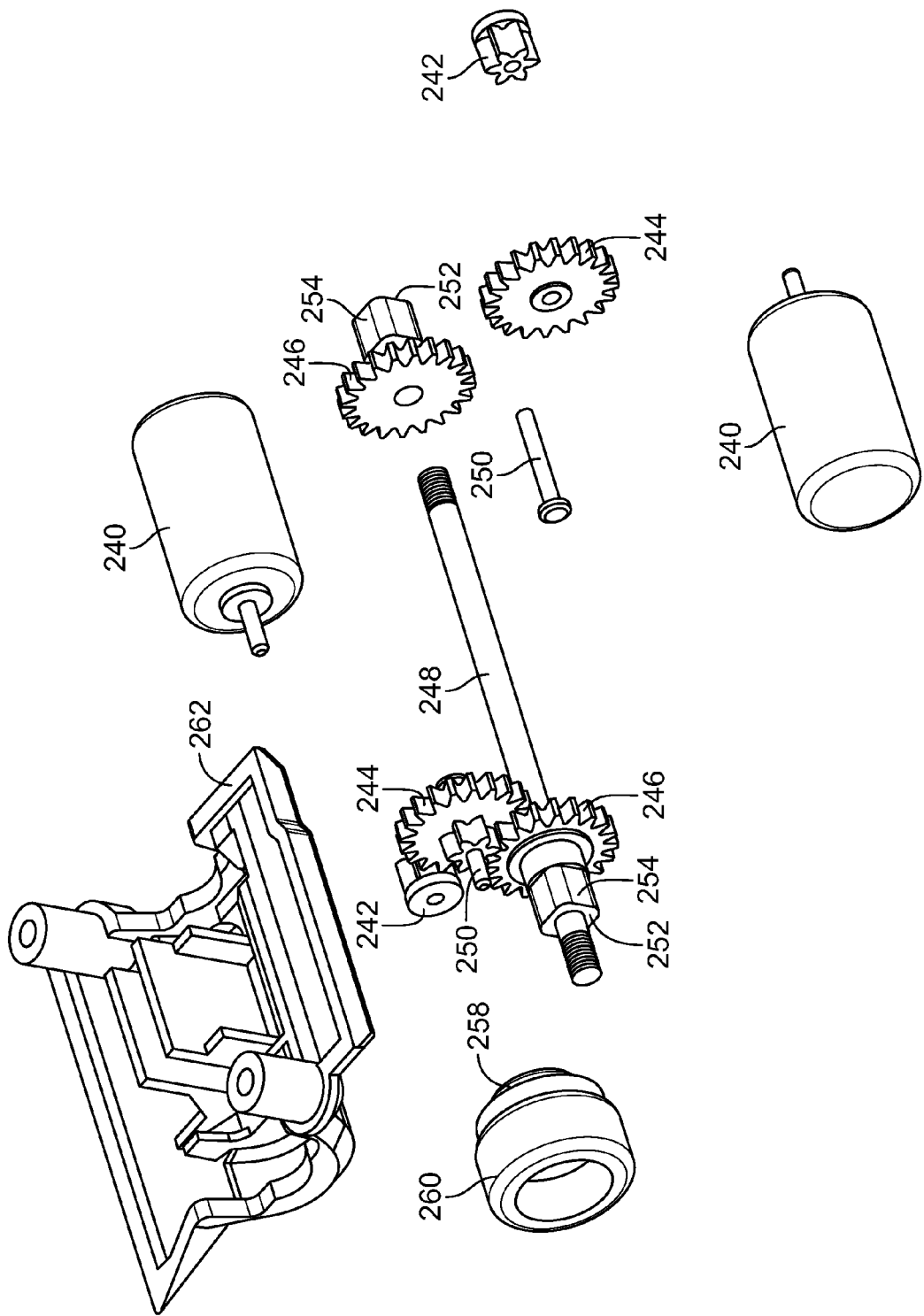
FIG. 12 is an exploded view of the gear housing compartment from FIG. 11 in accordance with one embodiment of the present invention.

Referring now to FIGS. 5A through 6, the skateboard 100 is illustrated with a front truck assembly 110 and a motorized rear truck assembly 200 in accordance with an embodiment of the present invention. As provided herein, the skateboard 100 when employed with the motorized rear truck assembly 200 still rests on the surface in a similar configuration as if the skateboard 100 included a non-motorized rear truck assembly 120 (see FIG. 6) and does so without having to place any components into an oversized deck assembly. However, when motorized, maneuverability of the skateboard 100 can be controlled by an operator through a remote control unit 300. Therefore, two complete play patterns are developed. First, using a non-motorized truck assembly 120, the skateboard 100 can be used as a typical fingerboard. Second, by removing the fasteners 109, the non-motorized truck assembly 120 can be removed and replaced with the self-contained motorized truck assembly 200, and then secured to the deck with the same fasteners 109.

Referring now to FIGS. 7A through 12, the motorized rear truck assembly 200 includes a housing 202 that is elongated with an upper surface 204 or upper profile 203 that substantially matches the lower surface 104 of the deck 102 which aids in keeping all of the components substantially below the lower surface of the deck and allows the pair of rear wheels 206 to substantially align along a similar plane as the front wheels 126 when the wheels are resting on a surface. A fastening plate 210 is positioned under a portion 205 of the upper surface 204 of the housing 202. The portion 205 of the upper surface 204 includes openings 207 that are aligned with threaded openings 209 in the fastening plate 210 and which align with the rearward openings through the deck 102 such that the fasteners 109 can easily secure and release the entire housing 202 by the fastening plate 210, and thus configured to release or secure the rear motor truck assembly 200.

The housing 202 includes a gear housing compartment 220, a first battery compartment 222 forward of the gear housing compartment 220, and includes a second battery compartment 224 rearward of the gear housing compartment 220. The first battery compartment 222 accommodates a first battery 214 in front of the gear housing compartment 220, while the second battery compartment 224 accommodates a pair of batteries 214 rearward of the gear housing compartment 220. The first and second battery compartments are accessible from under the housing 202 and secured with battery doors 226. The batteries are connected to a circuit board 230 through various wires 228. To aid in securing the wires 228 in place the second battery compartment 224 may include a battery bracket 225 secured over the compartment 224.

Figure 14A:
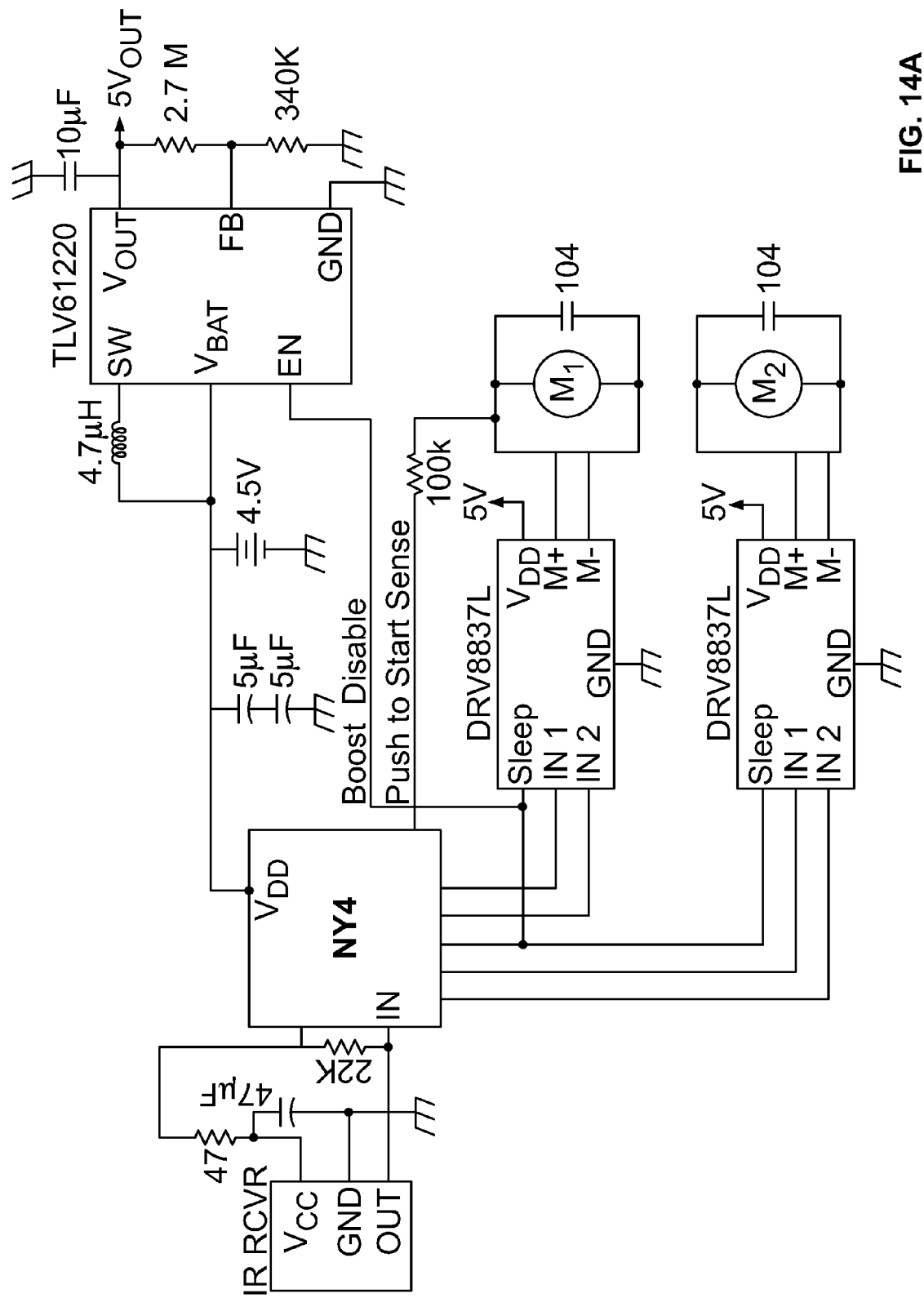
FIG. 14A is an electrical schematic drawing of a motorized toy skateboard in accordance with one embodiment of the present invention illustrating the use of a direct wire to trigger different functionality states in the vehicle.
Figure 14B:
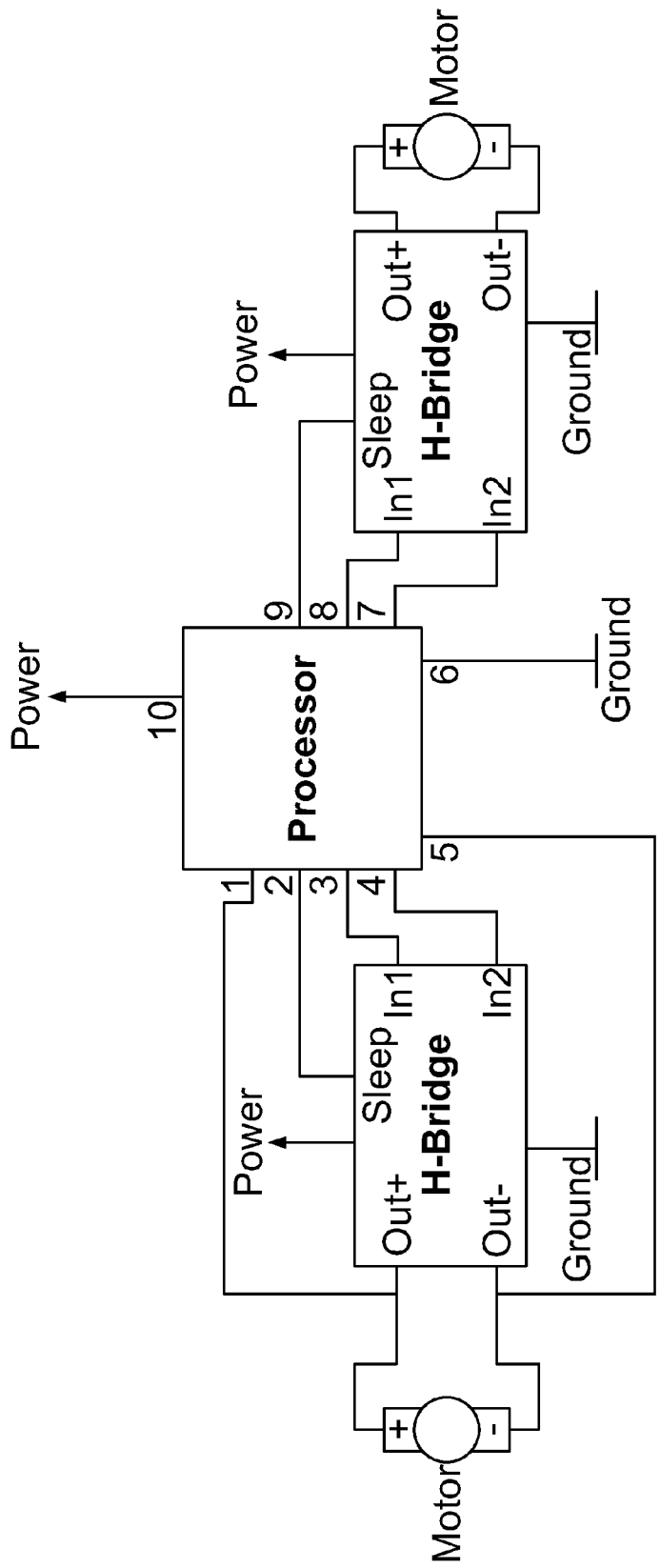
FIG. 14B an electrical schematic drawing of a motorized toy skateboard in accordance with one embodiment of the present invention.
Figure 15:
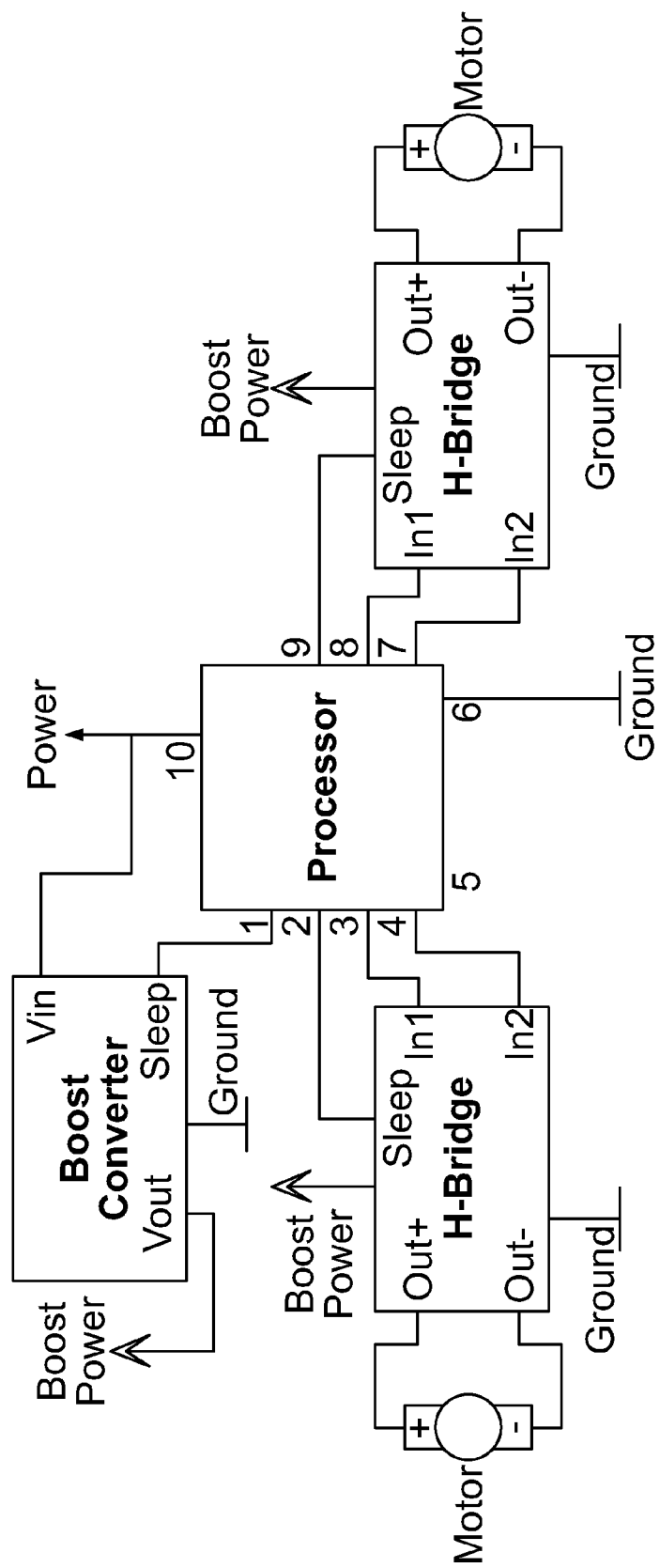
FIG. 15 is an electrical schematic drawing of a motorized toy skateboard in accordance with one embodiment of the present invention illustrating the use of a booster component to trigger different functionality states in the vehicle.
Figure 16:
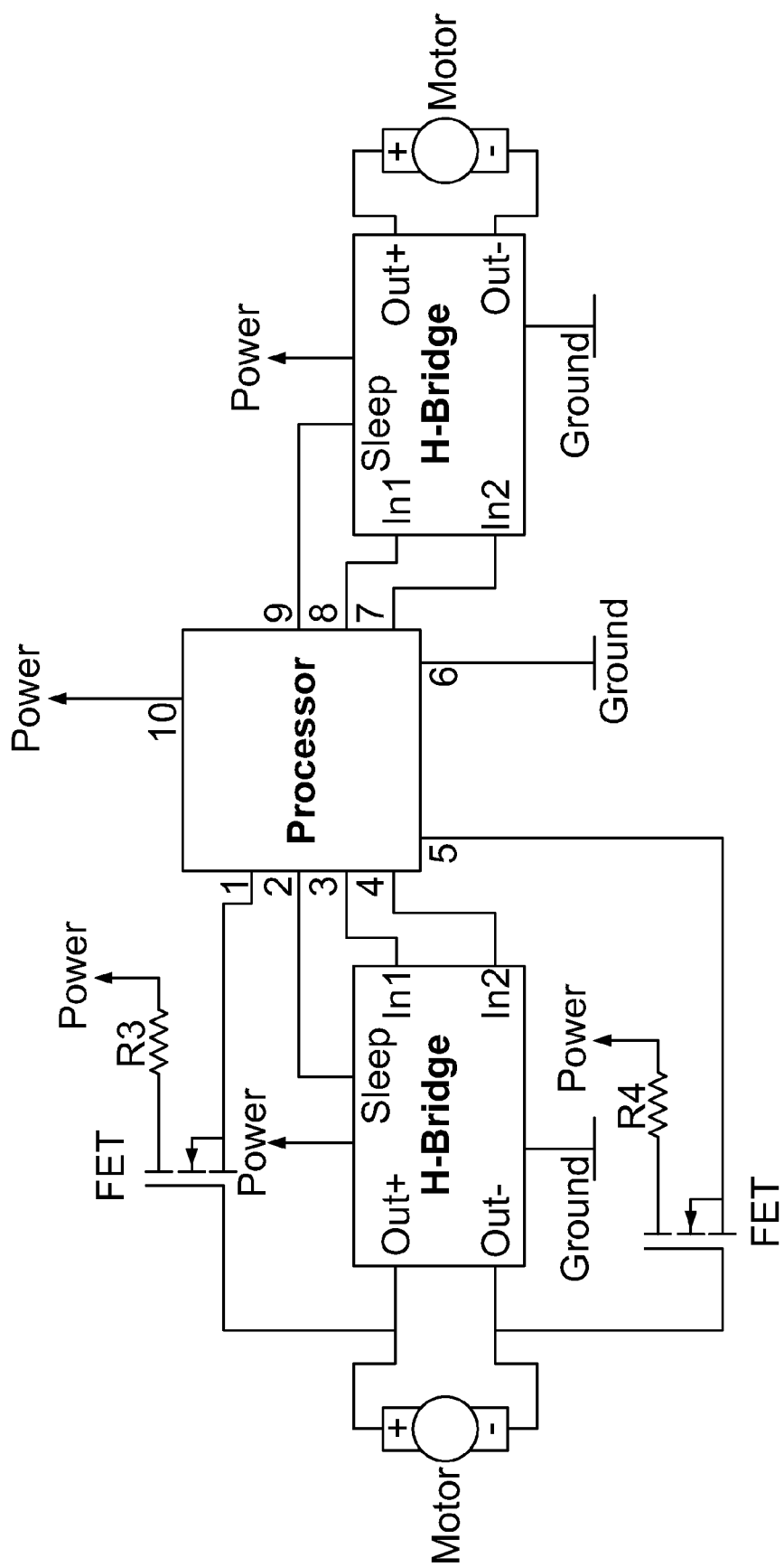
FIG. 16 is an electrical schematic drawing of a motorized toy skateboard in accordance with one embodiment of the present invention illustrating the use of an FET component to trigger different functionality states in the vehicle.
Figure 17:
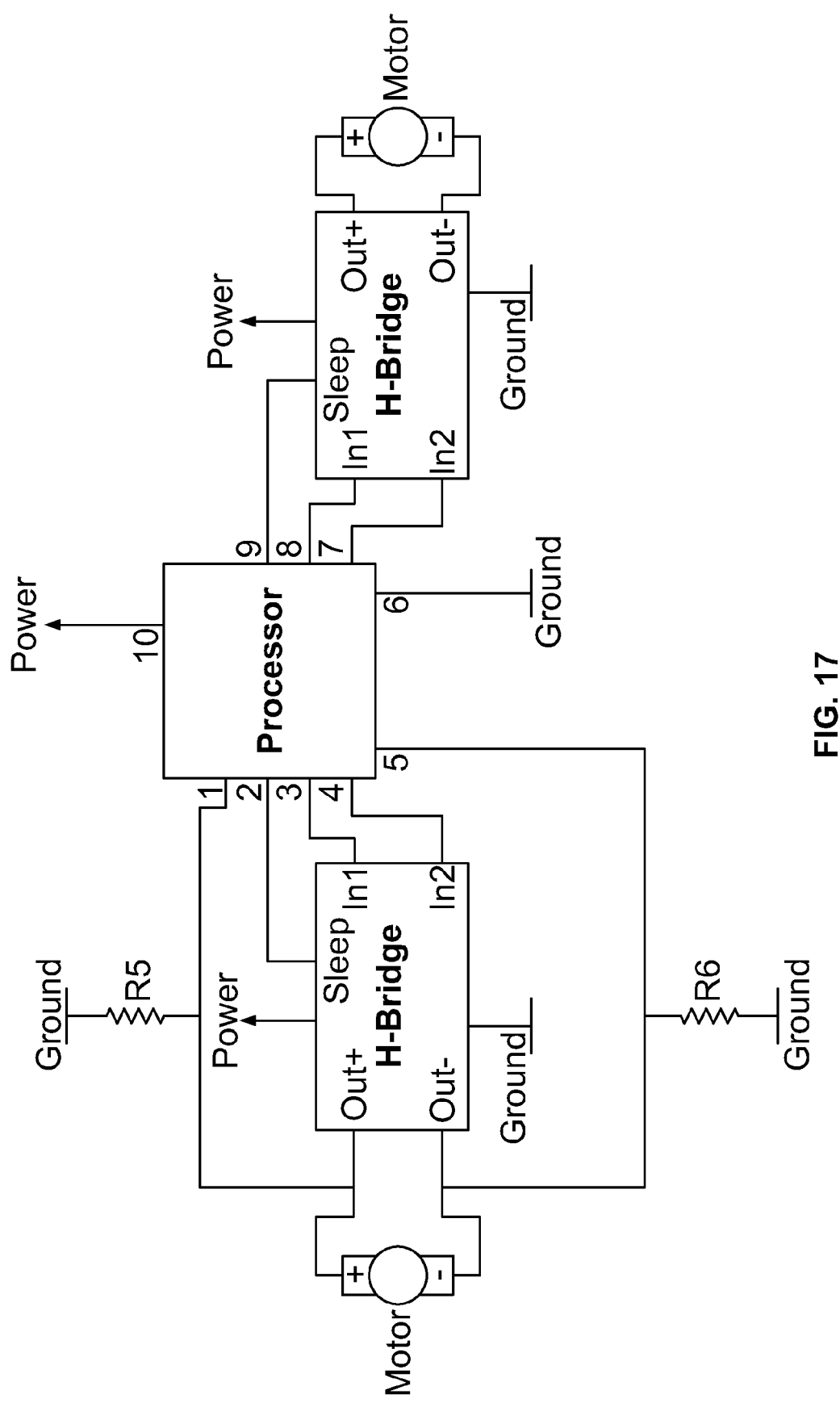
FIG. 17 is an electrical schematic drawing of a motorized toy skateboard in accordance with one embodiment of the present invention illustrating the use of an a pull-down resistor component to trigger different functionality states in the vehicle.
Figure 18:
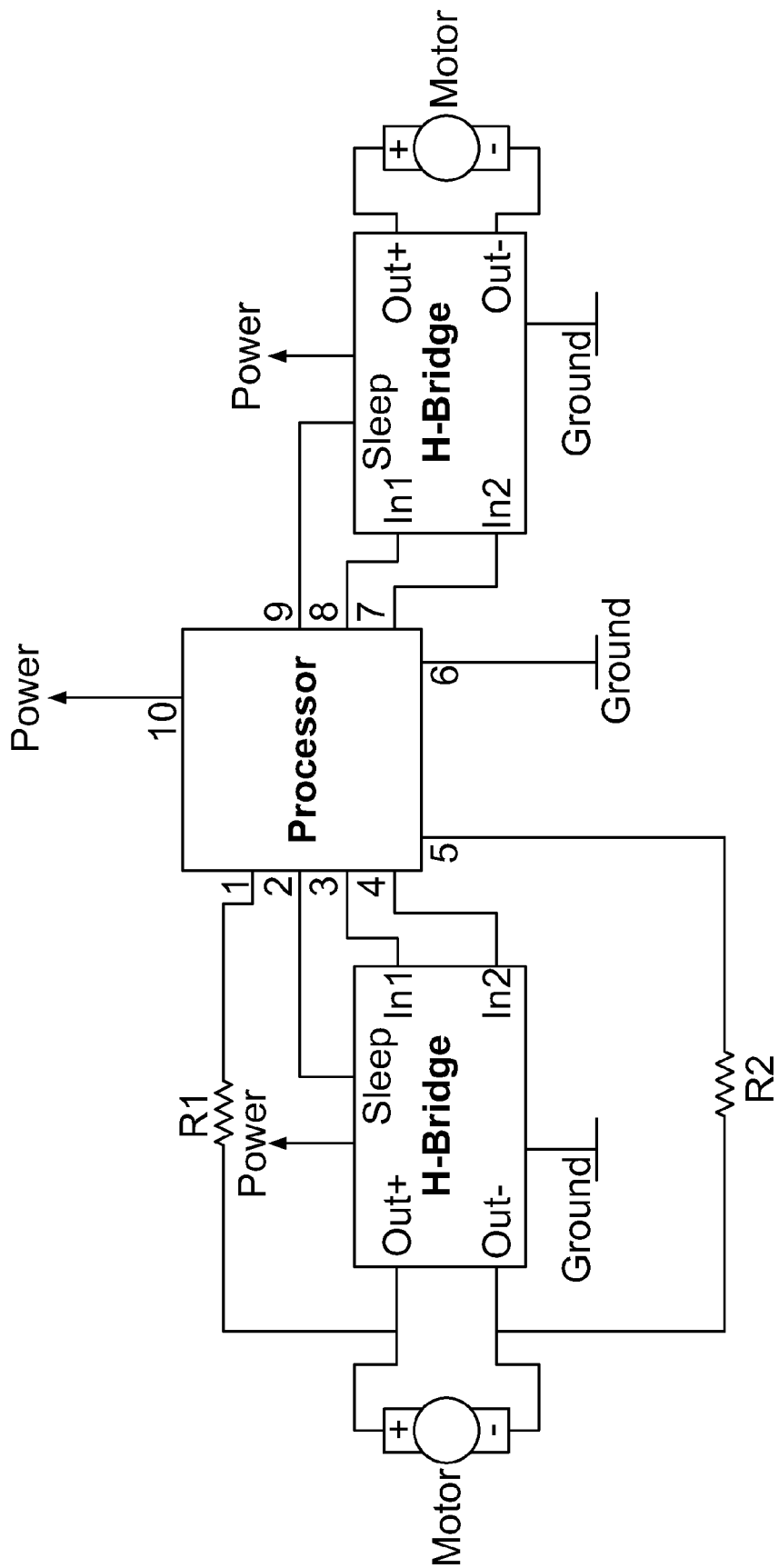
FIG. 18 is an electrical schematic drawing of a motorized toy skateboard in accordance with one embodiment of the present invention illustrating the use of an a series resistor component to trigger different functionality states in the vehicle.

The housing 202 further includes a forward window 232 for the placement of an IR sensor 234 which is in communication with the circuit board 230; its control may be shown and illustrated in the electrical schematic of FIG. 14. The IR sensor 234 is positioned to receive signals from the remote control unit 300. From a top view, the circuit board 230 is positioned over the forward window 232 with a PCB cover 240 secured over the circuit board 230 and secured to a forward section of the housing 202. Since all of the components are positioned within the housing and below the lower surface of the deck, the IR sensor 234 is positioned to receive signals from the remote control unit 205 that are bounced from a surface S. In addition, the IR transmitter 305 from the remote control unit 300 is angled downwardly to help in ensuring the signal is sent downwardly towards the surface.

The gear housing compartment 220 holds a pair of rotary motors 240 separately driving each of the rear wheels 206. Each motor 240 includes a drive gear 242 which is meshed to a gear reducer 244 and which is further meshed to a wheel axle gear 246 that is capable of freely spinning on a rear axle 248. The rear axle 248 extends through the housing 202 transversely to the deck 102. A pin 250 is employed to rotatably secure the gear reducer 244 to the gear hosing compartment 220. The wheel axle gear 246 further includes an end key 252 with an external profile 254 that matches an internal profile 256 positioned on a wheel hub 258. A tire 260 is positioned over the wheel hub 258 to create the rear wheel 206. The gear housing compartment 220 includes a lower gear housing cover 262 that secures the components in place.

Figure 13:
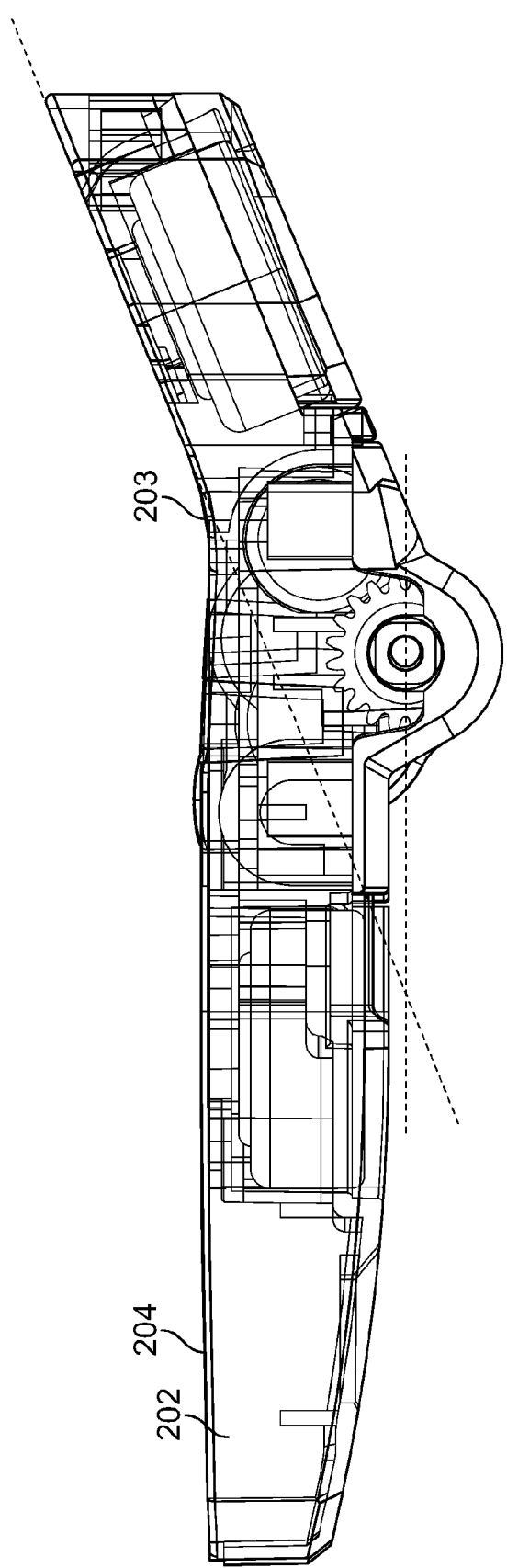
FIG. 13 is a side view perspective view of the assembled motorized rear truck assembly from FIG. 7A in accordance with one embodiment of the present invention.

Referring now to FIG. 13, as noted above, the housing 202 defined for the motorized rear truck assembly 200 includes an upper surface profile 203 to match the lower surface 104 of the deck 102, as such the housing includes a rearward portion of the second battery compartment 224 that is angled from a horizontal at an angle between 10 and 45 degrees and more particularly at about 22 degrees to match the upturn angle in the rear end 108 of the deck.

As defined in various embodiments herein the remote controlled battery powered skateboard is defined as a fingerboard toy skateboard approximately 4 inches long. Completely positioned underneath the deck lower surface are the batteries, motors, gears, and circuit board. The motors may be small 6 mm diameter by 11 mm long cylinder motors. Each motor independently controls one rear wheel. A high efficiency gear reduction provides a drive speed near 1 meter per second. The circuit board receives power from the battery, receives infrared signals from the remote control device, and commands the motors using a processor, DC-DC switch, H-Bridges and software.

It is desired in one or more embodiments to provide a toy skateboard that is both fast and able to climb steep ramps. Various play patterns and accessories in the field demand various attributes in order for the toy motorized skateboard to operate properly. Various maneuvering capabilities would include the ability to drive straight forward or reverse, turn wide in any four directions, spin left or right, and climb hills starting from a stop position at the base of the hill and from a moving position.

Placing all the components below the skateboard deck has two specific advantages. First, this hides them from the user's line of sight, making the skateboard look like a normal riderless skateboard. Second, keeping the center of gravity as close to the ground as possible reduces rolling forces on the skateboard when turning. Reducing the rolling forces will help keep the skateboard in full contact with the ground and improve maneuverability and control.

Consistent repeatable performance will be critical to the user. Typical battery powered products move faster when the batteries are full and slower when the batteries are nearly depleted. This would make practicing tricks more difficult as the user would need to adjust their timing for the current battery level. Additionally, some maneuvers may not be possible at lower battery levels. To eliminate this issue, a constant voltage is generated and supplied to the motors. This consistent voltage will make all maneuvers and trick timing consistent from full battery to depleted battery. Boost circuits, known to those in the arts, are used to power logic circuits that require a narrow range of voltage to operate. In this application where motor current is relatively low, it is possible to use low cost boost circuits to power two motors. Buck circuits, known to those skilled in the art, may also be employed to provide a consistent and repeatable motor voltage. The choice of buck versus boost circuit depends on whether the motor supply voltage is required to be higher or lower than the battery voltage, which depends on the specific requirements of the embodiment. Either choice of converter type falls within the scope and spirit of the present invention.

The remote for the toy skateboard will have the usual forward/reverse and right/left controls. In another embodiment, the remote employs "tank" control, with left controls to control the left propulsion and right controls to control the right propulsion. In an alternative embodiment, additional "Trick" buttons are added. A Trick button sends a single trick command to the toy skateboard. In one embodiment this trick is a simple 180 degree wide turn. In another embodiment the trick is something more complex. Once the trick command is received user controls are disabled. In another embodiment, user controls are allowed to let the user perform a half of a trick followed by their own move if their timing is good. Embodiments disallowing trick termination may be better for younger users. In another embodiment, holding the trick Play button causes the trick to be repeated. In a further embodiment, the remote has a record button. When the record feature is initiated, every button pressed by the user is simultaneously transmitted and recorded until the record button is pressed again. In this instance, when the Trick button is pressed, the recorded moves are transmitted to the toy skateboard, performing a custom user generated trick maneuver.

Figure 20A:
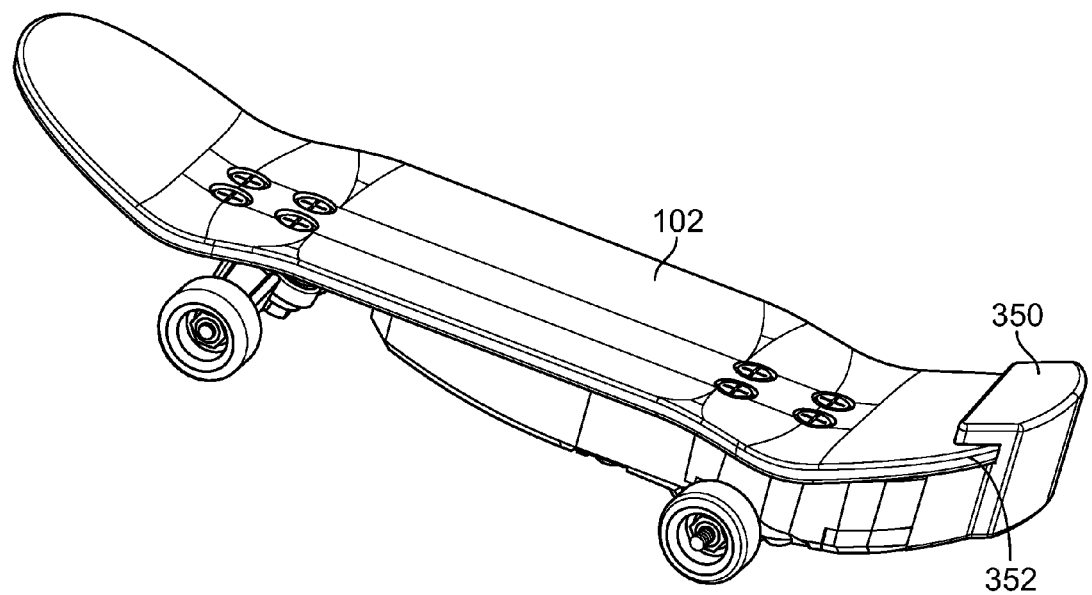
FIG. 20A is a perspective view of a skateboard having a trick weight attached.
Figure 20B:
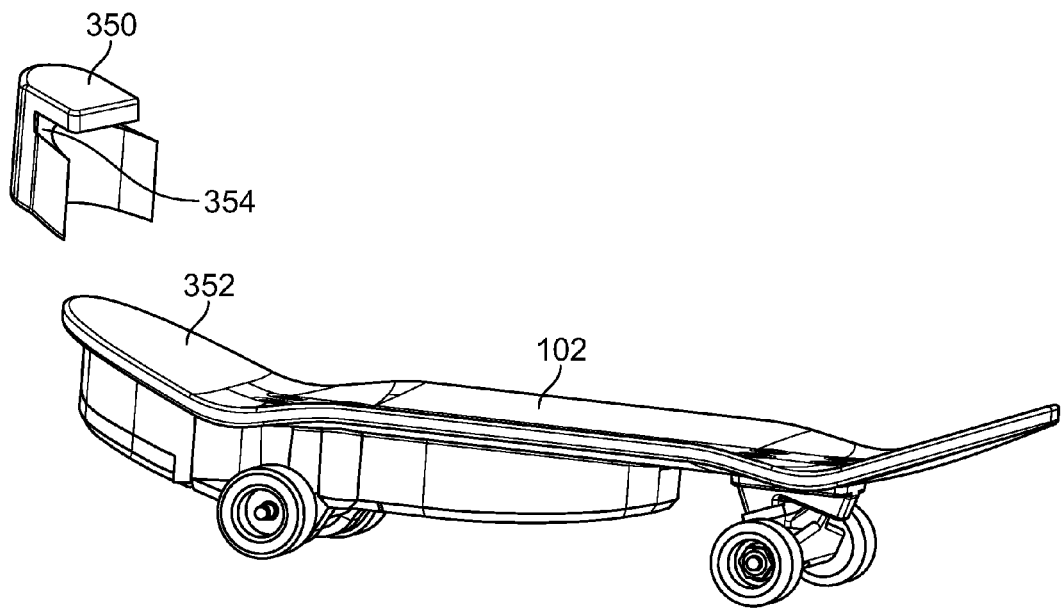
FIG. 20B is a perspective view of the skateboard of FIG. 20A with the trick weight removed from the skateboard deck.

Driving forward can be modified by the addition of a weight 350 at the rear tip of the toy skateboard as shown in FIG. 20B. This weight shifts the center of gravity aft, allowing the skateboard 100 to lift the front wheels 126 off the ground when accelerating. Depending on the amount of weight, location of weight 350, and the toy skateboard 100 configuration, the front wheels 126 may stay off the ground as long as the skateboard 100 continues forward.

Driving in a spin involves turning the rear wheels 206 in opposite directions. This causes the toy skateboard to spin about a center of spin. The center of spin is a function of the center of the power wheels 206, the center of gravity, and the drag created by friction and load on the wheels 206, 126. The addition of weight 350 at the rear tip of the toy skateboard modifies the spin. When weight 350 is present, the center of gravity is moved aft and the load is transferred off the front wheels. This causes the toy skateboard to spin about a point very near the rear wheels 206, significantly increasing the spin speed.

The two features of adding a rear weight can be accomplished by the same weight 350, hereafter referred to as a trick weight 350.

In another embodiment of the present invention, the toy skateboard 100 is not employed with an on/off switch. To turn on toy skateboard 100, the operator can push or roll the toy skateboard 100 forward while on a supporting surface. This "Turn ON" feature simplifies use, feels more realistic for kids, and reduces cost. Once ON, the toy skateboard 100 immediately performs an easily recognizable pre-programmed movement pattern to indicate that it is ON. In one embodiment, the pattern is to drive forward for a predetermined amount of time. In another embodiment, the skateboard 100 turns right, then left several times. In one embodiment, the ON Pattern can be initiated immediately upon detection. In another embodiment, the ON Pattern is delayed until the user stops rolling the toy. In this embodiment, the delay improves the recognition of a successful ON, and is more visually appealing. In yet another embodiment, the motors can are pulsed in a pattern to create a haptic response that the user can feel. In one embodiment, detection of a forward roll is achieved by connecting one of the two motor 240 leads to a processor 406 input. When the toy skateboard 100 is rolled, the wheels turn, causing motor 240 to generate a back EMF voltage. The back EMF voltage generated is a function of the speed the motor 240 is turned and the specific design of the motor 240. As an example, voltages of up to 1.5 v are easily generated, and voltages up to 3 v are generated with higher roll speeds. Once the detected back EMF voltage reaches a pre-determined value, such as 0.7 v, or the threshold voltage of an input pin of a processor 406 or transistor, or a specific voltage read by an analog to digital input, the processor 406 is configured to wake up from a sleep state. The skateboard circuit must is carefully designed to minimize current draw during the sleep state. This Turn ON method eliminates the typical ON button or switch, reducing cost.

In another embodiment, the circuit connects both leads of the motor 240 to two separate processor 406 input pins. In this way, both roll forward and roll reverse are detected by the processor 406. These roll commands are recognized in a sleep state, and at any time. The processor 406 monitors the input pins to both leads of the motor 240, when the motors 240 are not commanded to move, thereby, processor 406 detects user roll commands. In an alternative embodiment, this method is expanded to detect both motors 240 and both motor 240 directions. In this embodiment turning the skateboard is also be detected, and provides additional user input to enhance skateboard control. In the embodiment, the processor 406 detects roll forward to wake to the ON state, and roll backwards to turn OFF into a sleep state.

In one embodiment the use of a plurality of controllers 300 to individually operate a plurality of skateboards 100 is incorporated. This is done by the use of channel address bits in the command signal emitted from the controller 300 and received by the skateboard 100. In the embodiment, transmitters 300 are factory preset with specific channel designators. The channel designators are transmitted with each command by controllers 300 comprising the channel address. When a skateboard 100 is turned ON, it initially does not know which channel it is intended to respond to. However, it sets its channel address based on the first command it receives. In this way, a user can cause a particular skateboard 100 to respond to a particular controller 300 by ensuring that the first command the skateboard 100 receives after it is turned on comes from the intended controller 300.

As it may be, in executing the above technique a skateboard 100 may inadvertently receive a first command from an undesired controller, thereby incorrectly setting its channel address. In this case, the user need only turn off skateboard 100, and then turn on skateboard 100, this time ensuring that it receives its first command from the desired controller 300. This may be repeated as necessary until the appropriate pairing has been achieved.

The aforementioned technique requires a means of turning off skateboard 100 on demand, and thus, the embodiment provides for a means where the skateboard 100 goes to sleep when it is rolled backwards by the user. Turning OFF additionally increases battery life. Since rolling the skateboard forward is associated with ON, it is intuitive and therefore provided that the opposite would turn the device OFF. The turn ON feature's haptic response of the skateboard 100 moving the desired intuitive feedback corresponding to the act of turning OFF. A haptic response that does match the action is for the skate board to stop, or resist, motion, and thus is implemented in the preferred embodiment. In an embodiment, the motors 240 are set into braking mode to accomplish this wherein the motor 240 leads are shorted to one another. In an alternative embodiment, as similar sensation is implemented by the application of momentary power to the motor in the opposite direction, creating more resistance than braking alone.

In an embodiment, additional rolling input from the user changes the skateboards performance. In the embodiment, a roll function of the skateboard 100 is recognized by processor 406 when a roll-forward is detected after the skateboard is ON. This causes the skateboard 100 to toggle between modes. In one example, the skateboard 100 alternates between 100% maximum speed and 50% maximum speed. A reduction in overall skateboard speed allows new types of low speed tricks that are more difficult at higher speeds.

In addition, there are more settings that may be employed such as disable or enable coasting, disable or enable 50% max speed or 100% max speed, slow turning with full forward/reverse, fast turning and slower forward/reverse, forward & turning normal with braking instead of reverse, and braking for ramps. These can be controlled and set by the user either through a remote control unit or through the manual manipulation of the toy skateboard, as discussed herein.

Figure 19:
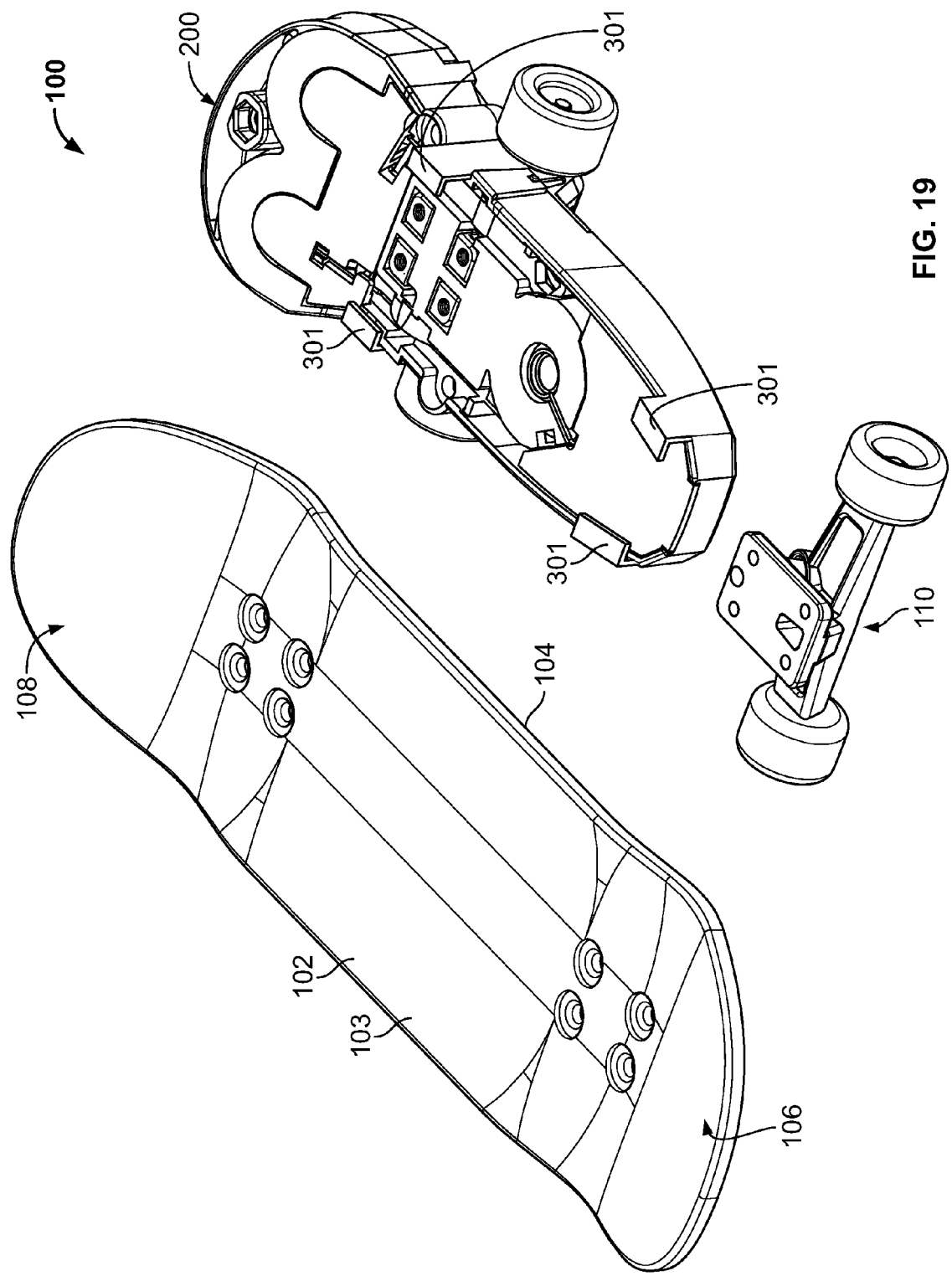
FIG. 19 is a perspective view of a skateboard having clips to secure the motorized truck assembly to the deck.

Referring now to FIG. 19, there is shown a toy skateboard 100 in accordance with one or more of the present embodiments, in which the rear truck assembly 200 includes clips 301 positioned on the upper surface of the rear truck housing 202 and which are used to attach to the deck 102. In this embodiment the rear truck assembly 200 is removable and secured to the deck 102 such that the rear truck housing 202 is below the lower surface of the deck 102. However, in this embodiment the clips 301 allow the rear truck to either snap or slide onto the deck 102.

Referring now to FIGS. 20A and 20B, there is shown a toy skateboard 100 in accordance with one or more of the present embodiments. The skateboard 100 includes a rear weight member 350 removably secured to the rear end 352 of the deck 102. The rear weight member 350 includes a channel 354 that clips into or frictionally engages the rear end of the deck 102. The weight member 350 as noted above allows the user to move the center of spin of the skateboard 100.

As provided in one or more embodiments of the present invention, a processor 406 is used and discussed and may be embodied in a number of different ways. For example, the processor 406 may be embodied as one or more of various processing means or devices such as a coprocessor, a microprocessor, a controller, a digital signal processor (DSP), a processing element with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an exemplary embodiment, the processor 406 may be configured to execute instructions stored in a memory device or otherwise accessible to the processor 406. The instructions may be permanent (e.g., firmware) or modifiable (e.g., software) instructions. The instructions can be bundled or otherwise associated with other instructions in functional profiles, which can be saved as, e.g., an electronic file on one or more memory device. Alternatively or additionally, the processor 406 may be configured to execute hard coded functionality. As such, whether configured by hardware or software methods, or by a combination thereof, the processor 406 may represent an entity (e.g., physically embodied in circuitry) capable of performing operations according to embodiments of the present invention while configured accordingly. Thus, for example, when the processor 406 is embodied as an ASIC, FPGA or the like, the processor 406 may be specifically configured hardware for conducting the operations described herein. Alternatively, as another example, when the processor 406 is embodied as an executor of software or firmware instructions, the instructions may specifically configure the processor 406 to perform the algorithms and/or operations described herein when the instructions are executed. The processor 406 may include, among other things, a clock or any other type of timer, an arithmetic logic unit (ALU) and logic gates configured to support operation of the processor 406.

In addition and as discussed herein, haptic technology or haptics may be included in one or more of the discussed embodiments. Haptics involve tactile feedback provided by a device to a user. Low-cost haptic devices tend to provide tactile feedback, in which forces are transmitted to a housing or portion thereof and felt by the user, rather than kinesthetic feedback, in which forces are output directly in the degrees of freedom of motion of the interface device. The tactile feedback is typically provided by applying forces, vibrations and/or motions to one or more portions of a user interface device. Haptics are sometimes used to enhance remote control devices associated with machines and devices. In such systems, sensors in the slave device are sometimes used to detect forces exerted upon such device. The information relating to such forces is communicated to a processor, where the information is used to generate suitable tactile feedback for a user. The present invention does not use haptics to enhance the touch experience or to allow the use to feel a virtual object or to simulate reaction forces. The present invention creates tactile responses to a user interaction with a device that the user can easily correlate or deduce to an unseen setting or mode of the object. Unlike pulsing a pager in different patterns to provide a tactile response, the present invention provides tactile responses so the user can determine which setting or mode the object is now configured. Another important aspect of one or more embodiments, is that the tactile responses are relayed back to the user through the element or mechanism that the user touched to create the input in the first place. Unlike the use of sensors or switches in the prior art, the embodiments provided herein use elements, such as wheels and actuated arms that are in communication with a motor. The direct interaction by the user with these elements generates a back electromotive force through the motor, which is monitored or detected by the processor. The processor when triggered by the generated back electromotive force can access and play-back a pre-recorded motion to the element. The user still interacting with the element feels the pre-recorded motion which causes the tactile response. The tactile response felt by the user allows the user to determine or deduce the object or toy's setting or mode, as further detailed and explained herein.

Figure 21A:
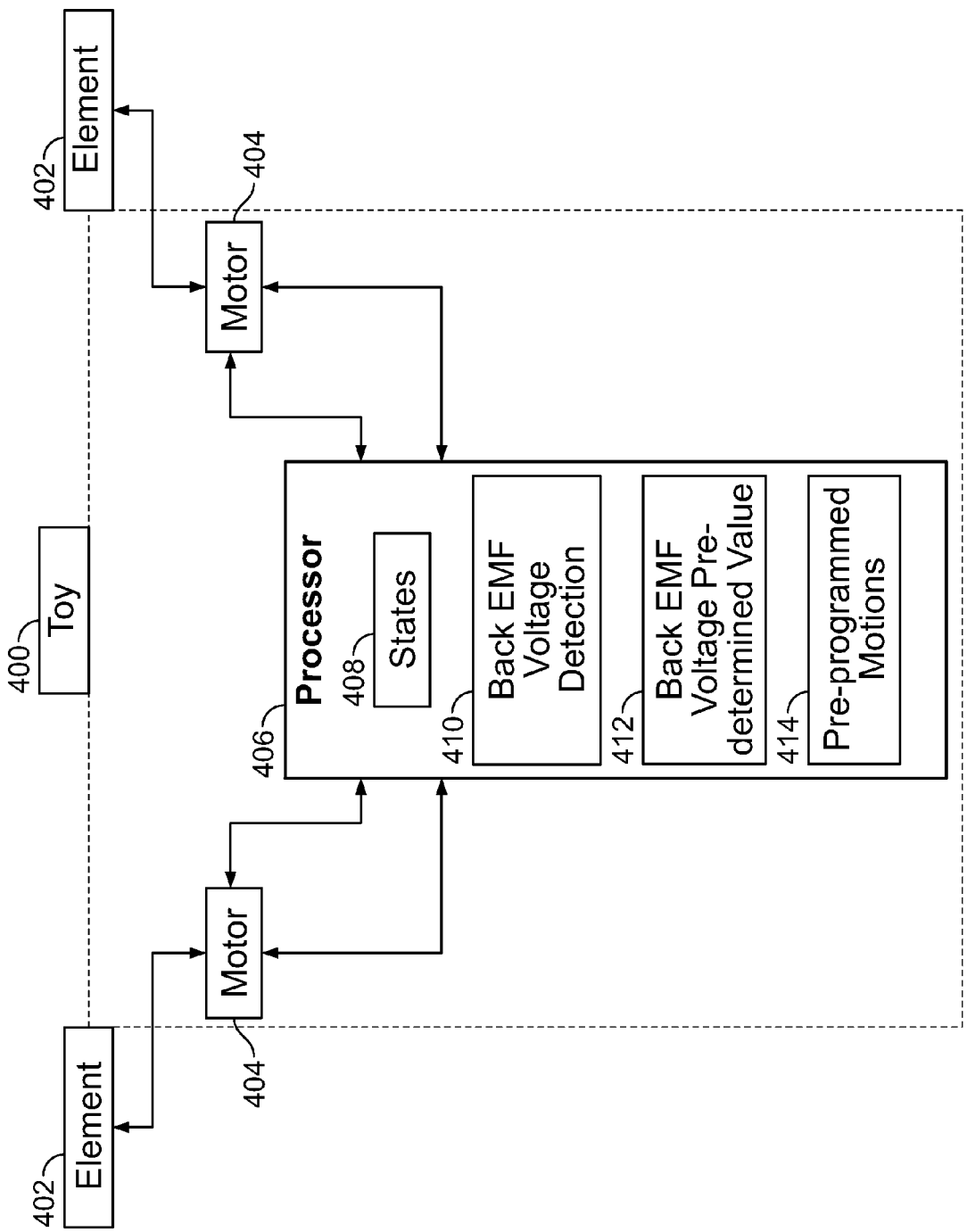
FIG. 21A is a box diagram of an embodiment of a toy showing a processor monitoring one or more motors for a manual generated back EMF voltage.
Figure 21B:
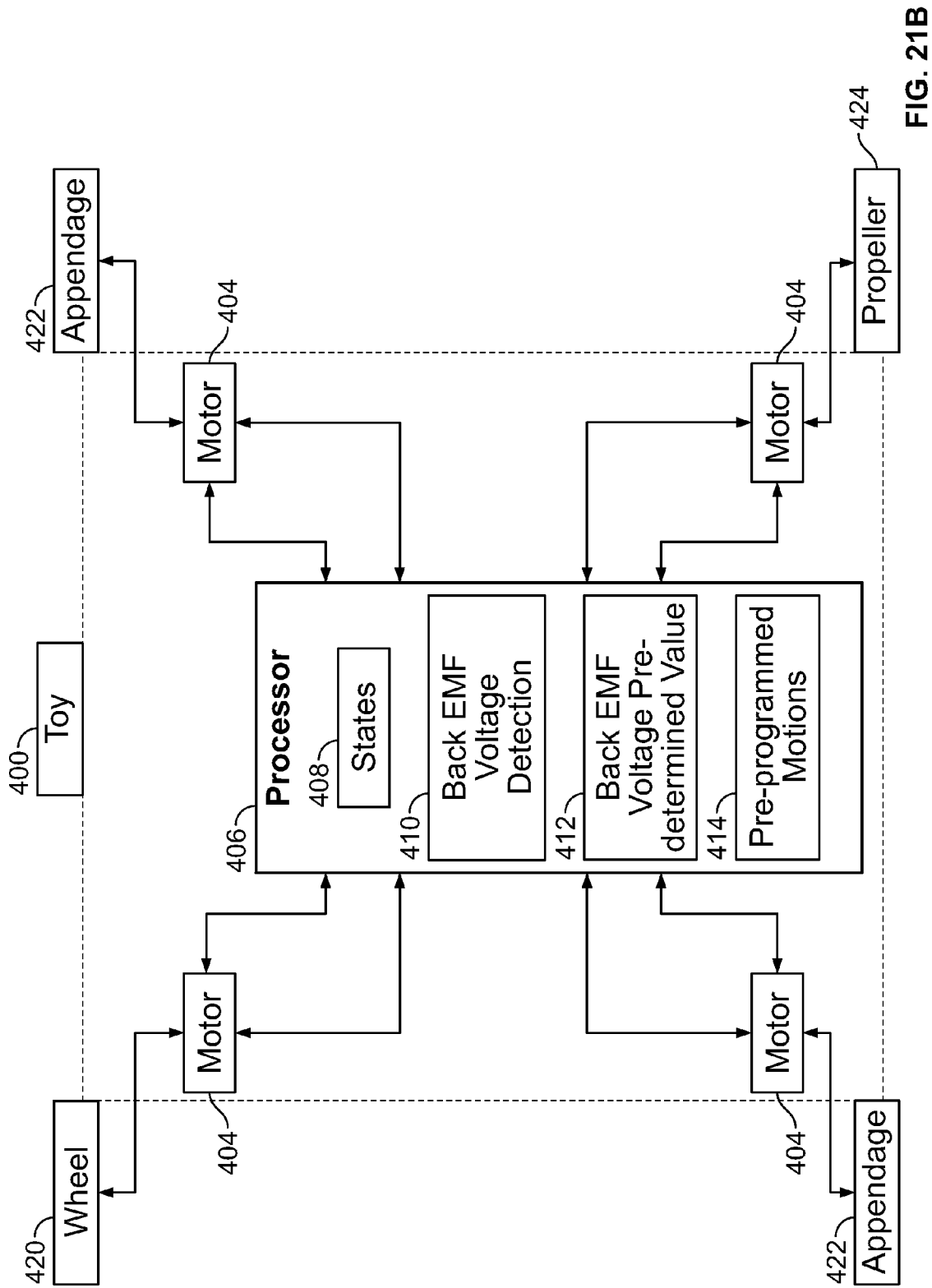
FIG. 21B is a box diagram of an embodiment of another toy showing a processor monitoring one or more motors for a manual generated back EMF voltage.
Figure 22A:
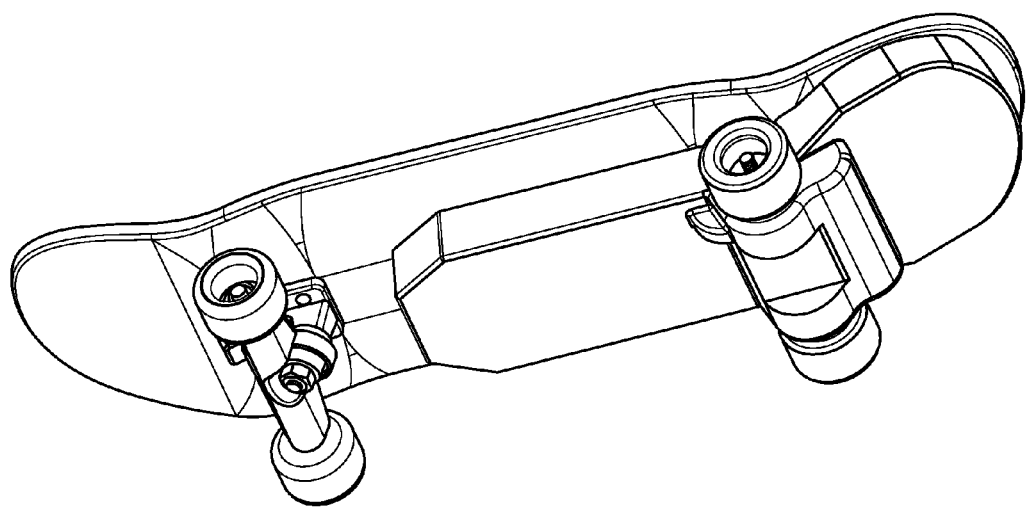
FIGS. 22A-22E illustrate various embodiments of toy skateboards having various housing configurations for different battery compartments.
Figure 22B:
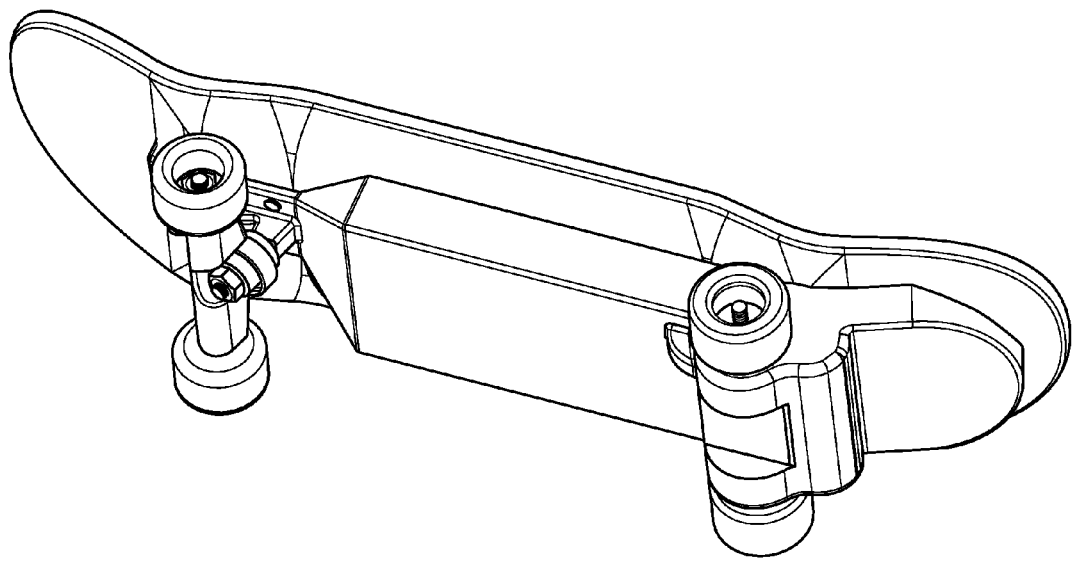
Figure 22C:
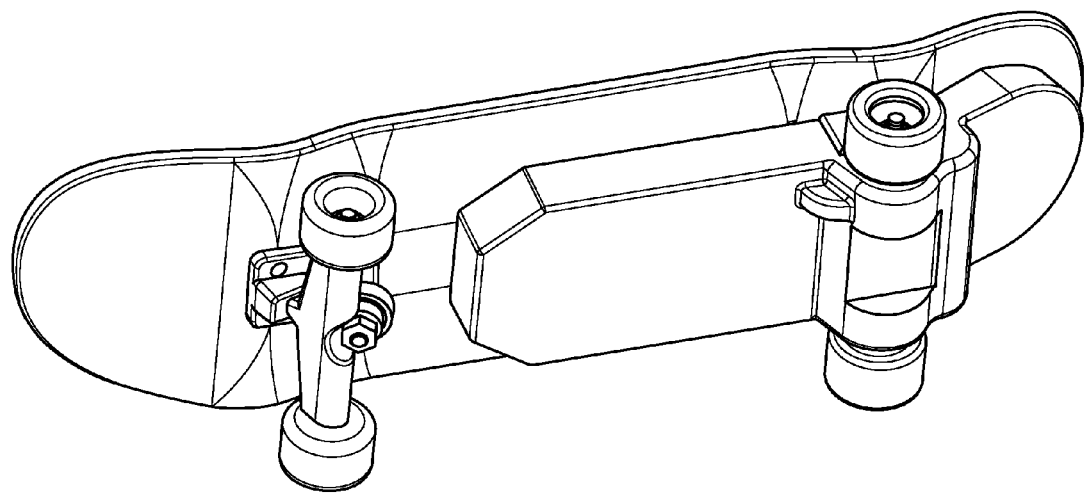
Figure 22D:
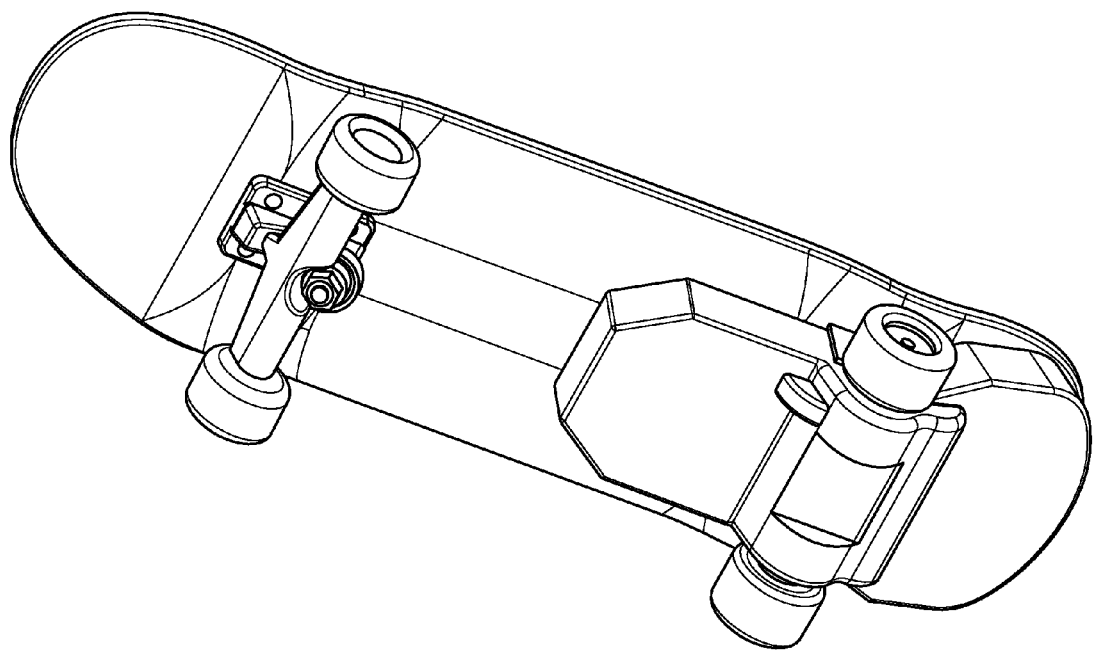
Figure 22E:
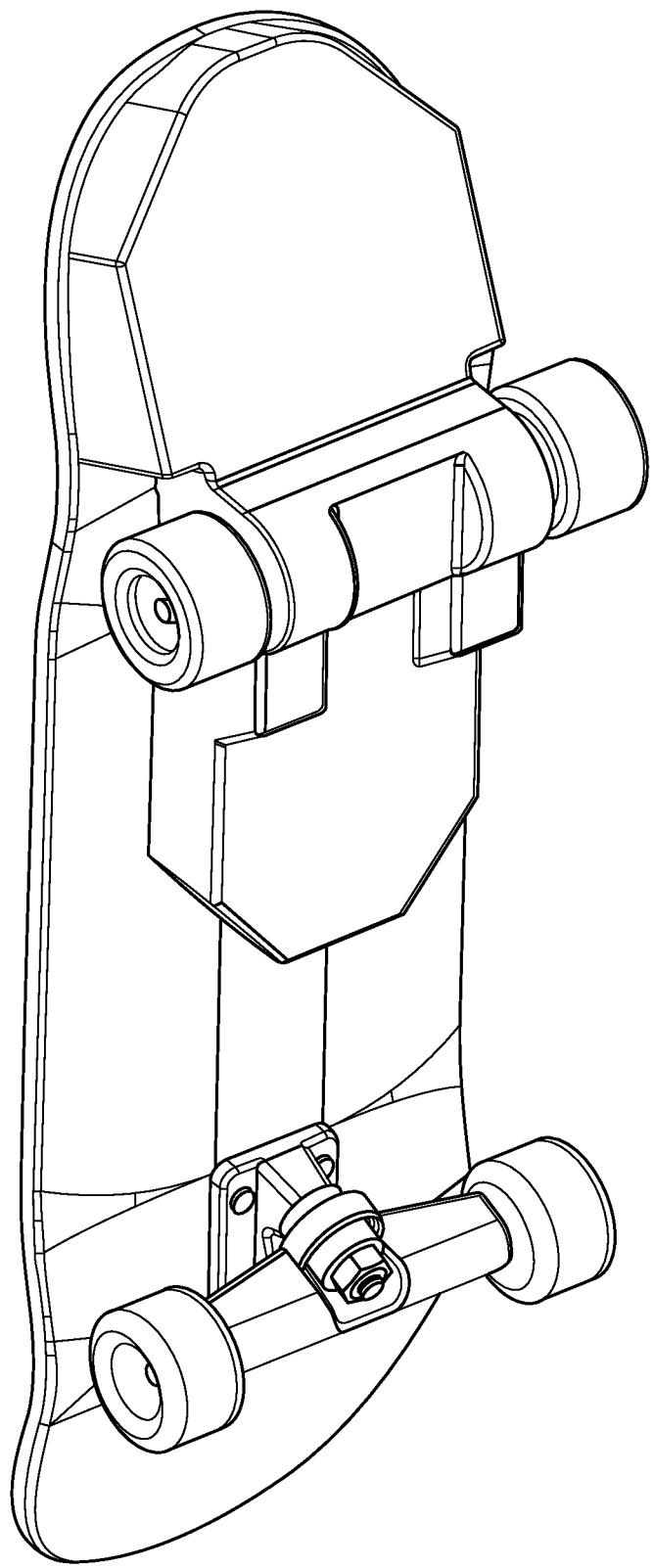

As provided in one or more embodiments described herein and as provided and illustrated in FIGS. 21A-21B, there is generally illustrated a toy 400, that may include one or more elements 402, such as the wheels on a skateboard, an appendage on a toy robot or figure, or a propeller on a toy vehicle. These elements are external to the toy 400 and are moved/controlled separately by a motor 404, whether directly or indirectly moved or physically or non-physically coupled is well within the scope of the various embodiments provided for herein. The processor 406 is as described herein, and as such further definition is not warranted. The processor is configured to include at least a sleep state and a wake state and is further configured to transition between the two states 408. Another aspect of the embodiment is that the element is accessible for manipulation by the user, operator, or human which when moved will in turn rotate the motor. When the user manipulates the element, rotating the motor, the rotation of the motor generates a back electromotive force (herein after "EMF") voltage. The processor is configured to detect the back EMF voltage 410 and is further configured to transition between the two states when the detected back EMF voltage reaches a pre-determined value.

In another aspect of the embodiment, when the detected back EMF voltage reaches the pre-determined value 412, the processor is further configured to control the motor in accordance with one or more pre-programmed motions 414, which when executed result in a tactile response. In addition, when the detected back EMF voltage reaches the pre-determined value, the processor is yet further configured to control the motor in accordance with one or more pre-programmed motions resulting in auditory perception.

As provided in FIG. 21B the toy 400 may include a number of elements connected separately to motors. All or some of the illustrated elements (wheel 420, appendage(s) 422, propeller 424, etc.) can be included.

The processor may yet be further configured to detect a second back EMF voltage generated by the rotation of the motor in an opposite direction due to the manipulation of the element by a human in an opposite direction. In this instance, when either detectable back EMF voltage reaches the pre-determined value, the processor is configured to control the motor in accordance with one or more of the following pre-programmed motions resulting in a tactile response: (a) move said element momentarily, (b) move said element continuously, (c) resist motion of said element momentarily, (d) resist motion of said element continuously, (e) oscillate said element momentarily, and (f) oscillate said element continuously. In some instances the pre-programmed motions are selected based on the rotational direction of the motor and based on whether the processor is in the wake state or sleep state. This allows for greater functions and motion responses.

In variations of the embodiments, when either the detectable back EMF voltage reaches a pre-determined value, the processor may be further configured to a delay by a pre-determined time internal prior to the pre-programmed motions resulting in a tactile response. In addition, the pre-programmed motions resulting in a tactile response may be at less than 100% motor speed. In other aspects, the pre-programmed motions result in a tactile response at variating motor speed.

The embodiments may also include a second motor configured to cause a motion of a second element of toy and the second element is further accessible for manipulation by a human, which when moved causes a rotation in the motor. The processor is further configured to control the second motor and the pre-programmed output is further configured to control both motors and rotate both wheels resulting in a tactile response. If desired or needed an electrical circuit can be included to alter the back EMF voltage prior to detection by the processor. The electrical circuit may be a transistor, resistor, booster, a combination thereof, or other circuits known in the industry.

In another embodiment a toy vehicle is provided with an element, a processor, and a motor configured to cause a motion of the element. The motion of the element is further accessible for manipulation by a human, which in turn is capable of rotating the motor. The processor is configured to detect a back electromotive force ("EMF") voltage that is generated by the rotation of the motor when the element is manipulated by the user. The processor is further configured to include at least two states and the processor includes a function configured to transition between states when the detected back EMF voltage reaches a pre-determined value. In addition, the processor is further configured to control the motor in accordance with one or more pre-programmed motions resulting in a tactile response when the detected back EMF voltage reaches a pre-determined value. In this embodiment, the pre-programmed tactile responses may be turning the motor in a forward or reverse direction or braking the motor.

In variations of this embodiment the toy may include a second motor configured to cause a motion of a second element and the motion of the second element is accessible for manipulation by a human, which when manipulated in turn rotates the motor. The processor is further configured to control the second motor, and wherein the pre-programmed output is further configured to control both motors and rotate both wheels resulting in a tactile response.

The processor may be further configured to detect a second back EMF voltage generated by the rotation of the motor in an opposite direction due to the manipulation by a human in an opposite direction. The processor is further configured to control said motors in accordance with one or more pre-programmed motions resulting in a tactile response, when either of the detectable back EMF voltages reach a pre-determined value. The pre-programmed motions resulting in a tactile response may include the following: (a) move one or more of said elements momentarily, (b) move one or more of said elements continuously, (c) resist motion of one or more of said elements momentarily, (d) resist motion of one or more of said elements continuously, (e) oscillate one or more of said elements momentarily, and (f) oscillate one or more of said elements continuously.

As noted above in other embodiments, the pre-programmed motions may be selected based on the rotation direction of the motor and based on whether the processor is in the wake state or sleep state. In addition, when either detectable back EMF voltages reaches a pre-determined value, the processor is further configured to a delay by a pre-determined time internal prior to the pre-programmed motions resulting in a tactile response.

As provided in yet another embodiment, there is provided a toy vehicle having an element, a processor, and a motor configured to cause a motion of the element and the motion of the element is further accessible for manipulation by a human, which when moved causes a rotation of the motor. The processor is configured to detect a back electromotive force ("EMF") voltage generated by the rotation of the motor due to the manipulation of the element by the user. The processor is further configured to include at least two of the following states: (a) a lower power state configured to turn the at least one motor off and power the vehicle off; (b) a lower power sleep state configured to turn the at least one motor off and put the processor in a low power sleep state and halt executing code; (c) a wake state configured to power the vehicle on; (d) a wake state configured to bring the processor out of a low power sleep state and begin to executing code; (e) a user controllable drive state configured to control the at least one motor and rotate the at least one wheel; (f) a user controllable drive state configured to control the at least one motor and rotate the at least one wheel at a slower than maximum speed; (g) a user controllable drive state configured to control the at least one motor and rotate the at least one wheel in accordance to a pre-programmed set of instructions and user input from a remote device to cause the vehicle to perform a maneuver; and (h) a non-user autonomous drive state configured to control the at least one motor and rotate the at least one wheel. The processor further includes a function configured to transition between states when the detected back EMF voltage reaches a pre-determined value. Furthermore, when the detected back EMF voltage reaches a pre-determined value, the processor is further configured to control the motor in accordance with one or more pre-programmed motions resulting in a tactile response.

In other aspect, the vehicle may include a second motor configured to cause motion of a second element and the motion of the second element is further accessible for manipulation by a human, which in turn causes rotation of the motor. The processor is further configured to control the second motor, and wherein the pre-programmed output is further configured to control both motors and rotate both wheels resulting in a tactile response. The processor of the vehicle may be further configured to detect second back EMF voltage generated by the rotation of the second motor due to the manipulation by a human in an opposite direction. The processor is further configured to transition between the states when the detected second back EMF voltage reaches a pre-determined value. The processor is yet further configured to control the second motor in accordance with one or more pre-programmed motions resulting in a tactile response when the detected second back EMF voltage reaches a pre-determined value, which may be the same or different value set to the first back EMF voltage.

Various combinations of aspects may be included to provide for variations in the scope of the embodiments without detracting from the spirit of the invention. As such when combined with a toy skateboard, one embodiment of the invention may provide a toy vehicle or skateboard which includes a deck, a front truck with a pair of front wheels which can secure to the deck towards the front portion, and a rear truck which can secure to the deck towards the rear portion. The rear truck has first and second wheels and a housing configured to include a battery, a processor, a receiver, first and second motors separately in control of the first and second wheels respectively. The first motor is configured to cause a motion of the first wheel, and the motion of the first wheel is also accessible for manipulation by a human, which when manipulated rotates the first motor. Similarly, the second motor is configured to cause a motion of the second wheel, and the motion of the second wheel is also accessible for manipulation by a human, which when manipulated rotates the second motor. The receiver is configured to receive signals from a remote control unit and the processor is configured to receive signals from the receiver to control the first and second motors in response thereto. The processor is further configured to detect a first back electromotive force ("EMF") voltage generated by the rotation of the first or second motor due to the manipulation by a human of the toy against a surface and in a first direction. The processor is further configured to detect a second back EMF voltage generated by the rotation of the first or second motor due to the manipulation by a human of the toy against a surface and in a second direction generally opposite the first direction. The processor is further configured to include at least a sleep state and a wake state and the processor has a function configured to transition between the sleep state and the wake state when the detected back EMF voltage reaches a pre-determined value.

In aspects of this embodiment, the processor is further configured to control at least one of the motors in accordance with one or more pre-programmed motions resulting in a tactile response, when at least one of the detected first and second back EMF voltages reaches a pre-determined value. The pre-programmed motions resulting in a tactile response may include one or more of the following: (a) rotate one or more of said first and second wheels momentarily; (b) move one or more of said first and second wheels continuously; (c) resist motion of one or more of said first and second wheels momentarily; (d) resist motion of one or more of said first and second wheels continuously; (e) oscillate one or more of said first and second wheels momentarily; and/or (f) oscillate one or more of said first and second wheels continuously.

In still other aspects, when either of the detectable first or second back EMF voltage reaches a pre-determined value, the processor is further configured to a delay by a pre-determined time internal prior to the pre-programmed motions resulting in a tactile response. The embodiment of the invention may include pre-programmed motions resulting in a tactile response that are at less than 100% motor speed or at variating motor speeds. In addition thereto, the embodiment of the invention may include an electrical circuit designed to alter at least one of the first and second back EMF voltages prior to detection by the processor.

Conversion of the toy in accordance with one embodiment of the present invention may be an important aspect. As such the rear truck may be removed from the deck and a truck similar to the front truck can be secured to the deck. In this instance, a surface of the deck opposite of the lower surface can define a finger engaging region accessible for manipulation by a human to move the toy vehicle.

In accordance with the figures and various embodiments and combinations of aspects provided herein, an embodiment of the present invention may provide for a convertible toy skateboard assembly. The skateboard assembly typically includes a deck, a pair of non-motorized truck assemblies and a rear motorized truck assembly. The toy skateboard is convertible as one of the non-motorized truck assemblies may be easily swapped with the rear motorized truck assembly. This allows for the toy skateboard to either have a pair of non-motorized truck assemblies, which allows the operator to use their fingers to manipulate and move the toy skateboard; or have one non-motorized truck assembly and a motorized truck assembly, which allows the operator to use a remote control unit to control and move the toy skateboard.

The non-motorized truck assembly as used throughout the various embodiments is typically secured to the lower surface of the deck. The non-motorized truck assembly includes a pair of freely rotatable wheels that are positioned transversely to a longitudinal axis of the deck when attached. The motorized rear truck assembly includes a housing is configured to removably attachment to the deck. This may include clips, fasteners, or other attachment means well known in the art. The motorized truck assembly is configured to house at least (i) a battery, (ii) a processor, (iii) a receiver in communication with the processor, and (iv) a pair of motors, each motor separately controlling a rear wheel, of a pair of rear wheels, and wherein the pair of rear wheels are positioned transversely to the longitudinal axis of the deck and behind the pair of front wheels. The receiver is configured to receive signals to control the movement of the pair of rear wheels.

As mentioned, the toy skateboard would therefore include two configurations: a first configuration is defined by having the front non-motorized truck assembly attached to the lower surface towards the front region of the deck and having the rear non-motorized truck assembly removably attached to the lower surface towards the rear region of the deck. In the first configuration, the upper surface of the deck defines a finger engaging region for a user's fingers to engage and move the toy skateboard. A second configuration is defined by removing the rear non-motorized truck assembly and removably attaching the motorized rear truck assembly to the lower surface towards the rear region of the deck, wherein the movement of the toy skateboard is controllable by the processor in response to signals received by the receiver.

In accordance with one or more of the embodiments, the toy skateboard may include a circuit in communication with the processor and battery. The circuit configured to change the battery voltage to a fixed voltage to define a more consistent performance from the battery. This helps increase the enjoyment from the toy skateboard and it no longer seems sluggish as the batteries wear down. In addition, the remote control unit may include one or more signals to initiate a set of pre-program instructions on the processor to control the pair of rear wheels to perform one or more skateboard maneuvers. These skateboard maneuvers may include, but is not limited to, a skateboard trick, a hill climb, variable speed control, and playback of user recorded input.

The skateboard in any one of the embodiment, may further be defined to have a first motor (from the pair of motors) coupled to a first rear wheel (from the pair of rear wheels) and the processor is configured to detect a back electromotive force ("EMF") voltage generated by the rotation of the first motor caused by a manual manipulation of the first rear wheel. The processor is further configured to include at least a sleep state and a wake state and is configured to transition between the sleep state and the wake state when the detected back EMF voltage reaches a pre-determined value. The processor may further control the pair of motors in accordance with one or more pre-programmed motions resulting in a tactile response when the detected back EMF voltage reaches a pre-determined value. In addition, the processor may further be configured to detect a second back EMF voltage generated by the rotation of the first motor in an opposite direction due to a manual manipulation of the first rear wheel in an opposite direction. When either of the detectable back EMF voltages reaches a pre-determined value, the processor is further configured to control the first motor in accordance with one or more of the following pre-programmed motions resulting in a tactile response: (a) move the first rear wheel momentarily, (b) move the first rear wheel continuously, (c) resist motion of the first rear wheel momentarily, (d) resist motion of the first rear wheel continuously, (e) oscillate the first rear wheel momentarily, and (f) oscillate the first rear wheel continuously.

In one or more of the embodiments, the motorized rear truck assembly includes a housing defined to include a top profile substantially conforming to a portion of the lower surface of the deck towards the rear region. In this instance, the battery, processor, receiver, and pair of motors are completely positioned within the housing below the top profile of the housing and thus below the lower surface of the deck. The housing may also include a front end and a rear end with an intermediate region there-between. This provides space for a power source, such as batteries, defined by two battery compartments separately positioned in the front end and rear end of the housing and the pair of motors and the pair of rear wheels being positioned between the two battery compartments. The rear end of the housing containing one of the battery compartments may be angled upwardly to match an angle of the rear end of the deck such that the at least one battery contained in the battery compartment is angled. In various embodiments, the placement and number of battery compartments may change, as illustrated in FIGS. 22A-22E.

In one or more of the embodiments disclosed herein, the receiver may be defined as an IR sensor for receiving signals from the remote control unit. The IR sensor can be positioned in a window defined in the motorized rear truck assembly towards a front portion thereof and under the lower surface of the deck such that the IR sensor is positioned to receive signals reflected from a surface under the deck of the skateboard. In other aspect, the toy skateboard may include a weight removably secured to a portion of the deck to adjust a center of gravity and configured to adjust a center of spin.

As defined in one ore move aspects, the toy skateboard is poised to define a motorized toy skateboard that can be controlled without needing an object on the upper surface of the deck. The toy skateboard does not need a figurine, with linkages, and control mechanics in the deck to maneuver properly. Separately, the toy skateboard may include a truck assembly housing that encloses both a front truck and a motorized rear truck. The truck assembly may be removed and replaced with a pair of non-motorized truck assemblies so the user is able to manually maneuver.

In another embodiment and building on the ability to have a toy vehicle, whether it be a skateboard, car, motorcycle or any other wheeled motorized vehicle there is a continued need to provide meaningful physical user input combined with an understandable wheel driven haptic feedback. This type of user-machine interface that involves physical input, machine interpretation and adaptions thereto can be combined with a tactile wheel based feedback. For a user's point of view, Young users typically do not read users manuals. Additionally small products require very small users manuals with very small print, increasing the likelihood that the user will not read the manual. Conversely there is a distinct need for manufacturers to increase the number of features contained within a toy, either to differentiate the toy, or to allow more flexible usage patterns. The third driving factor of manufacturers is cost reduction, which makes it desirable to eliminate or reduce buttons, switches, and LEDs. It is therefore desirable to make a product that is easy to use, feature rich, and low cost. A method of physically manipulating a toy and having the toy provide physical and meaningful feedback can eliminate the need for reading users manuals to understand what the different buttons, switches, and LED blink patterns mean.

Pushing and/or rolling a toy on the floor or tabletop is a natural play pattern for children. Therefore incorporating rolling can be natural to children. However just the action of rolling a toy is not enough for the child to infer what they just instructed the toy to do. Using the wheels to provide a specialized form of haptic feedback can present the child with a physical acknowledgement to their action, as well as relay the meaning of the action.

In addition, auditory tactile response may be included. For example, spinning a motor creates sound, and the frequency can be changed with the speed such that slow speeds create lower frequencies of sound which can the interpreted as slow, while high speeds create high frequencies of sound which can the interpreted as fast. In addition, pulsing a motor on and off at a low frequency creates lower frequencies of sound which can the interpreted as slow speeds. Pulsing a motor on and off at a high frequency creates higher frequencies of sound which can the interpreted as fast speed.

The following are examples of meaningful physical user input combined with understandable wheel driven haptic feedback, visual feedback, and audible feedback. Multiple toy responses are proposed. Turn the toy ON: The child picks up a toy that is OFF and wishes to turn it ON. One possible input action is that the child rolls the toy forward across the floor. The toy could include multiple responses, such as: Toy response A: While the child is rolling the toy along a surface, the toy wakes from sleep mode and applies power to the wheels in the same direction it was just rolled, while the toy is still in contact with the child's hand and while the toy is still in contact with the surface, resulting in a tactile response of the toy no longer requiring energy to roll but now pulling the child's hand forward; alternately the child may have released the toy after it wakes from sleep but before or during the time power is applied to the wheels, providing a combination of tactile response until the toy is released and an additional visual response as the toy continues to move ahead under its own power. Alternately the child may lift the toy off the surface after it wakes from sleep but before or during the time power is applied to the wheels, providing a combination of tactile response until the toy is lifted from the surface and an additional audible response as the toy continues to apply power to the motor creating sound from a combination of the spinning motor, gears, axles, and/or wheels.

Toy response B: Before the child finishes rolling the toy, the toy wakes from sleep mode and pulses power to the wheels in the same direction it was just rolled and in a fashion that resembles a car's engine being revved; or Toy response C: Before the child finishes rolling the toy, the toy wakes from sleep mode and applies a percentage of full power to the wheels in the same direction it was just rolled and in a fashion that resembles a car's engine being revved. From the user's perception, the user feels that the toy is no longer just rolling forward but is now trying to accelerate forward with his hand, relaying to the child that the toy is ON and ready to go. The result of the actions and functions of the vehicle is that the toy is now in normal drive mode.

Turn the toy OFF, the child picks up a toy that is ON and wants to turn it OFF. One action is that the child pulls the toy backward across the floor. The toy could include multiple responses, such as: Toy response A: Before the child finishes pulling, the toy applies power to the wheels in the opposite direction it was just pulled; Toy response B: Before the child finishes pulling, the toy pulses power to the wheels in a opposite direction it was just pulled; or Toy response C: Before the child finishes pulling, the toy applies brakes to the wheels. From the user's perception, the user feels that the toy is no longer just rolling backward but is now trying to stop his hand, relaying to the child that the toy is trying to stop and turn OFF. The result of the actions and functions of the vehicle is that the toy goes into a low power sleep mode.

To Select the Next Mode, the child is playing with a toy that is ON and wishes to alter the way it behaves and/or change an action state of the toy. The child as an example, rolls the toy forward across the floor. The toy could include multiple responses, such as: Toy response: After the child finishes rolling the toy, the toy briefly applies low speed power to the wheels in the same direction it was just rolled. From the user's perception, the user feels that the toy is spinning its wheels slowly, relaying to the child that the toy is now in a low speed drive mode. The result of the actions and functions of the vehicle is that the toy is now set to low speed mode.

In another section of the Next Mode—Now in High Speed, the child is playing with a toy that is ON and wishes to alter the way it behaves and/or change an action state of the toy. The child rolls the toy forward across the floor. The toy could include multiple responses, such as: Toy response: After the child finishes rolling the toy, the toy briefly applies high speed power to the wheels in the same direction it was just rolled. From the user's perception, the user feels that the toy is spinning its wheels quickly, relaying to the child that the toy is now in a high speed drive mode. The result of the actions and functions of the vehicle is that the toy is now set to high speed mode.

In another aspect, the vehicle may be able to Directly Set a Mode from the user's interface with the vehicle. The child is playing with a toy that is ON and wishes to alter the way it behaves/or change an action state of the toy. The child rolls the toy forward across the floor at a slow or fast speed. After the child finishes rolling the toy, the toy briefly applies power to the wheels in the same direction it was just rolled and at a speed similar to the speed the child rolled the toy. The child feels that the toy is spinning its wheels at a specific speed, relaying to the child that the toy is now in a customized speed mode. The toy is now set to high speed, slow speed, or specific measured speed mode respectively.

Other Embodiments that could benefit from back EMF wake, processor changes, haptic response could include vehicles, robots, and cars.

Figure 23:
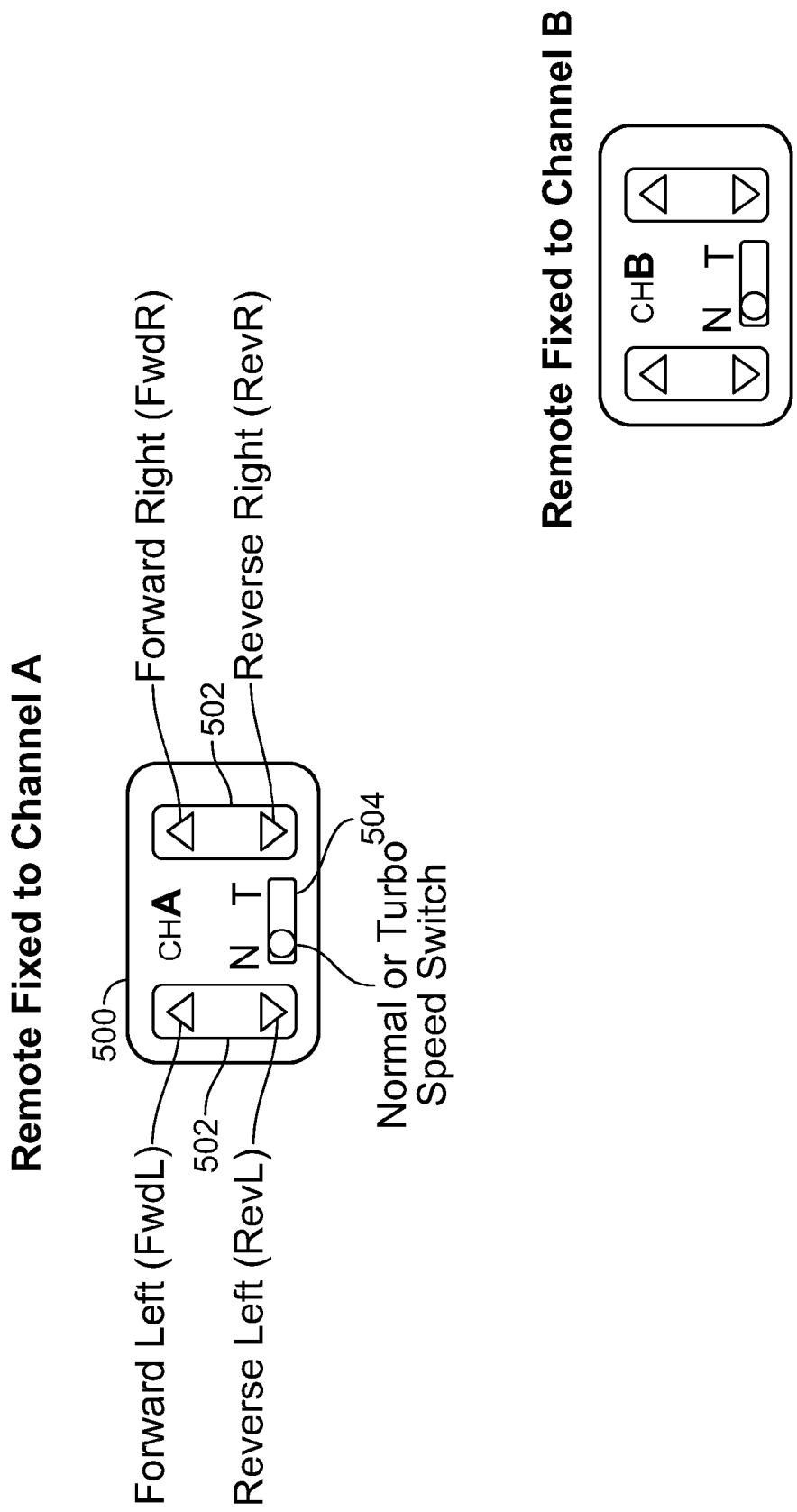
FIG. 23 is a diagram representing a transmitter in accordance with one embodiment of the present invention for use with a motorized toy skateboard.
Figure 24:
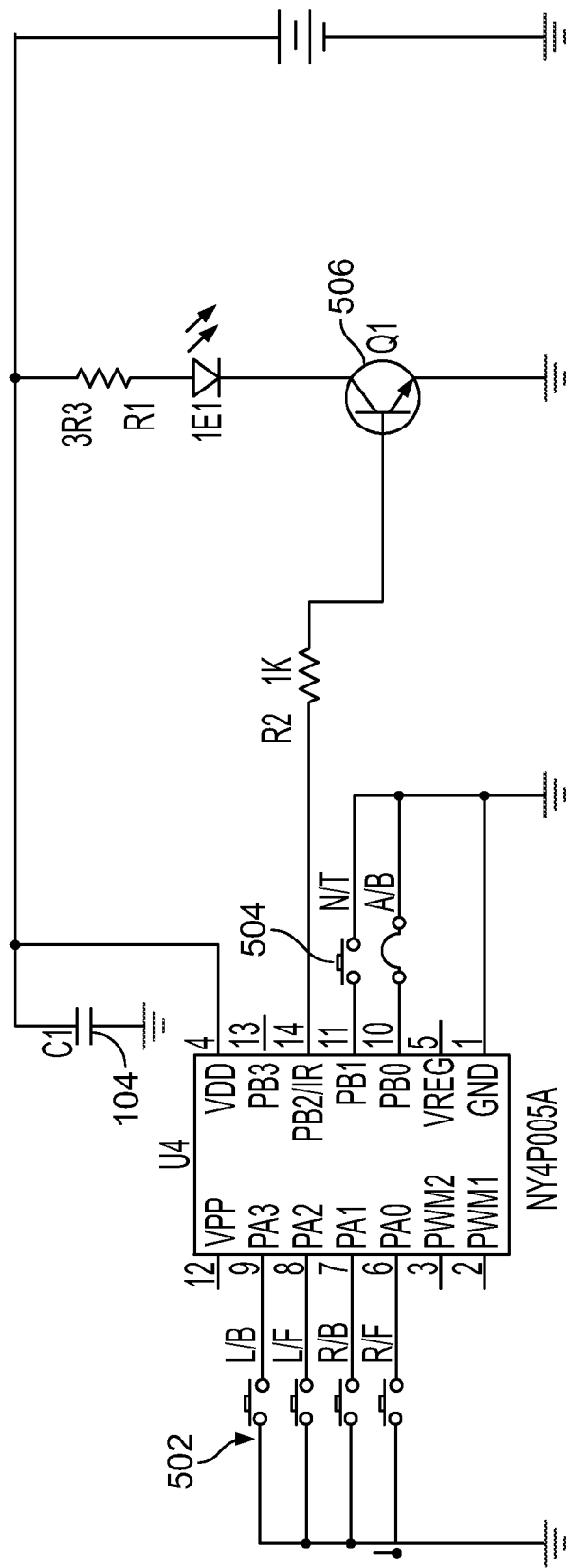
FIG. 24 is an electrical schematic drawing of a remote control unit in accordance with one embodiment of the present invention for use with a motorized toy skateboard.
Figure 25:
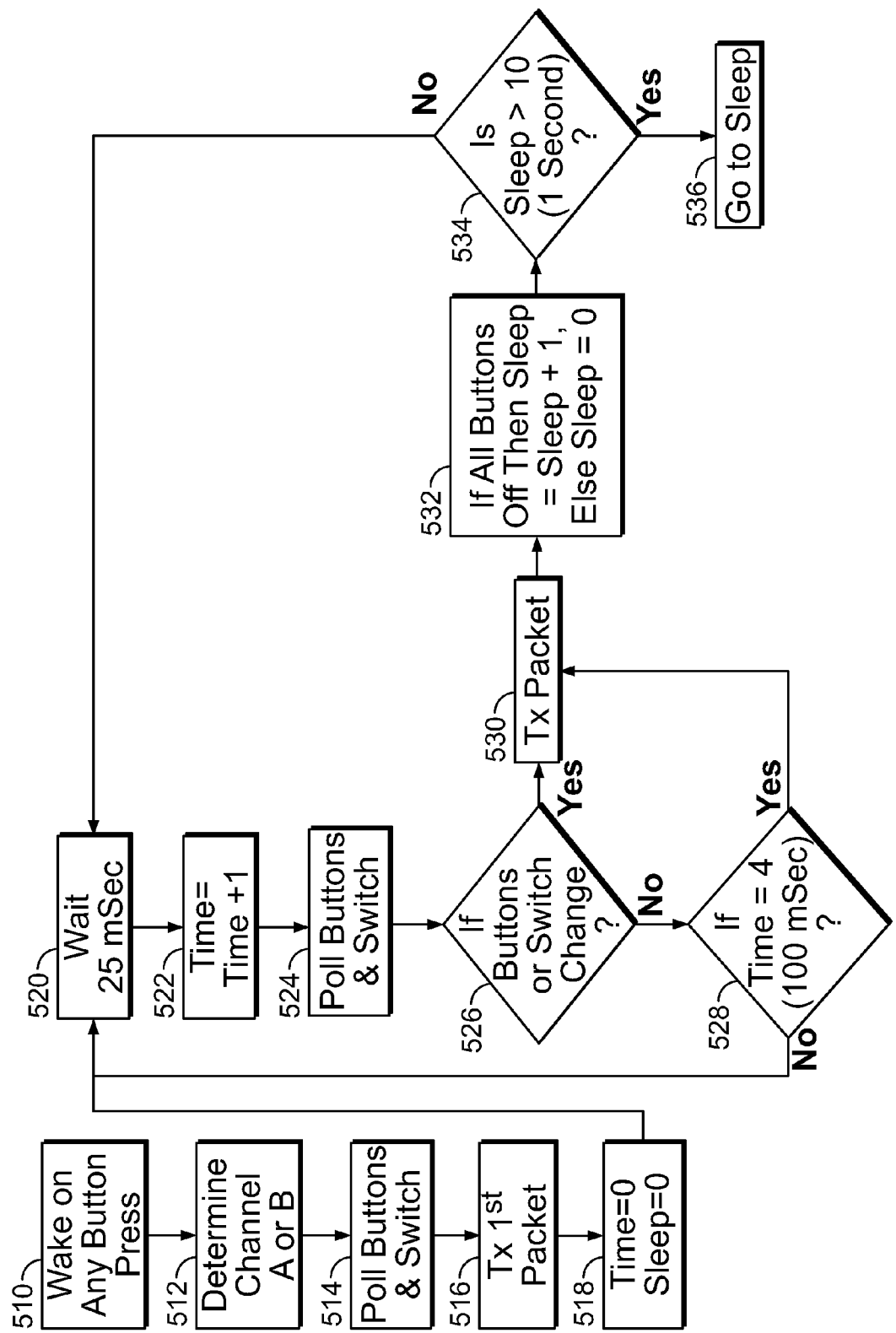
FIG. 25 is a block diagram for a transmitter in accordance with one embodiment of the present invention for use with a motorized toy skateboard.

Referring now to FIGS. 23 through 25 there are illustrated electrical schematic and flow chart diagrams to illustrate embodiment of the present invention. In FIGS. 23 and 24 a remote control unit 500 is shown having various functional buttons 502 and slide switches 504. The remote control unit 500 may be fixed to a channel selection or may have a further slide switch to allow the user to switch channels. The remote control unit 300 includes a transmitter 506 to send signals or packets of information to the skateboard 100. In FIG. 25, the remote control unit executes WAKE UP (box 510) when any button is pressed. The remote control unit may first DETERMINE THE CHANNEL (box 512) and then completes a POLL of the buttons and switches (box 514). A $1^{st}$ Packet of Date is transmitted (box 516) to the receiver and then the remote control unit sets the Time and Sleep functions to Zero (box 518). The unit will then WAIT for 25 mSec (box 520), sets TIME to TIME+1 (box 522) and then POLLS the buttons and Switches (box 524). The remote control unit will then determine IF the buttons or switch have changed (box 526), if no, the remote control unit then determines IF the time internal is equal to 4 (or about 100 mSec) (box 528). If not the remote control unit returns to box 520 to WAIT. If the buttons or Switch have changed (from box 526) or if TIME is equal to 4 (from box 528), then the remote control unit transmits a Packet of data to the receiver (box 530). After transmission, the remote control unit checks IF All buttons Off then the remote control unit will set Sleep to Sleep+1, otherwise Sleep is set to Zero (box 532). If Sleep is greater than 10 (about 1 second) (box 534), then the remote control unit will SLEEP (box 436); otherwise the remote control unit returns to box 520 and WAITS.

It is well known that the speed of a DC motor can be controlled by changing the voltage. Chopping the DC current into "on" and "off" cycles which have an effective lower voltage is one manner in reducing or controlling the speed. This method is also called pulse-width modulation (PWN) and is often controlled by a processor. Since the skateboard in accordance with the present invention incorporates an extremely small DC motor (in the range of 4 mm to 8 mm diameter DC motor), the motor has a low inductance of approximately 140 uH.

Figure 29A:
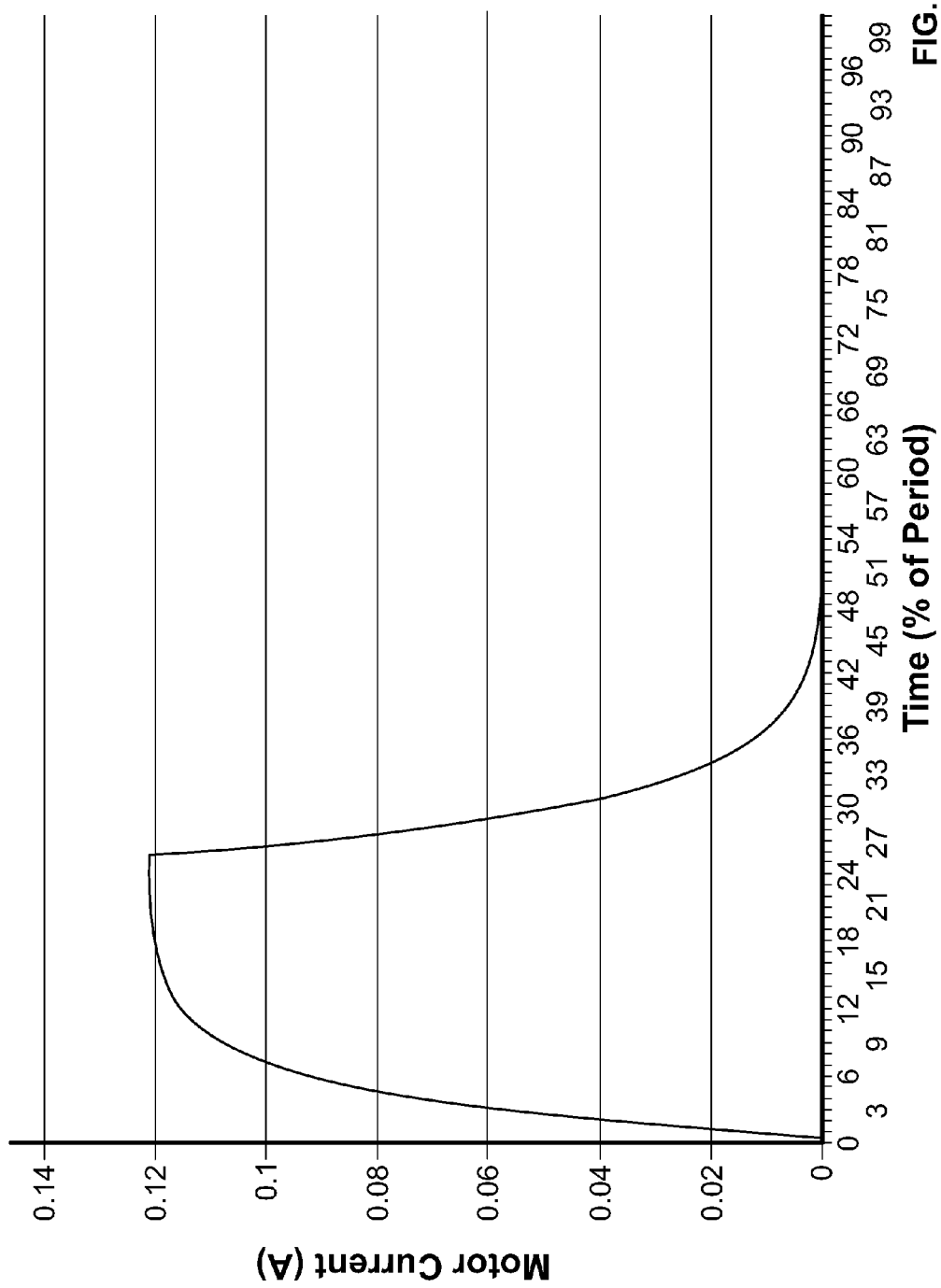
FIG. 29A-29C illustrates a current waveform in the motor at three different PWM frequencies, 10 kHz, 100 kHz, and 1000 kHz.
Figure 29B:
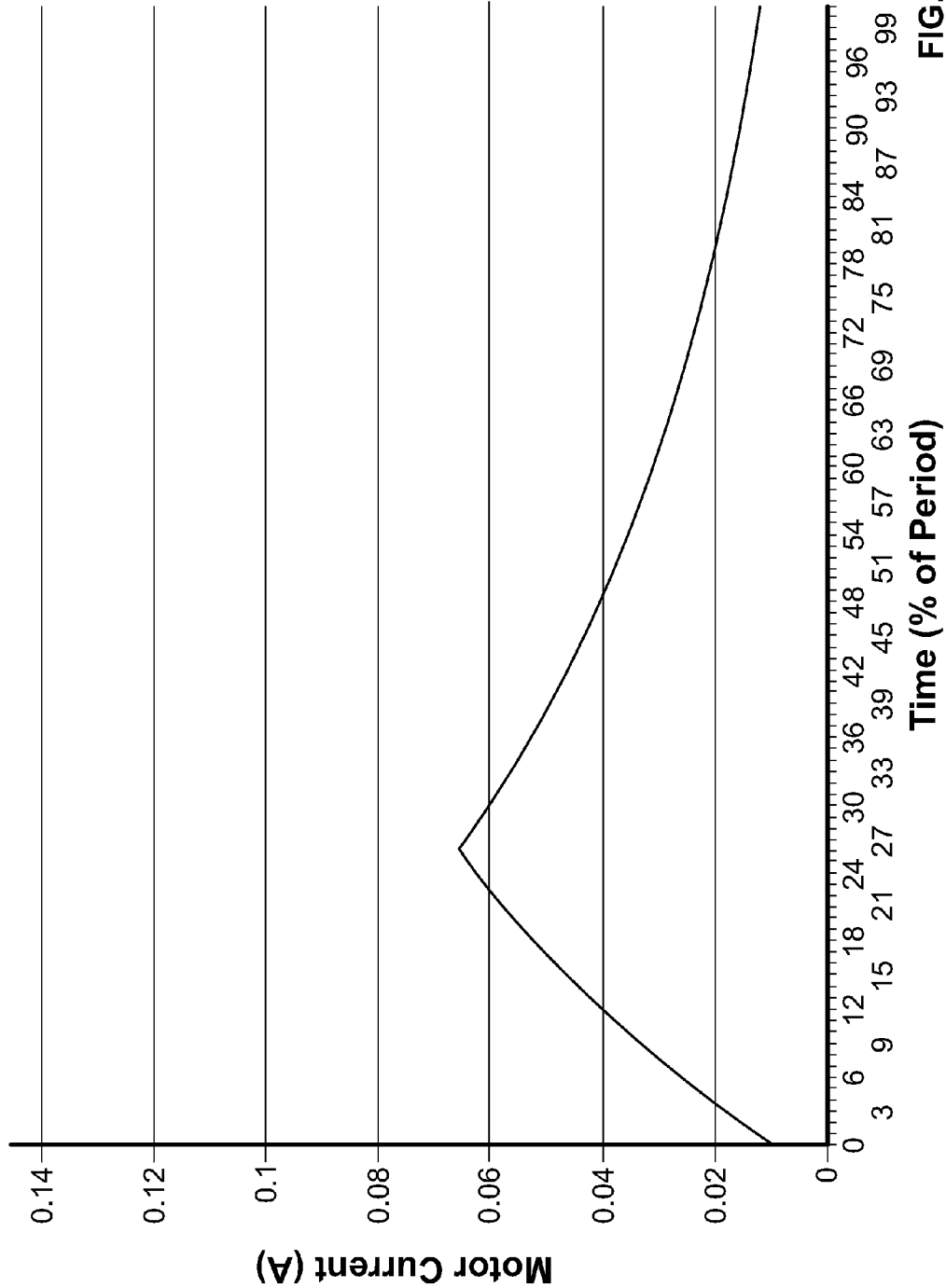
Figure 29C:
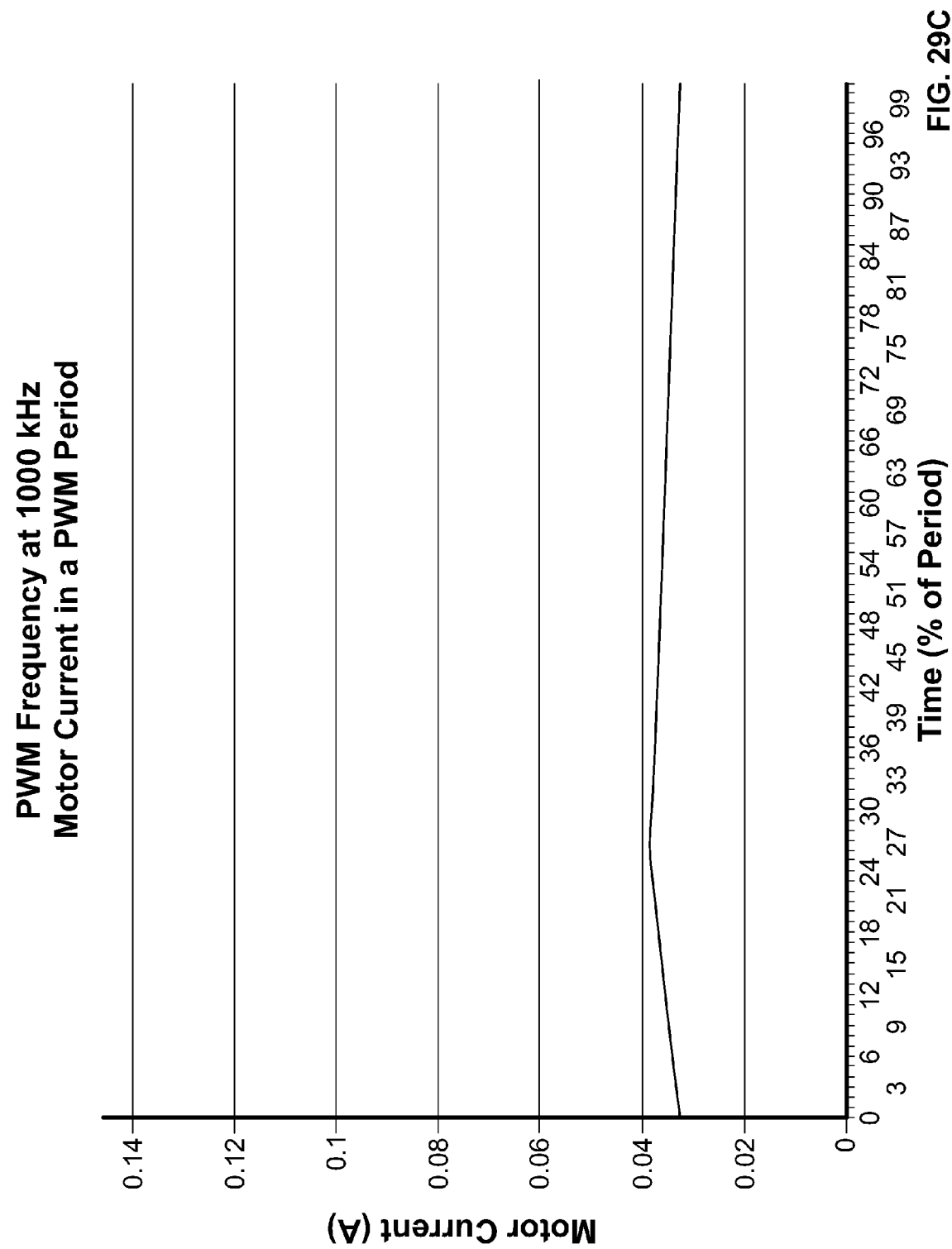

FIGS. 29A thru 29C show the current waveform in the motor at three different PWM frequencies, 10 kHz, 100 kHz, and 1000 kHz. It can be seen that a 10 kHz PWM frequency has not achieved continuous current conduction, which results in current surges that will adversely affect battery run time. It can be see that 100 kHz results in an improvement, but 1000 kHz is approximately required in order to approach acceptable continuous current conduction. Common low cost processors, which are found in low cost toys and vehicles, cannot create the desired 1000 kHz PWM frequency.

Figure 26A:
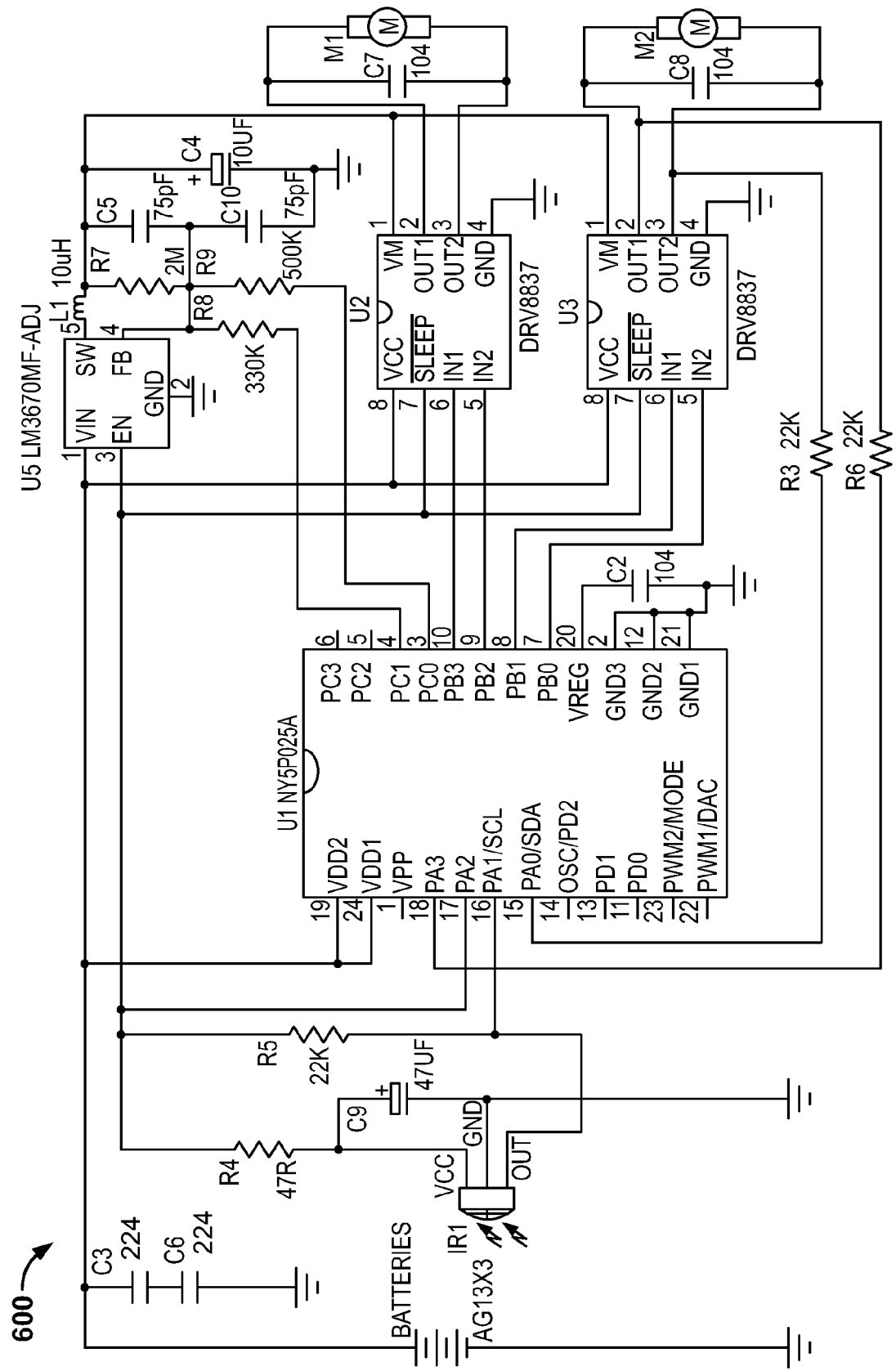
FIG. 26A is an electrical schematic drawing of a motorized toy skateboard in accordance with one embodiment of the present invention illustrating the use of a DC to DC switch to vary the voltage power supplied to the motors.
Figure 26B:
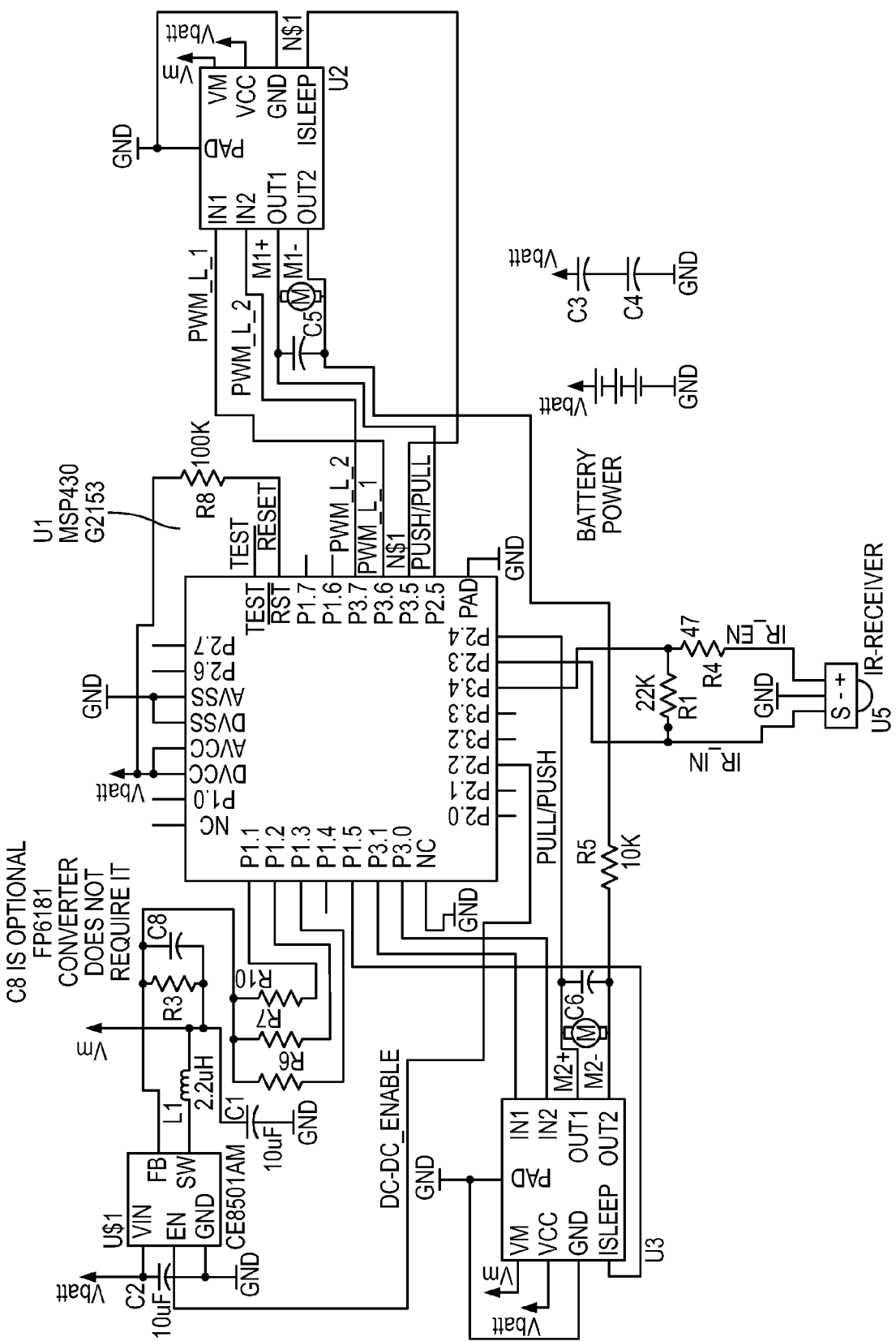
FIG. 26B is an electrical schematic drawing of a motorized toy skateboard in accordance with one embodiment of the present invention illustrating the use of a DC to DC switch to vary the voltage power supplied to the motors.

In reference to FIGS. 26A-28, in one embodiment of the present invention there is employed a novel and unique method of controlling and changing the voltage to extremely small DC motors. DC-DC switches, often called buck converters, can be used to achieve PWM frequencies in excess of 1000 kHz. The embodiment employs a variable output DC-DC switch 600 with the voltage set by a voltage divider. The output voltage is typically fixed to one value as defined by the circuits' needs. The voltage divider can be changed by the use of processor IO pins and multiple resistors R8 and R9, resulting in three output speeds by connecting R8, R9, or R8+R9 to the voltage divider (as illustrated in FIG. 26A). The resulting voltage supplied to the H-bridge circuits (referred to herein as DRVs) 610, which are in communication with the motors and controlled to direct the direction of the motors at a high frequency. The result is continuous current conduction to the motor. A second benefit of this design is the processor is not required to generate a PWM frequency, simplifying software and allowing the use of a less expensive processor. In FIG. 26B the three output speeds are represented by connecting different resistor values to the R31 resistor value.

In accordance with an embodiment of the present invention there is provided a toy vehicle having a low inductance motor powered by a high frequency switched voltage at a frequency high enough to create continuous conduction. The vehicle includes an H-bridge circuit configured to control a direction of the motor and an adjustable high frequency DC-DC switch configured to convert a supply voltage to an output voltage, that is lower than the supply voltage, for use by the H-bridge circuit to power the low inductance motor in a forward or reverse direction. A processor is provided with instructions configured to change the output voltage from the DC-DC switch from a first voltage to a second voltage.

In different aspect of this embodiment, the motor may have an inductance of approximately less than 500 uH and more preferably of about 140 uH. The DC-DC switch may be operating at a frequency greater than 250 kHz and more preferably at about 1000 kHz or higher. In addition, the DC-DC switch may be changed digitally.

In addition, the output voltage from the DC-DC switch may be selected by a voltage divider, having a first resistor value and a second resistor value selected by the instructions from the processor such that the output voltage from the DC-DC switch can define a first output voltage and a second output voltage. In other aspect the DC-DC switch can be further configured to define a third output voltage. The second resistor value may be selected from a pair of resistors, defined separately to create the first output voltage and the second output voltage respectively and defined in series to create the third output voltage. In addition, the processor further includes instructions to the H-bridge circuit to only control the direction of the motor.

Figure 27:
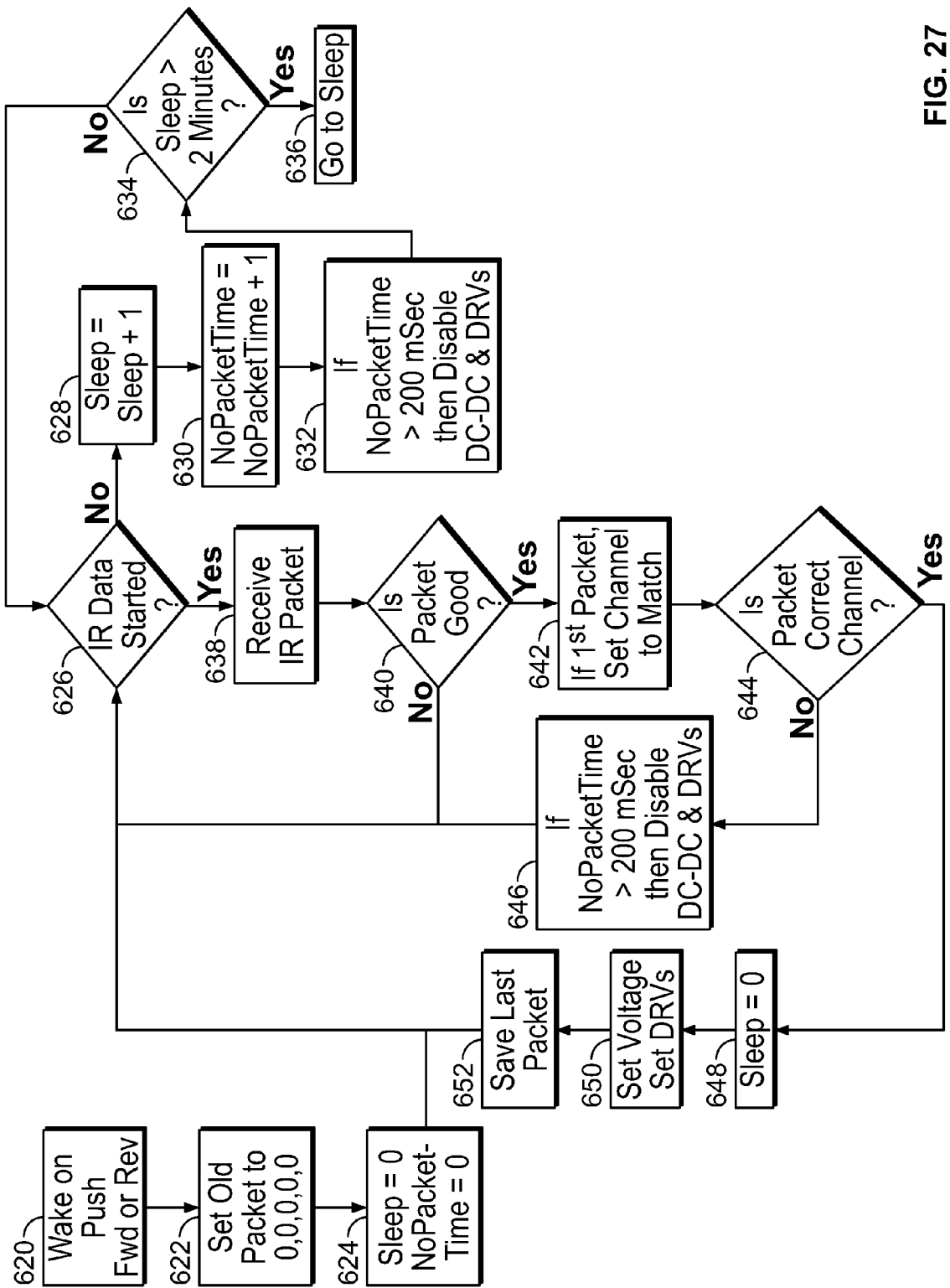
FIG. 27 is a flow chart diagram for a skateboard in accordance with one embodiment of the present invention.

As shown in reference to FIG. 27, the processor WAKEs on a roll in either direction (box 620), the processor SETs OLD PACKET to 0, 0, 0, 0 (box 622) and then SETs Sleep=0 and NoPacketTime=0 (box 624). The processor then checks to see if the IR Data has Started (box 626). If no IR Data is received, the processor sets Sleep=Sleep+1 (box 628), sets NoPacketTime=NoPacketTime+1 (box 630), and If NoPacketTime>200 mSec then the processor Disables the DC-DC switch and Disables the DRVs (box 632). The processor then determines if Sleep is greater than 2 minutes (box 634). If Yes then the processor with Go To Sleep (box 636), if No then the process returns to box 626 to determine if IR Data is received. When IR Data is started, the processor Receives the IR Packet (box 638) and Checks to determine IF the Packet is Good (box 640). If not, the processor returns to box 626. If Yes, the process will set the Channel to Match if the Packet is the 1$^{st}$ Packet (box 642). If the Packet is not the 1$^{st}$ Packet the processor Checks to ensure the Packet is from the Correct Channel (box 644). If it is not the correct Channel, the processor determines If NoPacketTime>200 mSec then the processor Disables the DC-DC switch and Disables the DRVs (box 646) and then returns to box 626. If the Channel is correct, the processor Sets Sleep=0 (box 648), the processor Moves to FIG. 28 (box 650) and then when the processor returns from FIG. 28, the processor save last Packet information (box 652) and moves to box 626 to continue.

Figure 28:
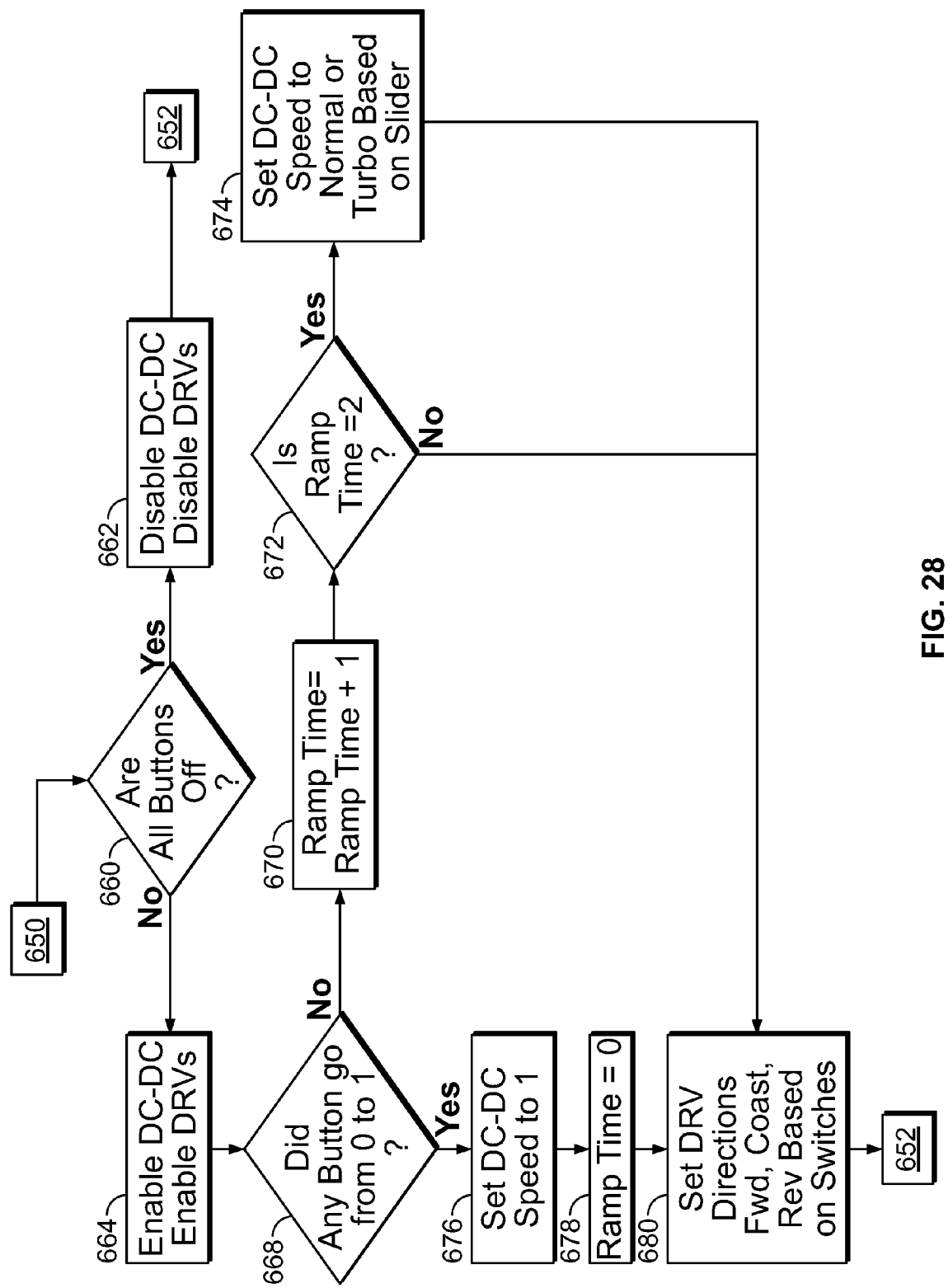
FIG. 28 is a flow chart diagram for a system in a skateboard in accordance with one embodiment of the present invention to set voltage and H-bridge circuits.

In Reference also to FIG. 28, from box 650, the processor check to see if the Buttons from the Remote Control are Off (box 660), if All the Buttons are Off, the processor Disables the DC-DC switch and Disables the DRVs (box 662) and then returns to Box 652 (see FIG. 27). If All the Buttons are not Off, then the processor Enables the DC-DC switch and Enables the DRVs (box 664). The processor then checks to determine if Any Button moved from 0 to 1 (box 668). If no, the processor sets the Ramp Time=Ramp Time+1 (box 670). The processor then Check to determine if Ramp Time is equal to 2 (box 672). In this aspect Ramp Time may be equated to the user holding a button down or holding a slider in a specific position for a predetermined time. If the Ramp Time is 2 then the processor Sets the DC-DC switch to change the voltage to either Normal Speed or Turbo (high) Speed based on the Slider button input on the remote control (box 674). If the Ramp Time is not 2 (from box 672); or after the DC-DC switch is set (from box 674) the processor will Set the DRV directions based on input from the remote control such that the skateboard is moving Forward, Coasting, Reverse or Turning (box 680). Going back to box 668, if any Buttons did move from 0 to 1, the processor will Set the DC-DC switch speed to 1 (box 676), and set the Ramp Time=0 (Box 678). The processor will then Set the DRV directions based on input from the remote control such that the skateboard is moving Forward, Coasting, Reverse or Turning (box 680). From box 680 the processor returns to box 652 (FIG. 27).

In this aspect the DC-DC switch is able to change the speed of the motor(s) by adjusted voltages by resistor changes to 3 separate speeds, a Start Up Speed, a Normal Speed, and a High Speed; which as noted herein was extremely difficult to obtain using convention chop cycles.

Figure 30:
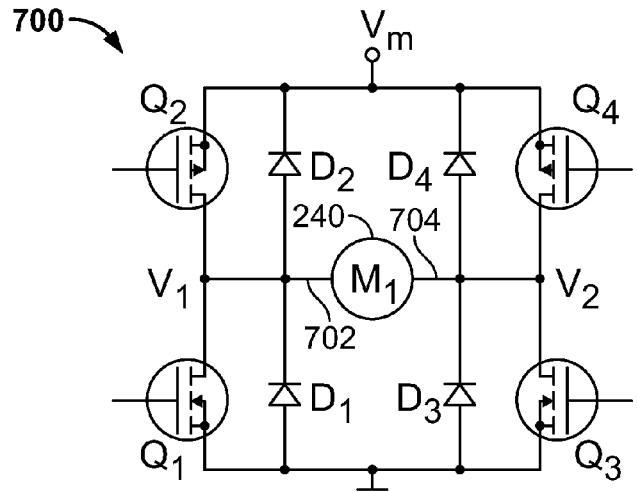
FIG. 30 is an electrical schematic drawing of a simplified H-bridge motor driver with four drive transistors and four flyback diodes connected to a motor.

In one embodiment, motors 240 are connected by resistor means to provide increased back EMF detection by processor 406. A simplified schematic drawing of an H-bridge 700 is shown in FIG. 30 to illustrate the protective flyback diodes D1, D2, D3, D4 integral to such an H-bridge 700. In some integrated circuit H-bridge 700 devices commercially available, diodes D1, D2, D3, D4 are present as the parasitic diode intrinsic to the MOSFET Q1, Q2, Q3, Q4 drivers. In other integrated circuit H-bridge devices, diodes D1, D2, D3, D4 are explicitly built into the IC to provide faster reverse recovery performance. Regardless of the specific implementation of H-bridge 700, the present feature of the invention requires diodes D1, D2, D3, D4 to be electrically present.

During operation, MOSFET Q1, Q2, Q3, Q4 are energized in various combinations to provide drive to motor 240. During the period when processor 406 is attempting to detect a back EMF signal from motor 240, MOSFET Q1, Q2, Q3, Q4 of the simplified schematic of FIG. 30 are not energized, and so appear as open circuits. In the non-energized state H-bridge 700, only diodes D1, D2, D3, D4 may conduct electrical current so as to present motor 240 back EMF across its terminals 702, 704 to generate voltages V1, V2.

Figure 31:
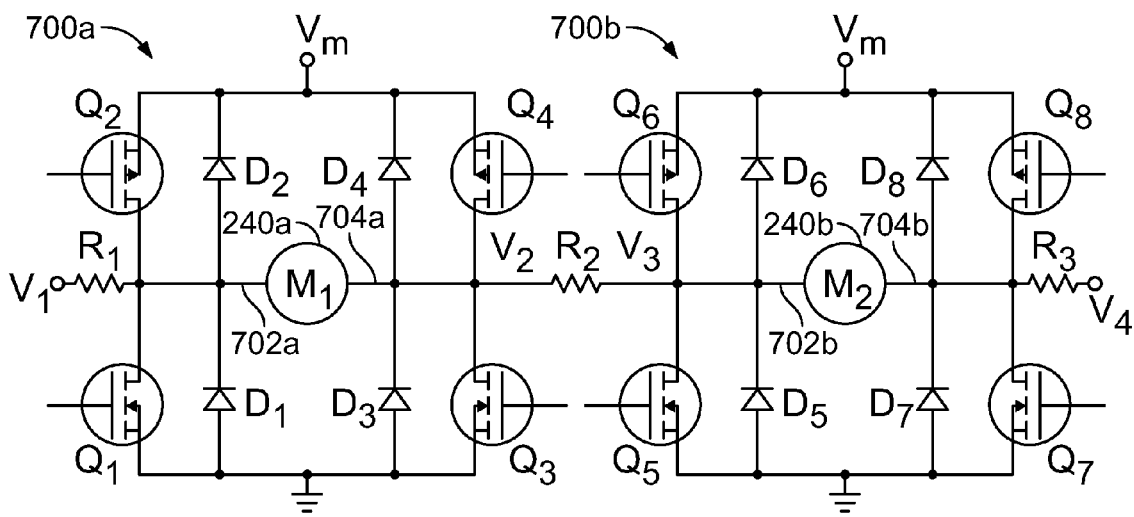
FIG. 31 is an electrical schematic drawing of a pair of simplified H-bridge motor drivers each connected to a pair of motors which are further resistively connected to provide additive EMF detection as per a feature of the present invention.

FIG. 31 illustrates the resistive interconnection means of a feature of the present invention. Resistor R1 is connected between motor lead 702a of motor 240a and the voltage sense terminal at the node denoted by voltage V1. Resistor R2 is connected between motor lead 704a of motor 240a and a lead of resistor R2 at the node denoted by voltage V2. The remaining lead of resistor R2 at the node denoted by voltage V3 is connected to motor lead 702b of motor 240b. Motor lead 704b is connected to resistor R3. The remaining lead of resistor R3 connects to the voltage sense terminal at the node denoted by voltage V4. Voltage sense terminal V1 and voltage sense terminal V4 constitute the forward and reverse EMF sense signals that drive inputs of processor 406 in order to sense and back EMF voltage from motors 240a, 240b.

Figure 32:
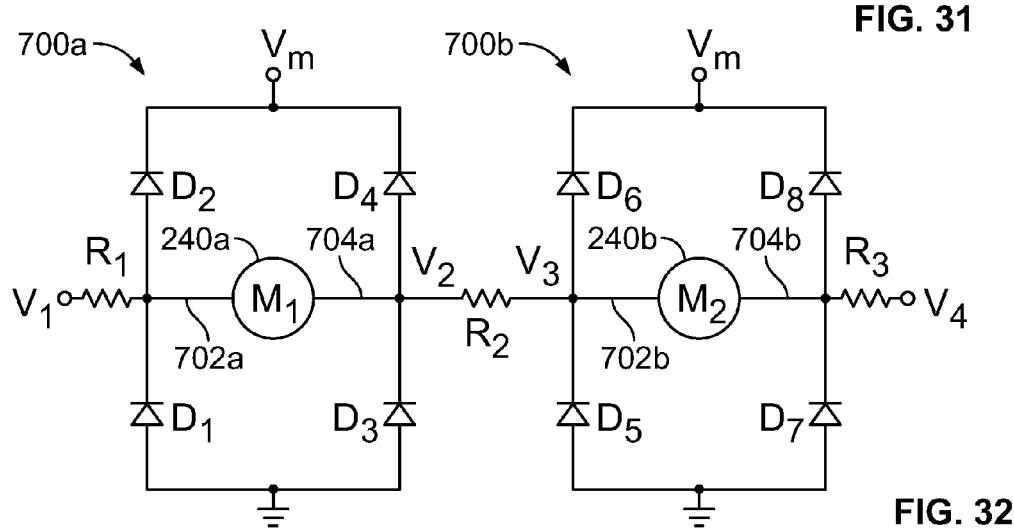
FIG. 32 is an electrical schematic drawing of the equivalent circuit of a pair of simplified H-bridge motor drives each connected to a pair of motors which are further resistively connected to provide additive EMF detection as per a feature of the present invention when none of the drive MOSFET transistors are energized.

When motors 240a, 240b are being driven by MOSFET Q1, Q2, Q3, Q4, Q5, Q6, Q7, Q8, in various combinations, resistors R1, R3 prevent damage to processor 406 inputs, while resistor R2 prevents excessive current from flowing between the nodes labeled voltage V2 and voltage V3. During EMF measurement state periods when processor 406 configures itself to measure sense voltages V1, V4, MOSFET Q1, Q2, Q3, Q4, Q5, Q6, Q7, Q8 are all off. In this state, the equivalent circuit is as shown in FIG. 32. It is also assumed, but not shown in any figure, that the back EMF sense inputs of processor 406 provide a pull-down resistance that offers a high-impedance (but finite) current path from the inputs to ground. Thus, nominally when the motors are not turning, and the processor is in the EMF measurement state, the voltages V1, V2, V3, V4 are all near zero volts.

The feature of the present invention in which the sensitivity of back EMF detection is enhanced is now described referring to the simplified equivalent circuit of FIG. 32. In the case of a toy skateboard embodiment of the present invention where the player moves the skateboard, motors 240a, 240b are caused to rotate, thereby generating back EMF signals Vemf. In this case, the current through resistors R1, R2, R3 would quickly settle to substantially zero. Thus voltage V2 would be approximately equal to voltage V3. The back EMF, defined as V1−V2 for motor 240a and V3−V4 for motor 240b, would be substantially equal at a value of Vemf.

In the case of the skateboard rolling forward, Vemf is positive. Thus D7 conducts to hold voltage V4 to a diode drop below ground (approximately −0.65V). In this case voltages V2, V3 are approximately Vemf−0.65V. By the means of this invention, the back EMF of motor 240a adds to voltage V2 to produce a voltage V1 equal to 2×Vemf−0.65V. This enhanced voltage exceeds the input logic high threshold of processor 406 with approximately half the rolling velocity required without this feature.

Similarly, in the case of the skate board rolling backward, Vemf is negative. Thus D1 conducts to hold voltage V1 to a diode drop below ground (approximately −0.65V). In this case voltages V2, V3 are approximately −Vemf−0.65V. By the means of this invention, the back EMF of motor 240b adds to voltage V3 to produce a voltage V4 equal to −2×Vemf−0.65V. This enhanced voltage exceeds the input logic high threshold of processor 406 with approximately half the rolling velocity required without this feature.

In some embodiments, supply voltage Vm may be produced by an adjustable regulator that is disabled when processor 406 is in a sleep state. In this case, the sense voltage that appears on the nodes demarked by V1 and V4 may be high enough to cause conduction in diodes D2 and D8 respectively. This conduction, in turn, charges the capacitance on the supply voltage Vm signal through resistor R2. Provided the time constant defined by the capacitance of the power supply and the resistor R2 is sufficiently small, the embodiment of this feature of the invention continues to provide enhanced back EMF sensitivity.

The sensitivity enhancement feature of the present invention may be extended to electromechanical devices employing three or more electric motors. This is implemented by cascading additional H-bridges 700 for each additional electric motor. For example, if a third electric motor were used, the method of this feature of the present invention would call for a third motor 240 and H-bridge 700 as shown in FIG. 30 added to the right-hand side of the schematic of FIG. 31. The node demarked by voltage V4 is connected to the node demarked V1 in FIG. 30. An additional resistor R4 connects to the node demarked V2 of FIG. 30 to the input of processor 406. In this way, the back EMF of three motors would add to create the back EMF sense signal.

From the foregoing and as mentioned above, it is observed that numerous variations and modifications may be effected without departing from the spirit and scope of the novel concept of the invention. It is to be understood that no limitation with respect to the embodiments illustrated herein is intended or should be inferred. For example, the defined orientation placed at either a front end or rear end can be easily reversed without deviating from the scope of the invention. As such, orientation terms such as front and rear can be used interchangeable to place the wheels and truck assemblies. It is therefore intended to cover by the appended claims all such modifications within the scope of the appended claims.

We claim:

1. A toy vehicle comprising:
   a low inductance motor powered by a high frequency switched voltage at a frequency high enough to create continuous conduction;
   an H-bridge circuit configured to control a direction of the motor;
   an adjustable high frequency DC-DC switch configured to convert a supply voltage to an output voltage, lower than the supply voltage, for use by the H-bridge circuit to power the low inductance motor in a forward or reverse direction; and
   a processor having instructions configured to change the output voltage from the DC-DC switch from a first voltage to a second voltage, wherein the output voltage from the DC-DC switch is selected by a voltage divider with a first resistor value and a second resistor value and wherein the second resistor value is selected by the instructions from the processor such that the output voltage from the DC-DC switch can define a first output voltage, a second output voltage, and a third output voltage.

2. The toy vehicle of claim 1, wherein the motor has an inductance of approximately less than 500 uH.

3. The toy vehicle of claim 1, wherein the motor has an inductance of about 140 uH.

4. The toy vehicle of claim 1, wherein the DC-DC switch is operating at a frequency greater than 250 kHz.

5. The toy vehicle of claim 1, wherein the DC-DC switch is operating at a frequency substantially about 1500 kHz.

6. The toy vehicle of claim 1, wherein the DC-DC switch is changed digitally.

7. The toy vehicle of claim 1, wherein the output voltage from the DC-DC switch is selected by a voltage divider with a first resistor value and a second resistor value and wherein the second resistor value is selected by the instructions from the processor such that the output voltage from the DC-DC switch can define a first output voltage and a second output voltage.

8. The toy vehicle of claim 1, wherein the second resistor value is selected from a pair of resistors, defined separately to create the first output voltage and the second output voltage respectively and defined in series to create the third output voltage.

9. The toy vehicle of claim 1, wherein the processor further includes instructions to the H-bridge circuit to only control the direction of the motor.

* * * * *